(12) United States Patent
Ashton-Patton et al.

(10) Patent No.: US 11,242,279 B2
(45) Date of Patent: Feb. 8, 2022

(54) HIGH TRANSMISSION GLASSES

(71) Applicant: CORNING INCORPORATED, Corning, NY (US)

(72) Inventors: Melissann Marie Ashton-Patton, Corning, NY (US); Adam James Ellison, Corning, NY (US); Ellen Anne King, Savona, NY (US)

(73) Assignee: Corning Incorporated, Corning, NY (US)

( * ) Notice: Subject to any disclaimer, the term of this patent is extended or adjusted under 35 U.S.C. 154(b) by 8 days.

(21) Appl. No.: 15/769,639

(22) PCT Filed: Oct. 18, 2016

(86) PCT No.: PCT/US2016/057445
§ 371 (c)(1),
(2) Date: Apr. 19, 2018

(87) PCT Pub. No.: WO2017/070066
PCT Pub. Date: Apr. 27, 2017

(65) Prior Publication Data
US 2018/0312425 A1 Nov. 1, 2018

Related U.S. Application Data

(60) Provisional application No. 62/362,331, filed on Jul. 14, 2016, provisional application No. 62/245,006, filed on Oct. 22, 2015.

(51) Int. Cl.
| | |
|---|---|
| *C03C 3/093* | (2006.01) |
| *C03C 3/091* | (2006.01) |
| *C03C 21/00* | (2006.01) |
| *F21V 8/00* | (2006.01) |
| *C03C 3/087* | (2006.01) |
| *C03C 3/078* | (2006.01) |
| *C03C 3/095* | (2006.01) |
| *C03C 4/12* | (2006.01) |

(52) U.S. Cl.
CPC .............. *C03C 3/093* (2013.01); *C03C 3/078* (2013.01); *C03C 3/087* (2013.01); *C03C 3/091* (2013.01); *C03C 3/095* (2013.01); *C03C 4/12* (2013.01); *C03C 21/002* (2013.01); *G02B 6/0065* (2013.01); *G02B 6/005* (2013.01)

(58) Field of Classification Search
CPC ......... C03C 3/083; C03C 3/085; C03C 3/087; C03C 3/091; C03C 3/093
See application file for complete search history.

(56) References Cited

U.S. PATENT DOCUMENTS

| | | |
|---|---|---|
| 5,015,909 A | 5/1991 | Zhong et al. |
| 5,264,722 A | 11/1993 | Tonucci et al. |
| 6,440,531 B1 | 8/2002 | Kurachi et al. |
| 6,461,734 B1 | 10/2002 | Carre |
| 7,538,050 B2 | 5/2009 | Takagi et al. |
| 7,687,420 B2 | 3/2010 | Murata et al. |
| 7,838,452 B2 | 11/2010 | Kurachi et al. |
| 8,168,295 B2 | 5/2012 | Murata |
| 8,357,459 B2 | 1/2013 | Tachiwana et al. |
| 8,518,545 B2 | 8/2013 | Akiba et al. |
| 8,652,979 B2 | 2/2014 | Murata |
| 9,139,469 B2 | 9/2015 | Comte et al. |
| 9,701,576 B2 | 7/2017 | Bockmeyer et al. |
| 9,963,378 B2 | 5/2018 | Yamamoto |
| 2002/0015952 A1 | 2/2002 | Anderson et al. |
| 2002/0022219 A1 | 2/2002 | Clements et al. |
| 2002/0042068 A1 | 4/2002 | Mizuno et al. |
| 2002/0198094 A1* | 12/2002 | Arbab .................. C03C 3/087 501/64 |
| 2003/0172682 A1 | 9/2003 | Sato et al. |
| 2003/0216242 A1* | 11/2003 | Arbab .................. C03C 4/085 501/71 |
| 2005/0048571 A1 | 3/2005 | Danielson et al. |
| 2005/0064209 A1 | 3/2005 | Haines et al. |
| 2005/0170498 A1 | 8/2005 | Dolley et al. |
| 2007/0154356 A1 | 7/2007 | Modavis |
| 2009/0023575 A1 | 1/2009 | Fujita et al. |
| 2009/0075805 A1* | 3/2009 | Kurachi ................ C03C 3/083 501/59 |
| 2011/0014475 A1 | 1/2011 | Murata |

(Continued)

FOREIGN PATENT DOCUMENTS

| | | |
|---|---|---|
| CN | 1492844 A | 4/2004 |
| CN | 1766612 A | 5/2006 |

(Continued)

OTHER PUBLICATIONS

International Search Report and Written Opinion of the International Searching Authority; PCT/US2016/057445; dated Jan. 13, 2017; 11 Pages; European Patent Office.
Piruska et al; "The Autofluorescence of Plastic Materials and Chips Measured Under Laser Irradiation"; Lab Chip, 2005, 5, pp. 1348-1354.
First Office Action received for CN App No. 201680061998.3, dated Aug. 3, 2020, 22 pages (12 pages of English Translation and 10 pages of Original Document).
Office Action received for JP App. No. 2018-520525, dated Sep. 3, 2020, 12 pages (6 pages of English Translation and 6 pages of Original Document).
Taiwan Patent Application No. 105133793, Search Report dated May 17, 2021, 3 page (English Translation only) Taiwan Patent Office.

(Continued)

*Primary Examiner* — Elizabeth A. Bolden
(74) *Attorney, Agent, or Firm* — Ryan T. Hardee

(57) ABSTRACT

Compounds, compositions, articles, devices, and methods for the manufacture of light guide plates and back light units including such light guide plates made from glass. In some embodiments, light guide plates (LGPs) are provided that have similar or superior optical properties to light guide plates made from PMMA and that have exceptional mechanical properties such as rigidity, CTE and dimensional stability in high moisture conditions as compared to PMMA light guide plates.

42 Claims, 6 Drawing Sheets

(56) References Cited

U.S. PATENT DOCUMENTS

| | | | | |
|---|---|---|---|---|
| 2011/0017297 | A1* | 1/2011 | Aitken | C03C 3/085 |
| | | | | 136/260 |
| 2011/0291436 | A1* | 12/2011 | Shelestak | C03C 4/082 |
| | | | | 296/84.1 |
| 2012/0297829 | A1 | 11/2012 | Endo et al. | |
| 2013/0274085 | A1 | 10/2013 | Beall et al. | |
| 2014/0023865 | A1 | 1/2014 | Comte et al. | |
| 2014/0113141 | A1 | 4/2014 | Yamamoto et al. | |
| 2015/0050476 | A1* | 2/2015 | Zheng | B32B 17/064 |
| | | | | 428/216 |
| 2015/0064474 | A1 | 3/2015 | Dejneka et al. | |
| 2015/0140299 | A1 | 5/2015 | Ellison et al. | |
| 2015/0152003 | A1 | 6/2015 | Kawamoto et al. | |
| 2015/0166401 | A1* | 6/2015 | Yamamoto | C03C 4/02 |
| | | | | 428/410 |
| 2015/0368146 | A1 | 12/2015 | Ellison et al. | |
| 2016/0137547 | A1* | 5/2016 | Theocharopoulos | |
| | | | | C03C 10/0018 |
| | | | | 501/32 |
| 2016/0238778 | A1 | 8/2016 | Hijiya et al. | |

FOREIGN PATENT DOCUMENTS

| | | | |
|---|---|---|---|
| CN | 103030303 | A | 4/2013 |
| CN | 103755153 | A | 4/2014 |
| CN | 104230165 | A | 12/2014 |
| CN | 104556685 | A | 4/2015 |
| CN | 104619664 | A | 5/2015 |
| CN | 104703937 | A | 6/2015 |
| CN | 106573820 | A | 4/2017 |
| DE | 10025465 | C2 | 3/2003 |
| EP | 594134 | B1 | 1/1999 |
| JP | 2003-526078 | A | 9/2003 |
| JP | 2006-126179 | A | 5/2006 |
| JP | 2007-526767 | A | 9/2007 |
| JP | 2007-292556 | A | 11/2007 |
| JP | 2008115071 | A | 5/2008 |
| JP | 2013-500229 | A | 1/2013 |
| JP | 2013-502370 | A | 1/2013 |
| TW | 200922899 | A | 6/2009 |
| TW | 201118054 | A | 6/2011 |
| WO | 2011/011667 | A1 | 1/2011 |
| WO | 2011/022639 | A2 | 2/2011 |
| WO | 2011144024 | A1 | 11/2011 |
| WO | 2013130665 | A2 | 9/2013 |
| WO | 2015/015913 | A1 | 2/2015 |
| WO | 2015/068741 | A1 | 5/2015 |
| WO | 2015127583 | A1 | 9/2015 |
| WO | WO-2015127583 | A1 * | 9/2015 ........... C03C 21/002 |

OTHER PUBLICATIONS

Japanese Patent Application No. 2018-520523; Office Action dated Oct. 7, 2020; 10 Pages; Japanese Patent Office.

Taiwan Patent Application No. 105133793; Office Action dated Oct. 30, 2020; 5 Pages; Taiwan Patent Office.

Japanese Patent Application No. 2018-520525, Office Action dated Jul. 28, 2021, 7 pages (3 pages of English Translation and 4 pages of Original Document), Japanese Patent Office.

* cited by examiner

Distance Between LGP and LED

HIGH TRANSMISSION GLASSES

CROSS-REFERENCE TO RELATED APPLICATIONS

This application claims the benefit of priority under 35 U.S.C. § 371 of International Patent Application Serial No. PCT/US2016/57445, filed on Oct. 18, 2016, which in turn, claims the benefit of priority of U.S. Provisional Application Ser. No. 62/362,331 filed on Jul. 14, 2016 and U.S. Provisional Application Ser. No. 62/245,006 filed on Oct. 22, 2015, the contents of each of which are relied upon and incorporated herein by reference in their entireties.

BACKGROUND

Side lit back light units include a light guide plate (LGP) that is usually made of high transmission plastic materials such as polymethylmethacrylate (PMMA). Although such plastic materials present excellent properties such as light transmission, these materials exhibit relatively poor mechanical properties such as rigidity, coefficient of thermal expansion (CTE) and moisture absorption.

Accordingly, it would be desirable to provide an improved light guide plate having attributes that achieve an improved optical performance in terms of light transmission, solarization, scattering and light coupling as well as exhibiting exceptional mechanical performance in terms of rigidity, CTE, and moisture absorption.

SUMMARY

Aspects of the subject matter pertain to compounds, compositions, articles, devices, and methods for the manufacture of light guide plates and back light units including such light guide plates made from glass. In some embodiments, light guide plates (LGPs) are provided that have similar or superior optical properties to light guide plates made from PMMA and that have exceptional mechanical properties such as rigidity, CTE and dimensional stability in high moisture conditions as compared to PMMA light guide plates.

Principles and embodiments of the present subject matter relate in some embodiments to a light guide plate for use in a backlight unit. In some embodiments the glass article or light guide plate (in some examples) can comprise a glass sheet with a front face having a width and a height, a back face opposite the front face, and a thickness between the front face and back face, forming four edges around the front and back faces, wherein the glass sheet comprises: between about 65.79 mol % to about 78.17 mol % $SiO_2$, between about 2.94 mol % to about 12.12 mol % $Al_2O_3$, between about 0 mol % to about 11.16 mol % $B_2O_3$, between about 0 mol % to about 2.06 mol % $Li_2O$, between about 3.52 mol % to about 13.25 mol % $Na_2O$, between about 0 mol % to about 4.83 mol % $K_2O$, between about 0 mol % to about 3.01 mol % ZnO, between about 0 mol % to about 8.72 mol % MgO, between about 0 mol % to about 4.24 mol % CaO, between about 0 mol % to about 6.17 mol % SrO, between about 0 mol % to about 4.3 mol % BaO, and between about 0.07 mol % to about 0.11 mol % $SnO_2$. In some embodiments, the glass article comprises a color shift <0.008. In some embodiments, the glass article comprises a color shift <0.005. In some embodiments, the glass article comprises an $R_xO/Al_2O_3$ between 0.95 and 3.23, wherein R is any one or more of Li, Na, K, Rb, Cs and x is 2. In some embodiments, the glass article comprises an $R_xO/Al_2O_3$ between 1.18 and 5.68, wherein R is any one or more of Li, Na, K, Rb, Cs and x is 2, or Zn, Mg, Ca, Sr or Ba and x is 1. In some embodiments, the glass article comprises an $R_xO$—$Al_2O_3$—MgO between −4.25 and 4.0, wherein R is any one or more of Li, Na, K, Rb, Cs and x is 2. In some embodiments, the glass has a strain temperature between about 522° C. and 590° C. In some embodiments, the glass has an annealing temperature between about 566° C. and 641° C. In some embodiments, the glass has a softening temperature between about 800° C. and 914° C. In some embodiments, the glass has a CTE between about 49.6×10-7/° C. to about 80×10-7/° C. In some embodiments, the glass has a density between about 2.34 gm/cc @ 20° C. and about 2.53 gm/cc @ 20° C. In some embodiments, the glass article is a light guide plate. In some embodiments, the thickness of the plate is between about 0.2 mm and about 8 mm. In some embodiments, the thickness has a variation of less than 5%. In some embodiments, the light guide plate is manufactured from a fusion draw process, slot draw process, or a float process. In some embodiments, the glass comprises less than 1 ppm each of Co, Ni, and Cr. In some embodiments, the concentration of Fe is <about 50 ppm, <about 20 ppm, or <about 10 ppm. In some embodiments, Fe+30Cr+35Ni<about 60 ppm, <about 40 ppm, <about 20 ppm, or <about 10 ppm. In some embodiments, the transmittance at 450 nm with at least 500 mm in length is greater than or equal to 85%, the transmittance at 550 nm with at least 500 mm in length is greater than or equal to 90%, or the transmittance at 630 nm with at least 500 mm in length is greater than or equal to 85%, and combinations thereof. In some embodiments, the glass sheet is chemically strengthened. In further embodiments, the glass comprises from about 0.1 mol % to about 3.0 mol % ZnO, from about 0.1 mol % to about 1.0 mol % $TiO_2$, from about 0.1 mol % to about 1.0 mol % $V_2O_3$, from about 0.1 mol % to about 1.0 mol % $Nb_2O_5$, from about 0.1 mol % to about 1.0 mol % MnO, from about 0.1 mol % to about 1.0 mol % $ZrO_2$, from about 0.1 mol % to about 1.0 mol % $As_2O_3$, from about 0.1 mol % to about 1.0 mol % $SnO_2$, from about 0.1 mol % to about 1.0 mol % $MoO_3$, from about 0.1 mol % to about 1.0 mol % $Sb_2O_3$, or from about 0.1 mol % to about 1.0 mol % $CeO_2$. In additional embodiments, the glass comprises between 0.1 mol % to no more than about 3.0 mol % of one or combination of any of ZnO, $TiO_2$, $V_2O_3$, $Nb_2O_5$, MnO, $ZrO_2$, $As_2O_3$, $SnO_2$, $MoO_3$, $Sb_2O_3$, and $CeO_2$.

In further embodiments, a glass article is provided comprising a glass sheet with a front face having a width and a height, a back face opposite the front face, and a thickness between the front face and back face, forming four edges around the front and back faces, wherein the glass sheet comprises: between about 66 mol % to about 78 mol % $SiO_2$, between about 4 mol % to about 11 mol % $Al_2O_3$, between about 4 mol % to about 11 mol % $B_2O_3$, between about 0 mol % to about 2 mol % $Li_2O$, between about 4 mol % to about 12 mol % $Na_2O$, between about 0 mol % to about 2 mol % $K_2O$, between about 0 mol % to about 2 mol % ZnO, between about 0 mol % to about 5 mol % MgO, between about 0 mol % to about 2 mol % CaO, between about 0 mol % to about 5 mol % SrO, between about 0 mol % to about 2 mol % BaO, and between about 0 mol % to about 2 mol % $SnO_2$. In some embodiments, the glass article comprises a color shift <0.008. In some embodiments, the glass article comprises a color shift <0.005. In some embodiments, the glass article comprises an $R_xO/Al_2O_3$ between 0.95 and 3.23, wherein R is any one or more of Li, Na, K, Rb, Cs and x is 2. In some embodiments, the glass article comprises an $R_xO/Al_2O_3$ between 1.18 and 5.68, wherein R is any one or more of Li, Na, K, Rb, Cs and x is 2, or Zn, Mg, Ca, Sr or Ba and x is 1. In some embodiments, the glass article comprises an $R_xO$—$Al_2O_3$—MgO between −4.25 and 4.0, wherein R is any one or more of Li, Na, K, Rb, Cs and x is 2. In some embodiments, the glass has a strain temperature between about 522° C. and 590° C. In some embodiments, the glass has an annealing temperature between about 566° C. and 641° C. In some embodiments, the glass has a softening temperature between about 800° C. and 914° C. In some embodiments, the glass has a CTE between about 49.6×10-7/° C. to about 80×10-7/° C. In some embodiments, the glass has a density between about 2.34 gm/cc @ 20° C. and about 2.53 gm/cc @ 20° C. In some embodiments, the glass article is a light guide plate. In some embodiments, the thickness of the plate is between about 0.2 mm and about 8 mm. In some embodiments, the thickness has a variation of less than 5%. In some embodiments, the light guide plate is manufactured from a fusion draw process, slot draw process, or a float process. In some embodiments, the glass comprises less than 1 ppm each of Co, Ni, and Cr. In some embodiments, the concentration of Fe is <about 50 ppm, <about 20 ppm, or <about 10 ppm. In some embodiments, Fe+30Cr+35Ni<about 60 ppm, <about 40 ppm, <about 20 ppm, or <about 10 ppm. In some embodiments, the transmittance at 450 nm with at least 500 mm in length is greater than or equal to 85%, the transmittance at 550 nm with at least 500 mm in length is greater than or equal to 90%, or the transmittance at 630 nm with at least 500 mm in length is greater than or equal to 85%, and combinations thereof. In some embodiments, the glass sheet is chemically strengthened. In further embodiments, the glass comprises from about 0.1 mol % to about 3.0 mol % ZnO, from about 0.1 mol % to about 1.0 mol % $TiO_2$, from about 0.1 mol % to about 1.0 mol % $V_2O_3$, from about 0.1 mol % to about 1.0 mol % $Nb_2O_5$, from about 0.1 mol % to about 1.0 mol % MnO, from about 0.1 mol % to about 1.0 mol % $ZrO_2$, from about 0.1 mol % to about 1.0 mol % $As_2O_3$, from about 0.1 mol % to about 1.0 mol % $SnO_2$, from about 0.1 mol % to about 1.0 mol % $MoO_3$, from about 0.1 mol % to about 1.0 mol % $Sb_2O_3$, or from about 0.1 mol % to about 1.0 mol % $CeO_2$. In additional embodiments, the glass comprises between 0.1 mol % to no more than about 3.0 mol % of one or combination of any of ZnO, $TiO_2$, $V_2O_3$, $Nb_2O_5$, MnO, $ZrO_2$, $As_2O_3$, $SnO_2$, $MoO_3$, $Sb_2O_3$, and $CeO_2$.

In additional embodiments, a glass article is provided comprising a glass sheet with a front face having a width and a height, a back face opposite the front face, and a thickness between the front face and back face, forming four edges around the front and back faces, wherein the glass sheet comprises: between about 72 mol % to about 80 mol % $SiO_2$, between about 3 mol % to about 7 mol % $Al_2O_3$, between about 0 mol % to about 2 mol % $B_2O_3$, between about 0 mol % to about 2 mol % $Li_2O$, between about 6 mol % to about 15 mol % $Na_2O$, between about 0 mol % to about 2 mol % $K_2O$, between about 0 mol % to about 2 mol % ZnO, between about 2 mol % to about 10 mol % MgO, between about 0 mol % to about 2 mol % CaO, between about 0 mol % to about 2 mol % SrO, between about 0 mol % to about 2 mol % BaO, and between about 0 mol % to about 2 mol % $SnO_2$. In some embodiments, the glass article comprises a color shift <0.008. In some embodiments, the glass article comprises a color shift <0.005. In some embodiments, the glass article comprises an $R_xO/Al_2O_3$ between 0.95 and 3.23, wherein R is any one or more of Li, Na, K, Rb, Cs and x is 2. In some embodiments, the glass article comprises an $R_xO/Al_2O_3$ between 1.18 and 5.68, wherein R is any one or more of Li, Na, K, Rb, Cs and x is 2, or Zn, Mg, Ca, Sr or Ba and x is 1. In some embodiments, the glass article comprises an $R_xO$—$Al_2O_3$—MgO between −4.25 and 4.0, wherein R is any one or more of Li, Na, K, Rb, Cs and x is 2. In some embodiments, the glass has a strain temperature between about 522° C. and 590° C. In some embodiments, the glass has an annealing temperature between about 566° C. and 641° C. In some embodiments, the glass has a softening temperature between about 800° C. and 914° C. In some embodiments, the glass has a CTE between about 49.6×10-7/° C. to about 80×10-7/° C. In some embodiments, the glass has a density between about 2.34 gm/cc @ 20° C. and about 2.53 gm/cc @ 20° C. In some embodiments, the glass article is a light guide plate. In some embodiments, the thickness of the plate is between about 0.2 mm and about 8 mm. In some embodiments, the thickness has a variation of less than 5%. In some embodiments, the light guide plate is manufactured from a fusion draw process, slot draw process, or a float process. In some embodiments, the glass comprises less than 1 ppm each of Co, Ni, and Cr. In some embodiments, the concentration of Fe is <about 50 ppm, <about 20 ppm, or <about 10 ppm. In some embodiments, Fe+30Cr+35Ni<about 60 ppm, <about 40 ppm, <about 20 ppm, or <about 10 ppm. In some embodiments, the transmittance at 450 nm with at least 500 mm in length is greater than or equal to 85%, the transmittance at 550 nm with at least 500 mm in length is greater than or equal to 90%, or the transmittance at 630 nm with at least 500 mm in length is greater than or equal to 85%, and combinations thereof. In some embodiments, the glass sheet is chemically strengthened. In further embodiments, the glass comprises from about 0.1 mol % to about 3.0 mol % ZnO, from about 0.1 mol % to about 1.0 mol % $TiO_2$, from about 0.1 mol % to about 1.0 mol % $V_2O_3$, from about 0.1 mol % to about 1.0 mol % $Nb_2O_5$, from about 0.1 mol % to about 1.0 mol % MnO, from about 0.1 mol % to about 1.0 mol % $ZrO_2$, from about 0.1 mol % to about 1.0 mol % $As_2O_3$, from about 0.1 mol % to about 1.0 mol % $SnO_2$, from about 0.1 mol % to about 1.0 mol % $MoO_3$, from about 0.1 mol % to about 1.0 mol % $Sb_2O_3$, or from about 0.1 mol % to about 1.0 mol % $CeO_2$. In additional embodiments, the glass comprises between 0.1 mol % to no more than about 3.0 mol % of one or combination of any of ZnO, $TiO_2$, $V_2O_3$, $Nb_2O_5$, MnO, $ZrO_2$, $As_2O_3$, $SnO_2$, $MoO_3$, $Sb_2O_3$, and $CeO_2$.

In additional embodiments, a glass article is provided comprising a glass sheet having between about 60 mol % to about 80 mol % $SiO_2$, between about 0 mol % to about 15 mol % $Al_2O_3$, between about 0 mol % to about 15 mol % $B_2O_3$, and about 2 mol % to about 50 mol % $R_xO$, wherein R is any one or more of Li, Na, K, Rb, Cs and x is 2, or Zn, Mg, Ca, Sr or Ba and x is 1, and wherein Fe+30Cr+35Ni<about 60 ppm. In some embodiments, the glass has a color shift <0.008. In some embodiments, the glass has a color shift <0.005. In further embodiments, the glass comprises from about 0.1 mol % to about 3.0 mol % ZnO, from about 0.1 mol % to about 1.0 mol % $TiO_2$, from about 0.1 mol % to about 1.0 mol % $V_2O_3$, from about 0.1 mol % to about 1.0 mol % $Nb_2O_5$, from about 0.1 mol % to about 1.0 mol % MnO, from about 0.1 mol % to about 1.0 mol % $ZrO_2$, from about 0.1 mol % to about 1.0 mol % $As_2O_3$, from about 0.1 mol % to about 1.0 mol % $SnO_2$, from about 0.1 mol % to about 1.0 mol % $MoO_3$, from about 0.1 mol % to about 1.0 mol % $Sb_2O_3$, or from about 0.1 mol % to about 1.0 mol % $CeO_2$. In additional embodiments, the glass comprises between 0.1 mol % to no more than about 3.0 mol % of one or combination of any of ZnO, $TiO_2$, $V_2O_3$, $Nb_2O_5$, MnO, $ZrO_2$, $As_2O_3$, $SnO_2$, $MoO_3$, $Sb_2O_3$, and $CeO_2$.

In yet further embodiments, a glass article is provided comprising a glass sheet having between about 60 mol % to about 80 mol % $SiO_2$, between about 0 mol % to about 15 mol % $Al_2O_3$, between about 0 mol % to about 15 mol % $B_2O_3$, and about 2 mol % to about 50 mol % $R_xO$, wherein R is any one or more of Li, Na, K, Rb, Cs and x is 2, or Zn, Mg, Ca, Sr or Ba and x is 1, and wherein the glass has a color shift <0.008. In some embodiments, the glass has a color shift <0.005. In further embodiments, the glass comprises from about 0.1 mol % to about 3.0 mol % ZnO, from about 0.1 mol % to about 1.0 mol % $TiO_2$, from about 0.1 mol % to about 1.0 mol % $V_2O_3$, from about 0.1 mol % to about 1.0 mol % $Nb_2O_5$, from about 0.1 mol % to about 1.0 mol % MnO, from about 0.1 mol % to about 1.0 mol % $ZrO_2$, from about 0.1 mol % to about 1.0 mol % $As_2O_3$, from about 0.1 mol % to about 1.0 mol % $SnO_2$, from about 0.1 mol % to about 1.0 mol % $MoO_3$, from about 0.1 mol % to about 1.0 mol % $Sb_2O_3$, or from about 0.1 mol % to about 1.0 mol % $CeO_2$. In additional embodiments, the glass comprises between 0.1 mol % to no more than about 3.0 mol % of one or combination of any of ZnO, $TiO_2$, $V_2O_3$, $Nb_2O_5$, MnO, $ZrO_2$, $As_2O_3$, $SnO_2$, $MoO_3$, $Sb_2O_3$, and $CeO_2$.

In other embodiments, a glass article is provided comprising a glass sheet having between about 65.79 mol % to about 78.17 mol % $SiO_2$, between about 2.94 mol % to about 12.12 mol % $Al_2O_3$, between about 0 mol % to about 11.16 mol % $B_2O_3$, and about 3.52 mol % to about 42.39 mol % $R_xO$, wherein R is any one or more of Li, Na, K, Rb, Cs and x is 2, or Zn, Mg, Ca, Sr or Ba and x is 1, and wherein the glass has a color shift <0.008. In some embodiments, the glass has a color shift <0.005. In further embodiments, the glass comprises from about 0.1 mol % to about 3.0 mol % ZnO, from about 0.1 mol % to about 1.0 mol % $TiO_2$, from about 0.1 mol % to about 1.0 mol % $V_2O_3$, from about 0.1 mol % to about 1.0 mol % $Nb_2O_5$, from about 0.1 mol % to about 1.0 mol % MnO, from about 0.1 mol % to about 1.0 mol % $ZrO_2$, from about 0.1 mol % to about 1.0 mol % $As_2O_3$, from about 0.1 mol % to about 1.0 mol % $SnO_2$, from about 0.1 mol % to about 1.0 mol % $MoO_3$, from about 0.1 mol % to about 1.0 mol % $Sb_2O_3$, or from about 0.1 mol % to about 1.0 mol % $CeO_2$. In additional embodiments, the glass comprises between 0.1 mol % to no more than about 3.0 mol % of one or combination of any of ZnO, $TiO_2$, $V_2O_3$, $Nb_2O_5$, MnO, $ZrO_2$, $As_2O_3$, $SnO_2$, $MoO_3$, $Sb_2O_3$, and $CeO_2$.

In further embodiments, a glass article is provided comprising a glass sheet having between about 60 mol % to about 81 mol % $SiO_2$, between about 0 mol % to about 2 mol % $Al_2O_3$, between about 0 mol % to about 15 mol % MgO, between about 0 mol % to about 2 mol % $Li_2O$, between about 9 mol % to about 15 mol % $Na_2O$, between about 0 mol % to about 1.5 mol % $K_2O$, between about 7 mol % to about 14 mol % CaO, between about 0 mol % to about 2 mol % SrO, and wherein Fe+30Cr+35Ni<about 60 ppm. In some embodiments, the glass has a color shift <0.008. In some embodiments, the glass has a color shift <0.005. In further embodiments, the glass comprises from about 0.1 mol % to about 3.0 mol % ZnO, from about 0.1 mol % to about 1.0 mol % $TiO_2$, from about 0.1 mol % to about 1.0 mol % $V_2O_3$, from about 0.1 mol % to about 1.0 mol % $Nb_2O_5$, from about 0.1 mol % to about 1.0 mol % MnO, from about 0.1 mol % to about 1.0 mol % $ZrO_2$, from about 0.1 mol % to about 1.0 mol % $As_2O_3$, from about 0.1 mol % to about 1.0 mol % $SnO_2$, from about 0.1 mol % to about 1.0 mol % $MoO_3$, from about 0.1 mol % to about 1.0 mol % $Sb_2O_3$, or from about 0.1 mol % to about 1.0 mol % $CeO_2$. In additional embodiments, the glass comprises between 0.1 mol % to no more than about 3.0 mol % of one or combination of any of ZnO, $TiO_2$, $V_2O_3$, $Nb_2O_5$, MnO, $ZrO_2$, $As_2O_3$, $SnO_2$, $MoO_3$, $Sb_2O_3$, and $CeO_2$.

In additional embodiments, a glass article is provided comprising a glass sheet having between about 60 mol % to about 81 mol % $SiO_2$, between about 0 mol % to about 2 mol % $Al_2O_3$, between about 0 mol % to about 15 mol % MgO, between about 0 mol % to about 2 mol % $Li_2O$, between about 9 mol % to about 15 mol % $Na_2O$, between about 0 mol % to about 1.5 mol % $K_2O$, between about 7 mol % to about 14 mol % CaO, and between about 0 mol % to about 2 mol % SrO, wherein the glass has a color shift <0.008. In some embodiments, the glass has a color shift <0.005. In further embodiments, the glass comprises from about 0.1 mol % to about 3.0 mol % ZnO, from about 0.1 mol % to about 1.0 mol % $TiO_2$, from about 0.1 mol % to about 1.0 mol % $V_2O_3$, from about 0.1 mol % to about 1.0 mol % $Nb_2O_5$, from about 0.1 mol % to about 1.0 mol % MnO, from about 0.1 mol % to about 1.0 mol % $ZrO_2$, from about 0.1 mol % to about 1.0 mol % $As_2O_3$, from about 0.1 mol % to about 1.0 mol % $SnO_2$, from about 0.1 mol % to about 1.0 mol % $MoO_3$, from about 0.1 mol % to about 1.0 mol % $Sb_2O_3$, or from about 0.1 mol % to about 1.0 mol % $CeO_2$. In additional embodiments, the glass comprises between 0.1 mol % to no more than about 3.0 mol % of one or combination of any of ZnO, $TiO_2$, $V_2O_3$, $Nb_2O_5$, MnO, $ZrO_2$, $As_2O_3$, $SnO_2$, $MoO_3$, $Sb_2O_3$, and $CeO_2$.

Additional features and advantages of the disclosure will be set forth in the detailed description which follows, and in part will be readily apparent to those skilled in the art from that description or recognized by practicing the methods as described herein, including the detailed description which follows, the claims, as well as the appended drawings.

It is to be understood that both the foregoing general description and the following detailed description present various embodiments of the disclosure, and are intended to provide an overview or framework for understanding the nature and character of the claims. The accompanying drawings are included to provide a further understanding of the disclosure, and are incorporated into and constitute a part of this specification. The drawings illustrate various embodiments of the disclosure and together with the description serve to explain the principles and operations of the disclosure.

BRIEF DESCRIPTION OF THE DRAWINGS

The following detailed description can be further understood when read in conjunction with the following drawings.

DETAILED DESCRIPTION

Described herein are light guide plates, methods of making light guide plates and backlight units utilizing light guide plates in accordance with embodiments of the present invention.

Current light guide plates used in LCD backlight applications are typically made from PMMA material since this is one of the best materials in term of optical transmission in the visible spectrum. However, PMMA presents mechanical problems that make large size (e.g., 50 inch diagonal and greater) displays challenging in term of mechanical design, such as, rigidity, moisture absorption, and coefficient of thermal expansion (CTE).

With regard to rigidity, conventional LCD panels are made of two pieces of thin glass (color filter substrate and TFT substrate) with a PMMA light guide and a plurality of thin plastic films (diffusers, dual brightness enhancement films (DBEF) films, etc.). Due to the poor elastic modulus of PMMA, the overall structure of the LCD panel does not have sufficient rigidity, and additional mechanical structure is necessary to provide stiffness for the LCD panel. It should be noted that PMMA generally has a Young's modulus of about 2 GPa, while certain exemplary glasses have a Young's modulus ranging from about 60 GPa to 90 GPa or more.

Figure 2:
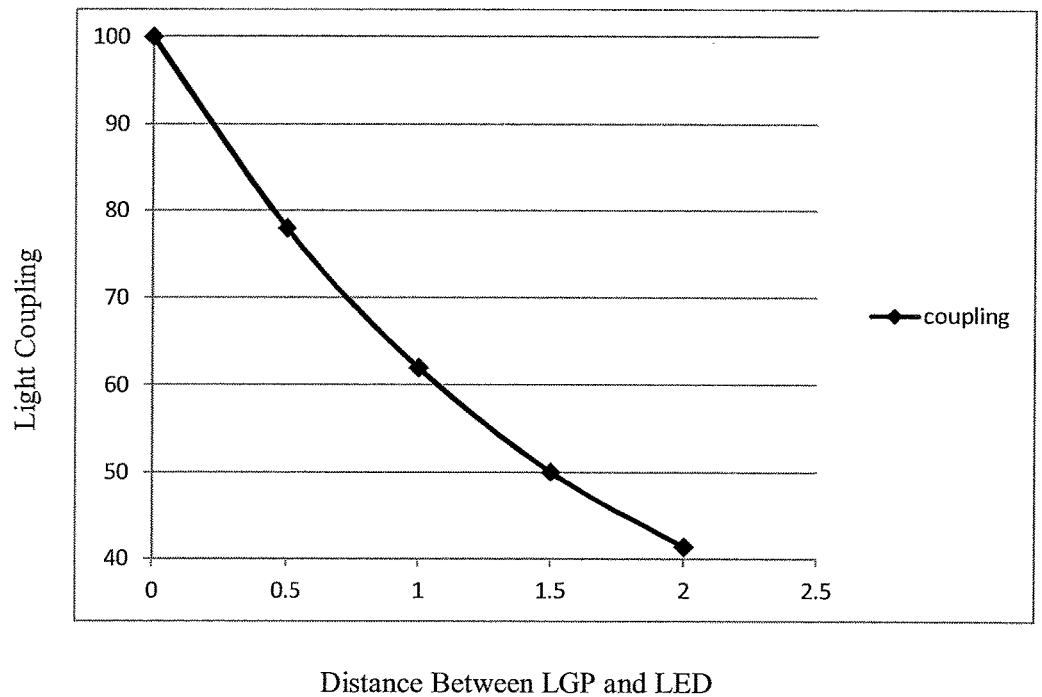
FIG. 2 is a graph showing percentage light coupling versus distance between an LED and LGP edge.

Regarding moisture absorption, humidity testing shows that PMMA is sensitive to moisture and size can change by about 0.5%. For a PMMA panel having a length of one meter, this 0.5% change can increase the length by 5 mm, which is significant and makes the mechanical design of a corresponding backlight unit challenging. Conventional means to solve this problem is leaving an air gap between the light emitting diodes (LEDs) and the PMMA light guide plate (LGP) to let the material expand. A problem with this approach is that light coupling is extremely sensitive to the distance from the LEDs to the LGP, which can cause the display brightness to change as a function of humidity. FIG. 2 is a graph showing percentage light coupling versus distance between an LED and LGP edge. With reference to FIG. 2, a relationship is shown which illustrates the drawbacks of conventional measures to solve challenges with PMMA. More specifically, FIG. 2 illustrates a plot of light coupling versus LED to LGP distance assuming both are 2 mm in height. It can be observed that the further the distance between LED and LGP, a less efficient light coupling is made between the LED and LGP.

With regard to CTE, the CTE of PMMA is about 75E-6 $C^{-1}$ and has relatively low thermal conductivity (0.2 W/m/K) while some glasses have a CTE of about 8E-6 $C^{-1}$ and a thermal conductivity of 0.8 W/m/K. Of course, the CTE of other glasses can vary and such a disclosure should not limit the scope of the claims appended herewith. PMMA also has a transition temperature of about 105° C., and when used an LGP, a PMMA LGP material can become very hot whereby its low conductivity makes it difficult to dissipate heat. Accordingly, using glass instead of PMMA as a material for light guide plates provides benefits in this regard, but conventional glass has a relatively poor transmission compared to PMMA due mostly to iron and other impurities. Also some other parameters such as surface roughness, waviness, and edge quality polishing can play a significant role on how a glass light guide plate can perform. According embodiments of the invention, glass light guide plates for use in backlight units can have one or more of the following attributes.

Glass Light Guide Plate Structure and Composition

Figure 1:
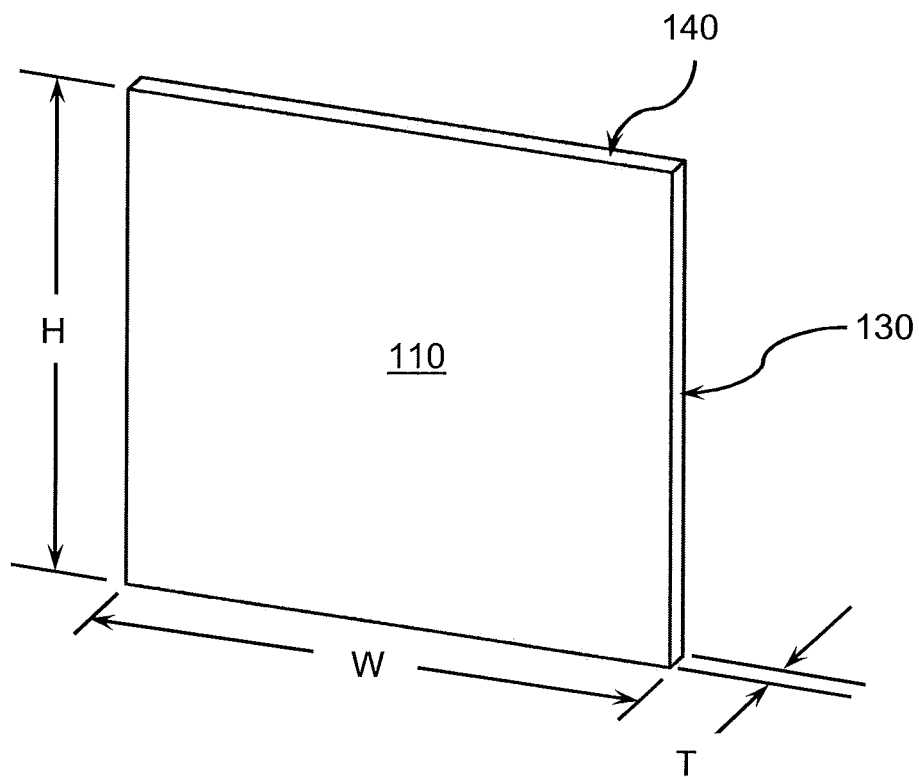
FIG. 1 is a pictorial illustration of an exemplary embodiment of a light guide plate.

FIG. 1 is a pictorial illustration of an exemplary embodiment of a light guide plate. With reference to FIG. 1, an illustration is provided of an exemplary embodiment having a shape and structure of an exemplary light guide plate comprising a sheet of glass 100 having a first face 110, which may be a front face, and a second face opposite the first face, which may be a back face. The first and second faces may have a height, H, and a width, W. The first and/or second face(s) may have a roughness that is less than 0.6 nm, less than 0.5 nm, less than 0.4 nm, less than 0.3 nm, less than 0.2 nm, less than 0.1 nm, or between about 0.1 nm and about 0.6 nm.

The glass sheet may have a thickness, T, between the front face and the back face, where the thickness forms four edges. The thickness of the glass sheet may be less than the height and width of the front and back faces. In various embodiments, the thickness of the plate may be less than 1.5% of the height of the front and/or back face. Alternatively, the thickness, T, may be less than about 3 mm, less than about 2 mm, less than about 1 mm, or between about 0.1 mm to about 3 mm. The height, width, and thickness of the light guide plate may be configured and dimensioned for use in an LCD backlight application.

A first edge 130 may be a light injection edge that receives light provided for example by a light emitting diode (LED). The light injection edge may scatter light within an angle less than 12.8 degrees full width half maximum (FWHM) in transmission. The light injection edge may be obtained by grinding the edge without polishing the light injection edge. The glass sheet may further comprise a second edge 140 adjacent to the light injection edge and a third edge opposite the second edge and adjacent to the light injection edge, where the second edge and/or the third edge scatter light within an angle of less than 12.8 degrees FWHM in reflection. The second edge 140 and/or the third edge may have a diffusion angle in reflection that is below 6.4 degrees. It should be noted that while the embodiment depicted in FIG. 1 shows a single edge 130 injected with light, the claimed subject matter should not be so limited as any one or several of the edges of an exemplary embodiment 100 can be injected with light. For example, in some embodiments, the first edge 130 and its opposing edge can both be injected with light. Such an exemplary embodiment may be used in a display device having a large and or curvilinear width W. Additional embodiments may inject light at the second edge 140 and its opposing edge rather than the first edge 130 and/or its opposing edge. Thicknesses of exemplary display devices can be less than about 10 mm, less than about 9 mm, less than about 8 mm, less than about 7 mm, less than about 6 mm, less than about 5 mm, less than about 4 mm, less than about 3 mm, or less than about 2 mm.

In various embodiments, the glass composition of the glass sheet may comprise between 60-80 mol % $SiO_2$, between 0-20 mol % $Al_2O_3$, and between 0-15 mol % $B_2O_3$, and less than 50 ppm iron (Fe) concentration. In some embodiments, there may be less than 25 ppm Fe, or in some embodiments the Fe concentration may be about 20 ppm or less. In various embodiments, the thermal conduction of the light guide plate 100 may be greater than 0.5 W/m/K. In additional embodiments, the glass sheet may be formed by a polished float glass, a fusion draw process, a slot draw process, a redraw process, or another suitable forming process.

In other embodiments, the glass composition of the glass sheet may comprise between 63-81 mol % $SiO_2$, between 0-5 mol % $Al_2O_3$, between 0-6 mol % MgO, between 7-14 mol % CaO, between 0-2 mol % $Li_2O$, between 9-15 mol % $Na_2O$, between 0-1.5 mol % $K_2O$, and trace amounts of $Fe_2O_3$, $Cr_2O_3$, $MnO_2$, $Co_3O_4$, $TiO_2$, $SO_3$, and/or Se.

According to one or more embodiments, the LGP can be made from a glass comprising colorless oxide components selected from the glass formers $SiO_2$, $Al_2O_3$, and $B_2O_3$. The exemplary glass may also include fluxes to obtain favorable melting and forming attributes. Such fluxes include alkali oxides ($Li_2O$, $Na_2O$, $K_2O$, $Rb_2O$ and $Cs_2O$) and alkaline earth oxides (MgO, CaO, SrO, ZnO and BaO). In one embodiment, the glass contains constituents in the range of 60-80 mol % $SiO_2$, in the range of 0-20 mol % $Al_2O_3$, in the range of 0-15 mol % $B_2O_3$, and in the range of 5 and 20% alkali oxides, alkaline earth oxides, or combinations thereof. In other embodiments, the glass composition of the glass sheet may comprise no $B_2O_3$ and comprise between 63-81 mol % $SiO_2$, between 0-5 mol % $Al_2O_3$, between 0-6 mol % MgO, between 7-14 mol % CaO, between 0-2 mol % $Li_2O$, between 9-15 mol % $Na_2O$, between 0-1.5 mol % $K_2O$, and trace amounts of $Fe_2O_3$, $Cr_2O_3$, $MnO_2$, $Co_3O_4$, $TiO_2$, $SO_3$, and/or Se In some glass compositions described herein, $SiO_2$ can serve as the basic glass former. In certain embodiments, the concentration of $SiO_2$ can be greater than 60 mole percent to provide the glass with a density and chemical durability suitable for a display glasses or light guide plate glasses, and a liquidus temperature (liquidus viscosity), which allows the glass to be formed by a downdraw process (e.g., a fusion process). In terms of an upper limit, in general, the $SiO_2$ concentration can be less than or equal to about 80 mole percent to allow batch materials to be melted using conventional, high volume, melting techniques, e.g., Joule melting in a refractory melter. As the concentration of $SiO_2$ increases, the 200 poise temperature (melting temperature) generally rises. In various applications, the $SiO_2$ concentration is adjusted so that the glass composition has a melting temperature less than or equal to 1,750° C. In various embodiments, the mol % of $SiO_2$ may be in the range of about 60% to about 81%, or alternatively in the range of about 66% to about 78%, or in the range of about 72% to about 80%, or in the range of about 65% to about 79%, and all subranges therebetween. In additional embodiments, the mol % of $SiO_2$ may be between about 70% to about 74%, or between about 74% to about 78%. In some embodiments, the mol % of $SiO_2$ may be about 72% to 73%. In other embodiments, the mol % of $SiO_2$ may be about 76% to 77%.

$Al_2O_3$ is another glass former used to make the glasses described herein. Higher mole percent $Al_2O_3$ can improve the glass's annealing point and modulus. In various embodiments, the mol % of $Al_2O_3$ may be in the range of about 0% to about 20%, or alternatively in the range of about 4% to about 11%, or in the range of about 6% to about 8%, or in the range of about 3% to about 7%, and all subranges therebetween. In additional embodiments, the mol % of $Al_2O_3$ may be between about 4% to about 10%, or between about 5% to about 8%. In some embodiments, the mol % of $Al_2O_3$ may be about 7% to 8%. In other embodiments, the mol % of $Al_2O_3$ may be about 5% to 6%, or from 0% to about 5% or from 0% to about 2%.

$B_2O_3$ is both a glass former and a flux that aids melting and lowers the melting temperature. It has an impact on both liquidus temperature and viscosity. Increasing $B_2O_3$ can be used to increase the liquidus viscosity of a glass. To achieve these effects, the glass compositions of one or more embodiments may have $B_2O_3$ concentrations that are equal to or greater than 0.1 mole percent; however, some compositions may have a negligible amount of $B_2O_3$. As discussed above with regard to $SiO_2$, glass durability is very important for display applications. Durability can be controlled somewhat by elevated concentrations of alkaline earth oxides, and significantly reduced by elevated $B_2O_3$ content. Annealing point decreases as $B_2O_3$ increases, so it may be helpful to keep $B_2O_3$ content low. Thus, in various embodiments, the mol % of $B_2O_3$ may be in the range of about 0% to about 15%, or alternatively in the range of about 0% to about 12%, or in the range of about 0% to about 11%, in the range of about 3% to about 7%, or in the range of about 0% to about 2%, and all subranges therebetween. In some embodiments, the mol % of $B_2O_3$ may be about 7% to 8%. In other embodiments, the mol % of $B_2O_3$ may be negligible or about 0% to 1%.

In addition to the glass formers ($SiO_2$, $Al_2O_3$, and $B_2O_3$), the glasses described herein also include alkaline earth oxides. In one embodiment, at least three alkaline earth oxides are part of the glass composition, e.g., MgO, CaO, and BaO, and, optionally, SrO. The alkaline earth oxides provide the glass with various properties important to melting, fining, forming, and ultimate use. Accordingly, to improve glass performance in these regards, in one embodiment, the (MgO+CaO+SrO+BaO)/$Al_2O_3$ ratio is between 0 and 2.0. As this ratio increases, viscosity tends to increase more strongly than liquidus temperature, and thus it is increasingly difficult to obtain suitably high values for $T_{35k}$-$T_{liq}$. Thus in another embodiment, ratio (MgO+CaO+SrO+BaO)/$Al_2O_3$ is less than or equal to about 2. In some embodiments, the (MgO+CaO+SrO+BaO)/$Al_2O_3$ ratio is in the range of about 0 to about 1.0, or in the range of about 0.2 to about 0.6, or in the range of about 0.4 to about 0.6. In detailed embodiments, the (MgO+CaO+SrO+BaO)/$Al_2O_3$ ratio is less than about 0.55 or less than about 0.4.

For certain embodiments of this disclosure, the alkaline earth oxides may be treated as what is in effect a single compositional component. This is because their impact upon viscoelastic properties, liquidus temperatures and liquidus phase relationships are qualitatively more similar to one another than they are to the glass forming oxides $SiO_2$, $Al_2O_3$ and $B_2O_3$. However, the alkaline earth oxides CaO, SrO and BaO can form feldspar minerals, notably anorthite ($CaAl_2Si_2O_8$) and celsian ($BaAl_2Si_2O_8$) and strontium-bearing solid solutions of same, but MgO does not participate in these crystals to a significant degree. Therefore, when a feldspar crystal is already the liquidus phase, a superaddition of MgO may serves to stabilize the liquid relative to the crystal and thus lower the liquidus temperature. At the same time, the viscosity curve typically becomes steeper, reducing melting temperatures while having little or no impact on low-temperature viscosities.

The inventors have found that the addition of small amounts of MgO may benefit melting by reducing melting temperatures, forming by reducing liquidus temperatures and increasing liquidus viscosity, while preserving high annealing points. In various embodiments, the glass composition comprises MgO in an amount in the range of about 0 mol % to about 10 mol %, or in the range of about 0 mol % to about 6 mol %, or in the range of about 1.0 mol % to about 8.0 mol %, or in the range of about 0 mol % to about 8.72 mol %, or in the range of about 1.0 mol % to about 7.0 mol %, or in the range of about 0 mol % to about 5 mol %, or in the range of about 1 mol % to about 3 mol %, or in the range of about 2 mol % to about 10 mol %, or in the range of about 4 mol % to about 8 mol %, and all subranges therebetween.

Without being bound by any particular theory of operation, it is believed that calcium oxide present in the glass composition can produce low liquidus temperatures (high liquidus viscosities), high annealing points and moduli, and CTE's in the most desired ranges for display and light guide plate applications. It also contributes favorably to chemical durability, and compared to other alkaline earth oxides, it is relatively inexpensive as a batch material. However, at high concentrations, CaO increases the density and CTE. Furthermore, at sufficiently low $SiO_2$ concentrations, CaO may stabilize anorthite, thus decreasing liquidus viscosity. Accordingly, in one or more embodiment, the CaO concentration can be between 0 and 6 mol %. In various embodiments, the CaO concentration of the glass composition is in the range of about 0 mol % to about 4.24 mol %, or in the range of about 0 mol % to about 2 mol %, or in the range of about 0 mol % to about 1 mol %, or in the range of about 0 mol % to about 0.5 mol %, or in the range of about 0 mol % to about 0.1 mol %, and all subranges therebetween. In other embodiments, the CaO concentration of the glass composition is in the range of about 7-14 mol %, or from about 9-12 mol %.

SrO and BaO can both contribute to low liquidus temperatures (high liquidus viscosities). The selection and concentration of these oxides can be selected to avoid an increase in CTE and density and a decrease in modulus and annealing point. The relative proportions of SrO and BaO can be balanced so as to obtain a suitable combination of physical properties and liquidus viscosity such that the glass can be formed by a downdraw process. In various embodiments, the glass comprises SrO in the range of about 0 to about 8.0 mol %, or between about 0 mol % to about 4.3 mol %, or about 0 to about 5 mol %, 1 mol % to about 3 mol %, or about less than about 2.5 mol %, and all subranges therebetween. In one or more embodiments, the glass comprises BaO in the range of about 0 to about 5 mol %, or between 0 to about 4.3 mol %, or between 0 to about 2.0 mol %, or between 0 to about 1.0 mol %, or between 0 to about 0.5 mol %, and all subranges therebetween.

In addition to the above components, the glass compositions described herein can include various other oxides to adjust various physical, melting, fining, and forming attributes of the glasses. Examples of such other oxides include, but are not limited to, $TiO_2$, MnO, $V_2O_3$, $Fe_2O_3$, $ZrO_2$, ZnO, $Nb_2O_5$, $MoO_3$, $Ta_2O_5$, $WO_3$, $Y_2O_3$, $La_2O_3$ and $CeO_2$ as well as other rare earth oxides and phosphates. In one embodiment, the amount of each of these oxides can be less than or equal to 2.0 mole percent, and their total combined concentration can be less than or equal to 5.0 mole percent. In some embodiments, the glass composition comprises ZnO in an amount in the range of about 0 to about 3.5 mol %, or about 0 to about 3.01 mol %, or about 0 to about 2.0 mol %, and all subranges therebetween. In other embodiments, the glass composition comprises from about 0.1 mol % to about 1.0 mol % titanium oxide; from about 0.1 mol % to about 1.0 mol % vanadium oxide; from about 0.1 mol % to about 1.0 mol % niobium oxide; from about 0.1 mol % to about 1.0 mol % manganese oxide; from about 0.1 mol % to about 1.0 mol % zirconium oxide; from about 0.1 mol % to about 1.0 mol % tin oxide; from about 0.1 mol % to about 1.0 mol % molybdenum oxide; from about 0.1 mol % to about 1.0 mol % cerium oxide; and all subranges therebetween of any of the above listed transition metal oxides. The glass compositions described herein can also include various contaminants associated with batch materials and/or introduced into the glass by the melting, fining, and/or forming equipment used to produce the glass. The glasses can also contain $SnO_2$ either as a result of Joule melting using tin-oxide electrodes and/or through the batching of tin containing materials, e.g., $SnO_2$, SnO, $SnCO_3$, $SnC_2O_2$, etc.

The glass compositions described herein can contain some alkali constituents, e.g., these glasses are not alkali-free glasses. As used herein, an "alkali-free glass" is a glass having a total alkali concentration which is less than or equal to 0.1 mole percent, where the total alkali concentration is the sum of the $Na_2O$, $K_2O$, and $Li_2O$ concentrations. In some embodiments, the glass comprises $Li_2O$ in the range of about 0 to about 3.0 mol %, in the range of about 0 to about 3.01 mol %, in the range of about 0 to about 2.0 mol %, in the range of about 0 to about 1.0 mol %, less than about 3.01 mol %, or less than about 2.0 mol %, and all subranges therebetween. In other embodiments, the glass comprises $Na_2O$ in the range of about 3.5 mol % to about 13.5 mol %, in the range of about 3.52 mol % to about 13.25 mol %, in the range of about 4 to about 12 mol %, in the range of about 6 to about 15 mol %, or in the range of about 6 to about 12 mol %, in the range of about 9 mol % to about 15 mol %, and all subranges therebetween. In some embodiments, the glass comprises $K_2O$ in the range of about 0 to about 5.0 mol %, in the range of about 0 to about 4.83 mol %, in the range of about 0 to about 2.0 mol %, in the range of about 0 to about 1.5 mol %, in the range of about 0 to about 1.0 mol %, or less than about 4.83 mol %, and all subranges therebetween.

In some embodiments, the glass compositions described herein can have one or more or all of the following compositional characteristics: (i) an $As_2O_3$ concentration of at most 0.05 to 1.0 mol %; (ii) an $Sb_2O_3$ concentration of at most 0.05 to 1.0 mol %; (iii) a $SnO_2$ concentration of at most 0.25 to 3.0 mol %.

$As_2O_3$ is an effective high temperature fining agent for display glasses, and in some embodiments described herein, $As_2O_3$ is used for fining because of its superior fining properties. However, $As_2O_3$ is poisonous and requires special handling during the glass manufacturing process. Accordingly, in certain embodiments, fining is performed without the use of substantial amounts of $As_2O_3$, i.e., the finished glass has at most 0.05 mole percent $As_2O_3$. In one embodiment, no $As_2O_3$ is purposely used in the fining of the glass. In such cases, the finished glass will typically have at most 0.005 mole percent $As_2O_3$ as a result of contaminants present in the batch materials and/or the equipment used to melt the batch materials.

Although not as toxic as $As_2O_3$, $Sb_2O_3$ is also poisonous and requires special handling. In addition, $Sb_2O_3$ raises the density, raises the CTE, and lowers the annealing point in comparison to glasses that use $As_2O_3$ or $SnO_2$ as a fining agent. Accordingly, in certain embodiments, fining is performed without the use of substantial amounts of $Sb_2O_3$, i.e., the finished glass has at most 0.05 mole percent $Sb_2O_3$. In another embodiment, no $Sb_2O_3$ is purposely used in the fining of the glass. In such cases, the finished glass will typically have at most 0.005 mole percent $Sb_2O_3$ as a result of contaminants present in the batch materials and/or the equipment used to melt the batch materials.

Compared to $As_2O_3$ and $Sb_2O_3$ fining, tin fining (i.e., $SnO_2$ fining) is less effective, but $SnO_2$ is a ubiquitous material that has no known hazardous properties. Also, for many years, $SnO_2$ has been a component of display glasses through the use of tin oxide electrodes in the Joule melting of the batch materials for such glasses. The presence of $SnO_2$ in display glasses has not resulted in any known adverse effects in the use of these glasses in the manufacture of liquid crystal displays. However, high concentrations of $SnO_2$ are not preferred as this can result in the formation of crystalline defects in display glasses. In one embodiment, the concentration of $SnO_2$ in the finished glass is less than or equal to 0.25 mole percent, in the range of about 0.07 to about 0.11 mol %, in the range of about 0 to about 2 mol %, from about 0 to about 3 mol %, and all subranges therebetween.

Tin fining can be used alone or in combination with other fining techniques if desired. For example, tin fining can be combined with halide fining, e.g., bromine fining. Other possible combinations include, but are not limited to, tin fining plus sulfate, sulfide, cerium oxide, mechanical bubbling, and/or vacuum fining. It is contemplated that these other fining techniques can be used alone. In certain embodiments, maintaining the $(MgO+CaO+SrO+BaO)/Al_2O_3$ ratio and individual alkaline earth concentrations within the ranges discussed above makes the fining process easier to perform and more effective.

In various embodiments, the glass may comprise $R_xO$ where R is Li, Na, K, Rb, Cs, and x is 2, or R is Zn, Mg, Ca, Sr or Ba, and x is 1. In some embodiments, $R_xO—Al_2O_3>0$. In other embodiments, $0<R_xO—Al_2O_3<15$. In some embodiments, $R_xO/Al_2O_3$ is between 0 and 10, between 0 and 5, greater than 1, or between 1.5 and 3.75, or between 1 and 6, or between 1.1 and 5.7, and all subranges therebetween. In other embodiments, $0<R_xO—Al_2O_3<15$. In further embodiments, x=2 and $R_2O—Al_2O_3<15$, <5, <0, between −8 and 0, or between −8 and −1, and all subranges therebetween. In additional embodiments, $R_2O—Al_2O_3<0$. In yet additional embodiments, x=2 and $R_2O—Al_2O_3—MgO>−10$, >−5, between 0 and −5, between 0 and −2, >−2, between −5 and 5, between −4.5 and 4, and all subranges therebetween. In further embodiments, x=2 and $R_xO/Al_2O_3$ is between 0 and 4, between 0 and 3.25, between 0.5 and 3.25, between 0.95 and 3.25, and all subranges therebetween. These ratios play significant roles in establishing the manufacturability of the glass article as well as determining its transmission performance. For example, glasses having $R_xO—Al_2O_3$ approximately equal to or larger than zero will tend to have better melting quality but if $R_xO—Al_2O_3$ becomes too large of a value, then the transmission curve will be adversely affected. Similarly, if $R_xO—Al_2O_3$ (e.g., $R_2O—Al_2O_3$) is within a given range as described above then the glass will likely have high transmission in the visible spectrum while maintaining meltability and suppressing the liquidus temperature of a glass. Similarly, the $R_2O—Al_2O_3—MgO$ values described above may also help suppress the liquidus temperature of the glass.

In one or more embodiments and as noted above, exemplary glasses can have low concentrations of elements that produce visible absorption when in a glass matrix. Such absorbers include transition elements such as Ti, V, Cr, Mn, Fe, Co, Ni and Cu, and rare earth elements with partially-filled f-orbitals, including Ce, Pr, Nd, Sm, Eu, Tb, Dy, Ho, Er and Tm. Of these, the most abundant in conventional raw materials used for glass melting are Fe, Cr and Ni. Iron is a common contaminant in sand, the source of $SiO_2$, and is a typical contaminant as well in raw material sources for aluminum, magnesium and calcium. Chromium and nickel are typically present at low concentration in normal glass raw materials, but can be present in various ores of sand and must be controlled at a low concentration. Additionally, chromium and nickel can be introduced via contact with stainless steel, e.g., when raw material or cullet is jaw-crushed, through erosion of steel-lined mixers or screw feeders, or unintended contact with structural steel in the melting unit itself. The concentration of iron in some embodiments can be specifically less than 50 ppm, more specifically less than 40 ppm, or less than 25 ppm, and the concentration of Ni and Cr can be specifically less than 5 ppm, and more specifically less than 2 ppm. In further embodiments, the concentration of all other absorbers listed above may be less than 1 ppm for each. In various embodiments the glass comprises 1 ppm or less of Co, Ni, and Cr, or alternatively less than 1 ppm of Co, Ni, and Cr. In various embodiments, the transition elements (V, Cr, Mn, Fe, Co, Ni and Cu) may be present in the glass at 0.1 wt % or less. In some embodiments, the concentration of Fe can be <about 50 ppm, <about 40 ppm, <about 30 ppm, <about 20 ppm, or <about 10 ppm. In other embodiments, Fe+30Cr+35Ni<about 60 ppm, <about 50 ppm, <about 40 ppm, <about 30 ppm, <about 20 ppm, or <about 10 ppm.

In other embodiments, it has been discovered that the addition of certain transition metal oxides that do not cause absorption from 300 nm to 650 nm and that have absorption bands <about 300 nm will prevent network defects from forming processes and will prevent color centers (e.g., absorption of light from 300 nm to 650 nm) post UV exposure when curing ink since the bond by the transition metal oxide in the glass network will absorb the light instead of allowing the light to break up the fundamental bonds of the glass network. Thus, exemplary embodiments can include any one or combination of the following transition metal oxides to minimize UV color center formation: from about 0.1 mol % to about 3.0 mol % zinc oxide; from about 0.1 mol % to about 1.0 mol % titanium oxide; from about 0.1 mol % to about 1.0 mol % vanadium oxide; from about 0.1 mol % to about 1.0 mol % niobium oxide; from about 0.1 mol % to about 1.0 mol % manganese oxide; from about 0.1 mol % to about 1.0 mol % zirconium oxide; from about 0.1 mol % to about 1.0 mol % arsenic oxide; from about 0.1 mol % to about 1.0 mol % tin oxide; from about 0.1 mol % to about 1.0 mol % molybdenum oxide; from about 0.1 mol % to about 1.0 mol % antimony oxide; from about 0.1 mol % to about 1.0 mol % cerium oxide; and all subranges therebetween of any of the above listed transition metal oxides. In some embodiments, an exemplary glass can contain from 0.1 mol % to less than or no more than about 3.0 mol % of any combination of zinc oxide, titanium oxide, vanadium oxide, niobium oxide, manganese oxide, zirconium oxide, arsenic oxide, tin oxide, molybdenum oxide, antimony oxide, and cerium oxide.

Even in the case that the concentrations of transition metals are within the above described ranges, there can be matrix and redox effects that result in undesired absorption. As an example, it is well-known to those skilled in the art that iron occurs in two valences in glass, the +3 or ferric state, and the +2 or ferrous state. In glass, $Fe^{3+}$ produces absorptions at approximately 380, 420 and 435 nm, whereas $Fe^{2+}$ absorbs mostly at IR wavelengths. Therefore, according to one or more embodiments, it may be desirable to force as much iron as possible into the ferrous state to achieve high transmission at visible wavelengths. One non-limiting method to accomplish this is to add components to the glass batch that are reducing in nature. Such components could include carbon, hydrocarbons, or reduced forms of certain metalloids, e.g., silicon, boron or aluminum. However it is achieved, if iron levels were within the described range, according to one or more embodiments, at least 10% of the iron in the ferrous state and more specifically greater than 20% of the iron in the ferrous state, improved transmissions can be produced at short wavelengths. Thus, in various embodiments, the concentration of iron in the glass produces less than 1.1 dB/500 mm of attenuation in the glass sheet. Further, in various embodiments, the concentration of V+Cr+Mn+Fe+Co+Ni+Cu produces 2 dB/500 mm or less of light attenuation in the glass sheet when the ratio ($Li_2O$+$Na_2O$+$K_2O$+$Rb_2O$+$Cs_2O$+MgO+ZnO+CaO+SrO+BaO)/$Al_2O_3$ for borosilicate glass is between 0 and 4.

The valence and coordination state of iron in a glass matrix can also be affected by the bulk composition of the glass. For example, iron redox ratio has been examined in molten glasses in the system $SiO_2$—$K_2O$—$Al_2O_3$ equilibrated in air at high temperature. It was found that the fraction of iron as Fe' increases with the ratio $K_2O$/($K_2O$+$Al_2O_3$), which in practical terms will translate to greater absorption at short wavelengths. In exploring this matrix effect, it was discovered that the ratios ($Li_2O$+$Na_2O$+$K_2O$+$Rb_2O$+$Cs_2O$)/$Al_2O_3$ and (MgO+CaO+ZnO+SrO+BaO)/$Al_2O_3$ can also be important for maximizing transmission in borosilicate glasses. Thus, for the $R_xO$ ranges described above, transmission at exemplary wavelengths can be maximized for a given iron content. This is due in part to the higher proportion of $Fe^{2+}$, and partially to matrix effects associated with the coordination environment of iron.

Glass Roughness

Figure 3:
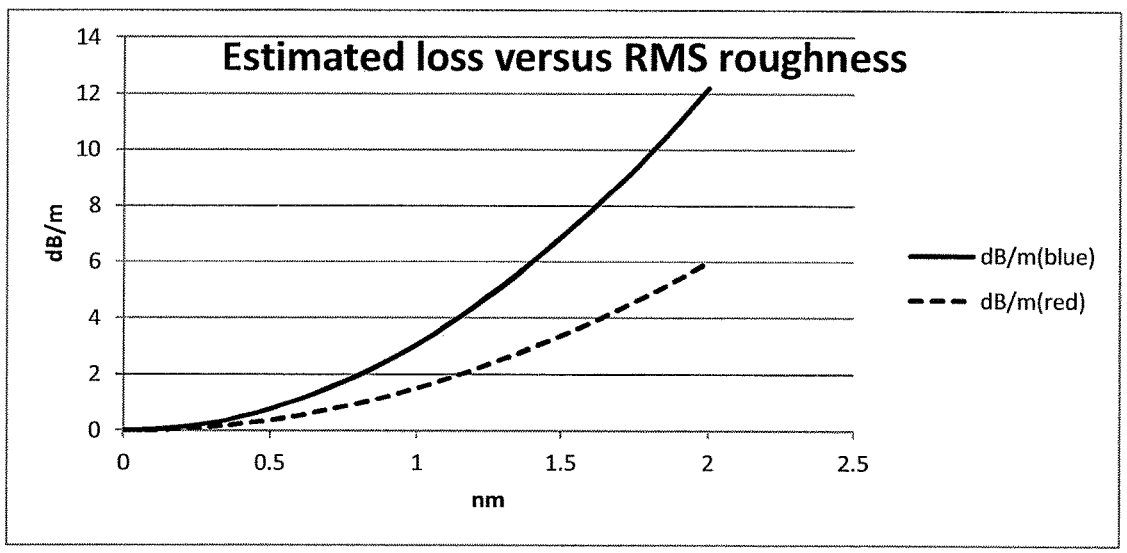
FIG. 3 is a graph showing the estimated light leakage in dB/m versus RMS roughness of an LGP.

FIG. 3 is a graph showing the estimated light leakage in dB/m versus RMS roughness of an LGP. With reference to FIG. 3, it can be shown that surface scattering plays a role in LGPs as light is bouncing many times on the surfaces thereof. The curve depicted in FIG. 3 illustrates light leakage in dB/m as a function of the RMS roughness of the LGP. FIG. 3 shows that, to get below 1 dB/m, the surface quality needs to be better than about 0.6 nm RMS. This level of roughness can be achieved by either using fusion draw process or float glass followed by polishing. Such a model assumes that roughness acts like a Lambertian scattering surface which means that we are only considering high spatial frequency roughness. Therefore, roughness should be calculated by considering the power spectral density and only take into account frequencies that are higher than about 20 microns$^{-1}$. Surface roughness may be measured by atomic force microscopy (AFM); white light interferometry with a commercial system such as those manufactured by Zygo; or by laser confocal microscopy with a commercial system such as those provided by Keyence. The scattering from the surface may be measured by preparing a range of samples identical except for the surface roughness, and then measuring the internal transmittance of each as described below. The difference in internal transmission between samples is attributable to the scattering loss induced by the roughened surface.

UV Processing

In processing exemplary glass, ultraviolet (UV) light can also be used. For instance, light extraction features are often made by white printing dots on glass and UV is used to dry the ink. Also, extraction features can be made of a polymer layer with some specific structure on it and requires UV exposure for polymerization. It has been discovered that UV exposure of glass can significantly affect transmission. According to one or more embodiments, a filter can be used during glass processing of the glass for an LGP to eliminate all wavelengths below about 400 nm. One possible filter consists in using the same glass as the one that is currently exposed.

Glass Waviness

Glass waviness is somewhat different from roughness in the sense that it is much lower frequency (in the mm or larger range). As such, waviness does not contribute to extracting light since angles are very small but it modifies the efficiency of the extraction features since the efficiency is a function of the light guide thickness. Light extraction efficiency is, in general, inversely proportional to the waveguide thickness. Therefore, to keep high frequency image brightness fluctuations below 5% (which is the human perception threshold that resulted from our sparkle human perception analysis), the thickness of the glass needs to be constant within less than 5%. Exemplary embodiments can have an A-side waviness of less than 0.3 um, less than 0.2 um, less than 1 um, less than 0.08 um, or less than 0.06 um.

Figure 4:
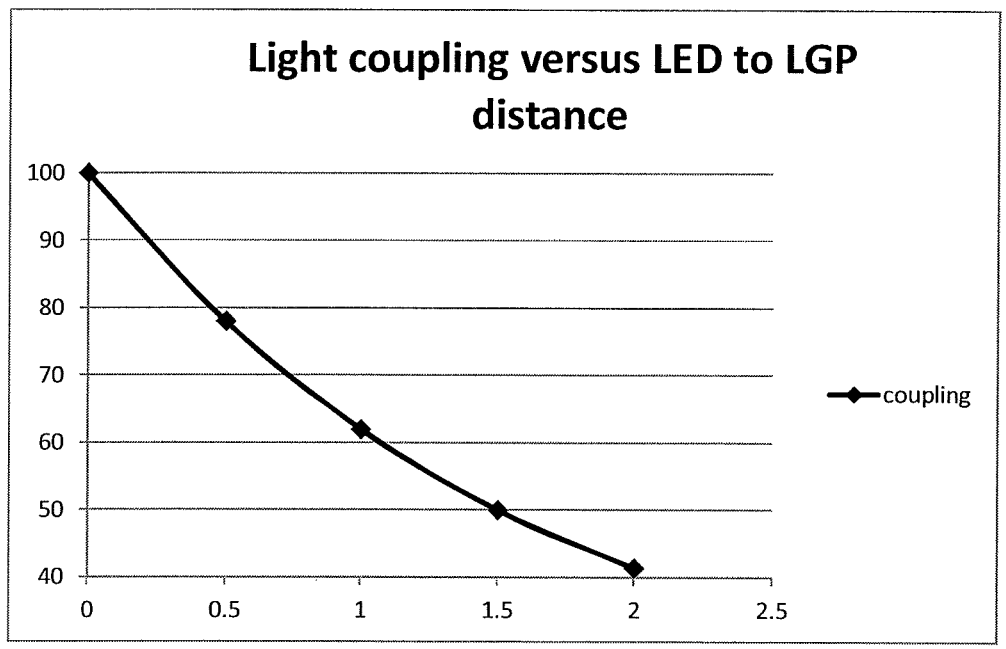
FIG. 4 is a graph showing an expected coupling (without Fresnel losses) as a function of distance between the LGP and LED for a 2 mm thick LED's coupled into a 2 mm thick LGP.

FIG. 4 is a graph showing an expected coupling (without Fresnel losses) as a function of distance between the LGP and LED for a 2 mm thick LED's coupled into a 2 mm thick LGP. With reference to FIG. 4, light injection in an exemplary embodiment usually involves placing the LGP in direct proximity to one or more light emitting diodes (LEDs). According to one or more embodiments, efficient coupling of light from an LED to the LGP involves using LED with a thickness or height that is less than or equal to the thickness of the glass. Thus, according to one or more embodiments, the distance from the LED to the LGP can be controlled to improve LED light injection. FIG. 4 shows the expected coupling (without Fresnel losses) as a function of that distance and considering 2 mm height LED's coupled into a 2 mm thick LGP. According to FIG. 4, the distance should be <about 0.5 mm to keep coupling >about 80%. When plastic such as PMMA is used as a conventional LGP material, putting the LGP in physical contact with the LED's is somewhat problematic. First, a minimum distance is needed to let the material expand. Also LEDs tend to heat up significantly and, in case of physical contact, PMMA can get close to its Tg (105° C. for PMMA). The temperature elevation that was measured when putting PMMA in contact with LED's was about 50° C. close by the LEDs. Thus for PMMA LGP, a minimum air gap is needed which degrades the coupling as shown in FIG. 4. According to embodiments of the subject matter in which glass LGPs are utilized, heating the glass is not a problem since Tg of glass is much higher and physical contact may actually be an advantage since glass has a thermal conduction coefficient that is large enough to make the LGP to be one additional heat dissipation mechanism.

Figure 5:
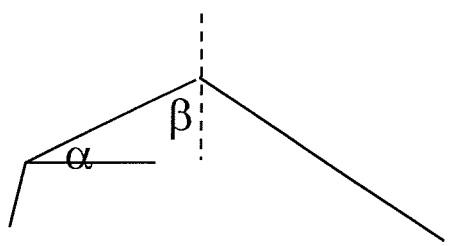
FIG. 5 is a pictorial illustration of a coupling mechanism from an LED to a glass LGP.

FIG. 5 is a pictorial illustration of a coupling mechanism from an LED to a glass LGP. With reference to FIG. 5, assuming that the LED is close to a lambertian emitter and assuming the glass index of refraction is about 1.5, the angle α will stay smaller than 41.8 degrees (as in (1/1.5)) and the angle β will stay larger than 48.2 degrees (90−α). Since total internal reflection (TIR) angle is about 41.8 degrees, this means that all the light remains internal to the guide and coupling is close to 100%. At the level of the LED injection, the injection face may cause some diffusion which will increase the angle at which light is propagating into the LGP. In the event this angle becomes larger than the TIR angle, light may leak out of the LGP resulting in coupling losses. However, the condition for not introducing significant losses is that the angle in which light gets scattered should be less than 48.2-41.8=+/−6.4 degrees (scattering angle <12.8 degrees). Thus, according to one or more embodiments, a plurality of the edges of the LGP may have a mirror polish to improve LED coupling and TIR. In some embodiments, three of the four edges have a mirror polish. Of course, these angles are exemplary only and should not limit the scope of the claims appended herewith as exemplary scattering angles can be <20 degrees, <19 degrees, <18 degrees, <17 degrees, <16 degrees, <14 degrees, <13 degrees, <12 degrees, <11 degrees, or <10 degrees. Further, exemplary diffusion angles in reflection can be, but are not limited to, <15 degrees, <14 degrees, <13 degrees, <12 degrees, <11 degrees, <10 degrees, <9 degrees, <8 degrees, <7 degrees, <6 degrees, <5 degrees, <4 degrees, or <3 degrees.

Figure 6:
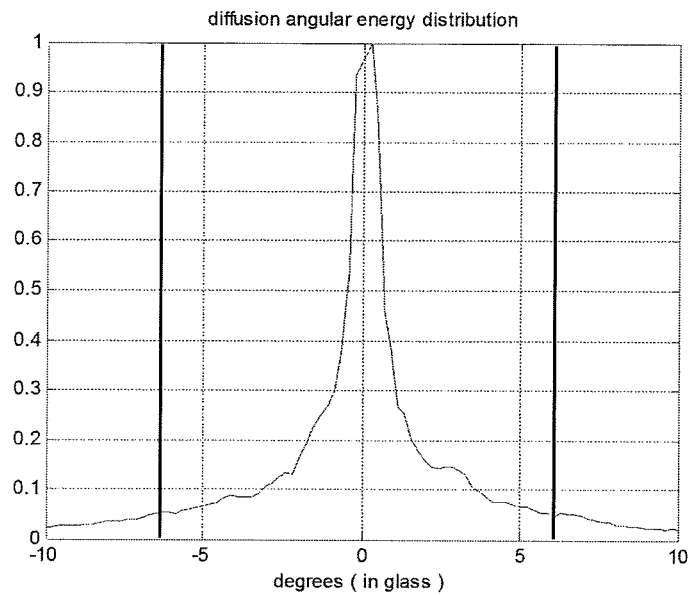
FIG. 6 is a graph showing an expected angular energy distribution calculated from surface topology.

FIG. 6 is a graph showing an expected angular energy distribution calculated from surface topology. With reference to FIG. 6, the typical texture of a grinded only edge is illustrated where roughness amplitude is relatively high (on the order of 1 nm) but special frequencies are relatively low (on the order of 20 microns) resulting in a low scattering angle. Further, this figure illustrates the expected angular energy distribution calculated from the surface topology. As can be seen, scattering angle can be much less than 12.8 degrees full width half maximum (FWHM).

In terms of surface definition, a surface can be characterized by a local slope distribution θ(x,y) that can be calculated, for instance, by taking the derivative of the surface profile. The angular deflection in the glass can be calculated, in first approximation as:

$$\theta'(x,y) = \theta(x,y)/n$$

Therefore, the condition on the surface roughness is θ (x,y)<n*6.4 degrees with TIR at the 2 adjacent edges.

Figure 7:
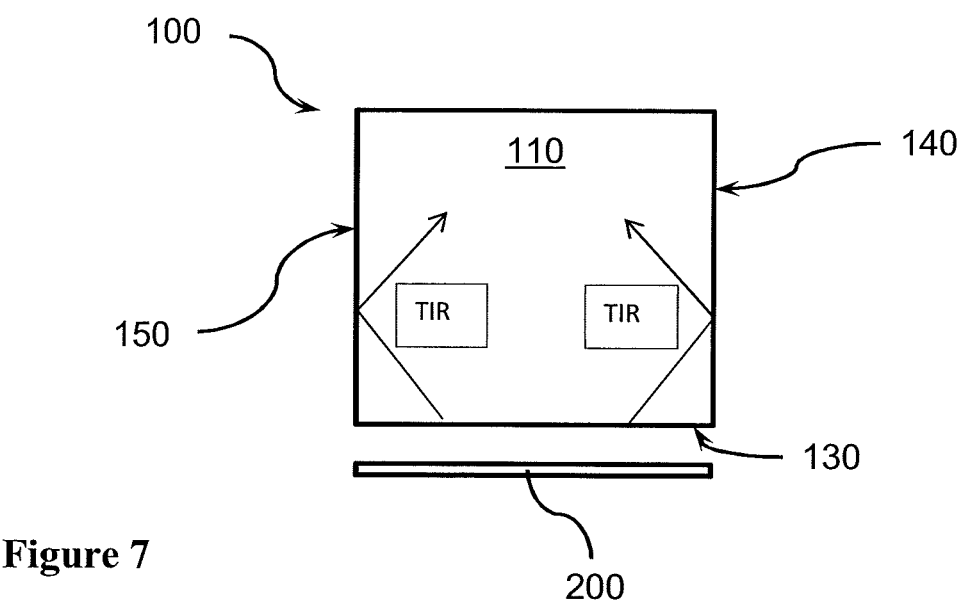
FIG. 7 is a pictorial illustration showing total internal reflection of light at two adjacent edges of a glass LGP.

FIG. 7 is a pictorial illustration showing total internal reflection of light at two adjacent edges of a glass LGP. With reference to FIG. 7, light injected into a first edge 130 can be incident on a second edge 140 adjacent to the injection edge and a third edge 150 adjacent to the injection edge, where the second edge 140 is opposite the third edge 150. The second and third edges may also have a low roughness so that the incident light undergoes total internal reflectance (TIR) from the two edges adjacent the first edge. In the event light is diffused or partially diffused at those interfaces, light may leak from each of those edges, thereby making the edges of an image appear darker. In some embodiments, light may be injected into the first edge 130 from an array of LED's 200 positioned along the first edge 130. The LED's may be located a distance of less than 0.5 mm from the light injection edge. According to one or more embodiments, the LED's may have a thickness or height that is less than or equal to the thickness of the glass sheet to provide efficient light coupling to the light guide plate 100. As discussed with reference to FIG. 1, FIG. 7 shows a single edge 130 injected with light, but the claimed subject matter should not be so limited as any one or several of the edges of an exemplary embodiment 100 can be injected with light. For example, in some embodiments, the first edge 130 and its opposing edge can both be injected with light. Additional embodiments may inject light at the second edge 140 and its opposing edge 150 rather than the first edge 130 and/or its opposing edge. According to one or more embodiments, the two edges 140, 150 may have a diffusion angle in reflection that is below 6.4 degrees such that the condition on the roughness shape is represented by θ (x,y)<6.4/2=3.2 degrees.

LCD Panel Rigidity

One attribute of LCD panels is the overall thickness. In conventional attempts to make thinner structures, lack of sufficient stiffness has become a serious problem. Stiffness, however, can be increased with an exemplary glass LGP since the elastic modulus of glass is considerably larger than that of PMMA. In some embodiments, to obtain a maximum benefit from a stiffness point of view, all elements of the panel can be bonded together at the edge.

Figure 8:
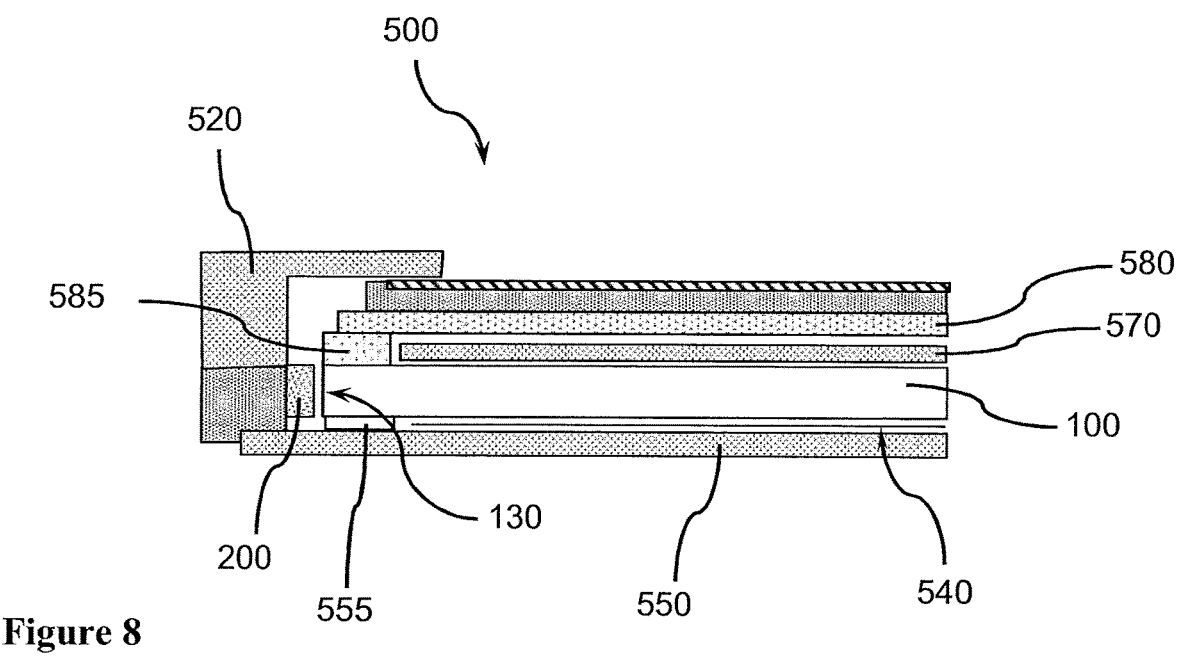
FIG. 8 is a cross sectional illustration of an exemplary LCD panel with a LGP in accordance with one or more embodiments.

FIG. 8 is a cross sectional illustration of an exemplary LCD panel with a LGP in accordance with one or more embodiments. With reference to FIG. 8, an exemplary embodiment of a panel structure 500 is provided. The structure comprises an LGP 100 mounted on a back plate 550 through which light can travel and be redirected toward the LCD or an observer. A structural element 555 may affix the LGP 100 to the back plate 550, and create a gap between the back face of the LGP and a face of the back plate. A reflective and/or diffusing film 540 may be positioned between the back face of the LGP 100 and the back plate 550 to send recycled light back through the LGP 100. A plurality of LEDs, organic light emitting diodes (OLEDs), or cold cathode fluorescent lamps (CCFLs) may be positioned adjacent to the light injection edge 130 of the LGP, where the LEDs have the same width as the thickness of the LGP 100, and are at the same height as the LGP 100. In other embodiments, the LEDs have a greater width and/or height as the thickness of the LGP 100. Conventional LCDs may employ LEDs or CCFLs packaged with color converting phosphors to produce white light. One or more backlight film(s) 570 may be positioned adjacent the front face of the LGP 100. An LCD panel 580 may also be positioned above the front face of the LGP 100 with a structural element 585, and the backlight film(s) 570 may be located in the gap between the LGP 100 and LCD panel 580. Light from the LGP 100 can then pass through the film 570, which can backscatter high angle light and reflect low angle light back toward the reflector film 540 for recycling and may serve to concentrate light in the forward direction (e.g., toward the user). A bezel 520 or other structural member may hold the layers of the assembly in place. A liquid crystal layer (not shown) may be used and may comprise an electro-optic material, the structure of which rotates upon application of an electric field, causing a polarization rotation of any light passing through it. Other optical components can include, e.g., prism films, polarizers, or TFT arrays, to name a few. According to various embodiments, the angular light filters disclosed herein can be paired with a transparent light guide plate in a transparent display device. In some embodiments, the LGP can be bonded to the structure (using optically clear adhesive OCA or pressure sensitive adhesive PSA) where the LGP is placed in optical contact with some of the structural elements of the panel. In other words, some of the light may leak out of the light guide through the adhesive. This leaked light can become scattered or absorbed by those structural elements. As explained above, the first edge where the LEDs are coupled into the LGP and the two adjacent edges where the light needs to be reflected in TIR can avoid this problem if properly prepared.

Exemplary widths and heights of the LGP generally depend upon the size of the respective LCD panel. It should be noted that embodiments of the present subject matter are applicable to any size LCD panel whether small (<40" diagonal) or large (>40" diagonal) displays. Exemplary dimensions for LGPs include, but are not limited to, 20", 30", 40", 50", 60" diagonal or more.

Figure 9:
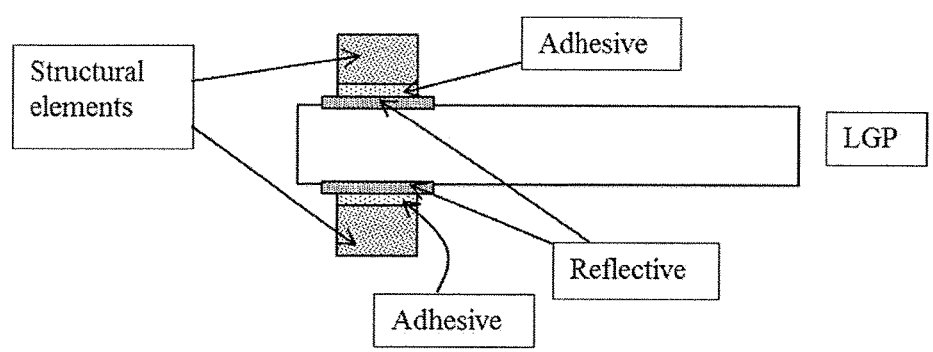
FIG. 9 is a cross sectional illustration of an exemplary LCD panel with a LGP according to another embodiment.

FIG. 9 is a cross sectional illustration of an exemplary LCD panel with a LGP according to another embodiment. With reference to FIG. 9, additional embodiments can utilize a reflective layer. Losses in some embodiments can be minimized by inserting a reflective surface between the LGP and the epoxy by either metalizing the glass with, for instance, silver or inkjet print with reflective ink. In other embodiments, highly reflective films (such as Enhanced Specular Reflector films (made by 3M)) may be laminated with the LGP.

Figure 10:
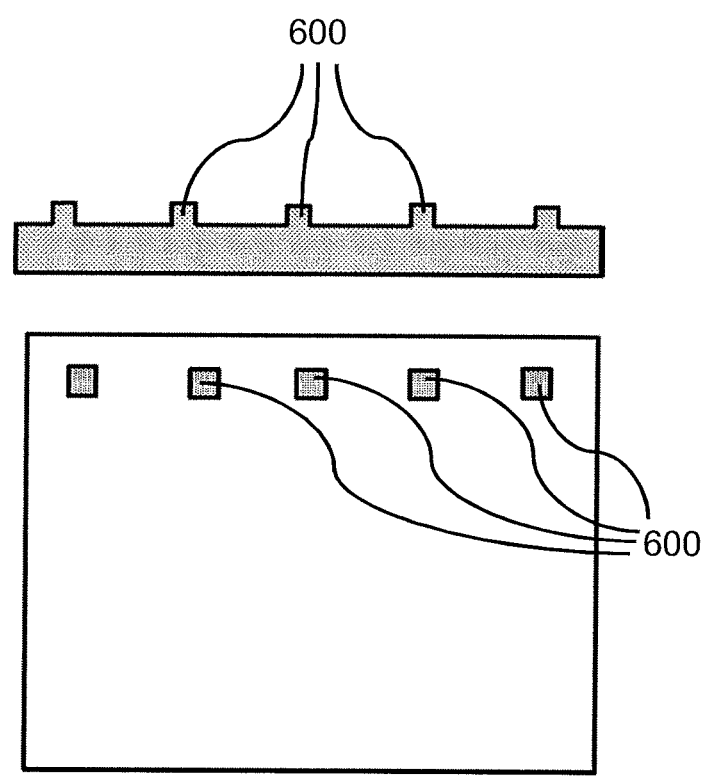
FIG. 10 is a pictorial illustration showing an LGP with adhesion pads according to additional embodiments.

FIG. 10 is a pictorial illustration showing an LGP with adhesion pads according to additional embodiments. With reference to FIG. 10, adhesion pads instead of a continuous adhesive can be used in which the pads 600 are shown as a series of dark squares. Thus, to limit the surface of LGP that is optically connected to the structural elements, the illustrated embodiment can employ 5×5 mm square pads every 50 mm to provide sufficient adhesion where extracted light is less than 4%. Of course, the pads 600 may be circular or another polygon in form and may be provided in any array or spacing and such a description should not limit the scope of the claims appended herewith.

Color Shift Compensation

In prior glasses although decreasing iron concentration minimized absorption and yellow shift, it was difficult to eliminate it completely. The $\Delta x$, $\Delta y$ in the measured for PMMA for a propagation distance of about 700 mm was 0.0021 and 0.0063. In exemplary glasses having the compositional ranges described herein, the color shift $\Delta y$ was <0.015 and in exemplary embodiments was less than 0.0021, and less than 0.0063. For example, in some embodiments, the color shift was measured as 0.007842 and in other embodiments was measured as 0.005827. In other embodiments, an exemplary glass sheet can comprise a color shift $\Delta y$ less than 0.015, such as ranging from about 0.001 to about 0.015 (e.g., about 0.001, 0.002, 0.003, 0.004, 0.005, 0.006, 0.007, 0.008, 0.009, 0.010, 0.011, 0.012, 0.013, 0.014, or 0.015). In other embodiments, the transparent substrate can comprise a color shift less than 0.008, less than about 0.005, or less than about 0.003. Color shift may be characterized by measuring variation in the x and/or y chromaticity coordinates along a length L using the CIE 1931 standard for color measurements for a given source illumination. For exemplary glass light-guide plates the color shift $\Delta y$ can be reported as $\Delta y = y(L_2) - y(L_1)$ where $L_2$ and $L_1$ are Z positions along the panel or substrate direction away from the source launch (e.g., LED or otherwise) and where $L_2 - L_1 = 0.5$ meters. Exemplary light-guide plates described herein have $\Delta y < 0.015$, $\Delta y < 0.005$, $\Delta y < 0.003$, or $\Delta y < 0.001$. The color shift of a light guide plate can be estimated by measuring the optical absorption of the light guide plate, using the optical absorption to calculate the internal transmission of the LGP over 0.5 m, and then multiplying the resulting transmission curve by a typical LED source used in LCD backlights such as the Nichia NFSW157D-E. One can then use the CIE color matching functions to compute the (X,Y,Z) tristimulus values of this spectrum. These values are then normalized by their sum to provide the (x,y) chromaticity coordinates. The difference between the (x,y) values of the LED spectrum multiplied by the 0.5 m LGP transmission and the (x,y) values of the original LED spectrum is the estimate of the color shift contribution of the light guide material. To address residual color shift, several exemplary solutions may be implemented. In one embodiment, light guide blue painting can be employed. By blue painting the light guide, one can artificially increase absorption in red and green and increase light extraction in blue. Accordingly, knowing how much differential color absorption exists, a blue paint pattern can be back calculated and applied that can compensate for color shift. In one or more embodiments, shallow surface scattering features can be employed to extract light with an efficiency that depends on the wavelength. As an example, a square grating has a maximum of efficiency when the optical path difference equals half of the wavelength. Accordingly, exemplary textures can be used to preferentially extract blue and can be added to the main light extraction texture. In additional embodiments, image processing can also be utilized. For example, an image filter can be applied that will attenuate blue close to the edge where light gets injected. This may require shifting the color of the LEDs themselves to keep the right white color. In further embodiments, pixel geometry can be used to address color shift by adjusting the surface ratio of the RGB pixels in the panel and increasing the surface of the blue pixels far away from the edge where the light gets injected.

Examples and Glass Compositions

Further to the exemplary compositions the attenuation impact of each element may be estimated by identifying the wavelength in the visible where it attenuates most strongly. In examples shown in Table 1 below, the coefficients of absorption of the various transition metals have been experimentally determined in relation to the concentrations of $Al_2O_3$ to $R_xO$ (however, only the modifier $Na_2O$ has been shown below for brevity).

TABLE 1

| | dB/ppm/500 mm | | |
|---|---|---|---|
| | $Al_2O_3 > Na_2O$ | $Al_2O_3 = Na_2O$ | $Al_2O_3 < Na_2O$ |
| V | 0.119 | 0.109 | 0.054 |
| Cr | 2.059 | 1.869 | 9.427 |
| Mn | 0.145 | 0.06 | 0.331 |
| Fe | 0.336 | 0.037 | 0.064 |
| Co | 1.202 | 2.412 | 3.7 |
| Ni | 0.863 | 0.617 | 0.949 |
| Cu | 0.108 | 0.092 | 0.11 |

With the exception of V (vanadium), a minimum attenuation is found for glasses with concentrations of $Al_2O_3 = Na_2O$, or more generally for $Al_2O_3 \sim R_xO$. In various instances the transition metals may assume two or more valences (e.g., Fe can be both +2 and +3), so to some extent the redox ratio of these various valences may be impacted by the bulk composition. Transition metals respond differently to what are known as "crystal field" or "ligand field" effects that arise from interactions of the electrons in their partially-filled d-orbital with the surrounding anions (oxygen, in this case), particularly if there are changes in the number of anion nearest neighbors (also referred to as coordination number). Thus, it is likely that both redox ratio and crystal field effects contribute to this result.

The coefficients of absorption of the various transition metals may also be utilized to determine the attenuation of the glass composition over a path length in the visible spectrum (i.e., between 380 and 700 nm) and address solarization issues, as shown in Table 2 below and discussed in further detail below.

TABLE 2

| | |
|---|---|
| $Al_2O_3 - R_xO = 4$ | 0.119V + 2.059Cr + 0.145Mn + 0.336Fe + 1.202Co + 0.863Ni + 0.108Cu < 2 |
| $Al_2O_3 \sim R_xO = 0$ | 0.109V + 1.869Cr + 0.06Mn + 0.037Fe + 2.412Co + 0.617Ni + 0.092Cu < 2 |
| $Al_2O_3 < R_xO = -4$ | 0.054V + 9.427Cr + 0.331Mn + 0.064Fe + 3.7Co + 0.949Ni + 0.11Cu < 2 |

Of course the values identified in Table 2 are exemplary only should not limit the scope of the claims appended herewith. For example, it was also unexpectedly discovered that a high transmittance glass could be obtained when Fe+30Cr+35Ni<60 ppm. In some embodiments, the concentration of Fe can be <about 50 ppm, <about 40 ppm, <about 30 ppm, <about 20 ppm, or <about 10 ppm. In other embodiments, Fe+30Cr+35Ni<about 50 ppm, <about 40 ppm, <about 30 ppm, <about 20 ppm, or <about 10 ppm. It was also unexpectedly discovered that the addition of certain transition metal oxides that do not cause absorption from 300 nm to 650 nm and that have absorption bands <about 300 nm will prevent network defects from forming processes and will prevent color centers (e.g., absorption of light from 300 nm to 650 nm) post UV exposure when curing ink since the bond by the transition metal oxide in the glass network will absorb the light instead of allowing the light to break up the fundamental bonds of the glass network. Thus, exemplary embodiments can include any one or combination of the following transition metal oxides to minimize UV color center formation: from about 0.1 mol % to about 3.0 mol % zinc oxide; from about 0.1 mol % to about 1.0 mol % titanium oxide; from about 0.1 mol % to about 1.0 mol % vanadium oxide; from about 0.1 mol % to about 1.0 mol % niobium oxide; from about 0.1 mol % to about 1.0 mol % manganese oxide; from about 0.1 mol % to about 1.0 mol % zirconium oxide; from about 0.1 mol % to about 1.0 mol % arsenic oxide; from about 0.1 mol % to about 1.0 mol % tin oxide; from about 0.1 mol % to about 1.0 mol % molybdenum oxide; from about 0.1 mol % to about 1.0 mol % antimony oxide; from about 0.1 mol % to about 1.0 mol % cerium oxide; and all subranges therebetween of any of the above listed transition metal oxides. In some embodiments, an exemplary glass can contain from 0.1 mol % to less than or no more than about 3.0 mol % of any combination of zinc oxide, titanium oxide, vanadium oxide, niobium oxide, manganese oxide, zirconium oxide, arsenic oxide, tin oxide, molybdenum oxide, antimony oxide, and cerium oxide Tables 3A, 3B, 4A, and 4B provide some exemplary non-limiting examples of glasses prepared for embodiments of the present subject matter.

TABLE 3A

|  | wt % | mol % |
|---|---|---|
| $SiO_2$ | 66.72 | 77.22 |
| $SiO_2$ (diff) | 67.003 |  |
| $Al_2O_3$ | 12 | 7.62 |
| $B_2O_3$ | 8.15 | 7.58 |
| $Li_2O$ | 0 | 0 |
| $Na_2O$ | 7.73 | 8.08 |
| $K_2O$ | 0.013 | 0.01 |
| ZnO | 0 | 0 |
| MgO | 1.38 | 2.22 |
| CaO | 0.029 | 0.03 |
| SrO | 3.35 | 2.09 |
| BaO |  | 0.08 |
| $SnO_2$ | 0.176 | 0.08 |
| $Fe_2O_3$ | 0.12 |  |

TABLE 3B

|  | wt % | mol % |
|---|---|---|
| $SiO_2$ | 74.521 | 76.27 |
| $SiO_2$ (diff) | 74.431 |  |
| $Al_2O_3$ | 7.214 | 4.36 |
| $B_2O_3$ | 0 | 0 |
| $Li_2O$ | 0 | 0 |
| $Na_2O$ | 10.197 | 10.13 |
| $K_2O$ | 0.003 | 0 |
| ZnO | 1.577 | 1.19 |

TABLE 3B-continued

|  | wt % | mol % |
|---|---|---|
| MgO | 4.503 | 6.88 |
| CaO | 0.03 | 0.03 |
| SrO | 1.69 | 1 |
| BaO | 0.031 | 0.01 |
| $SnO_2$ | 0.224 | 0.09 |
| $Fe_2O_3$ |  |  |

TABLE 4A

|  | wt % | mol % |
|---|---|---|
| $SiO_2$ | 74.749 | 76.37 |
| $SiO_2$ (diff) | 74.847 |  |
| $Al_2O_3$ | 8.613 | 5.18 |
| $B_2O_3$ | 0 | 0 |
| $Li_2O$ | 0 | 0 |
| $Na_2O$ | 11.788 | 11.66 |
| $K_2O$ | 0.003 | 0 |
| ZnO | 0 | 0 |
| MgO | 4.344 | 6.61 |
| CaO | 0.027 | 0.03 |
| SrO | 0 | 0 |
| BaO | 0 | 0 |
| $SnO_2$ | 0.24 | 0.1 |
| $Fe_2O_3$ | 0.128 |  |

TABLE 4B

|  | wt % | mol % |
|---|---|---|
| $SiO_2$ | 73.38 | 76.17 |
| $SiO_2$ (diff) | 73.823 |  |
| $Al_2O_3$ | 7.15 | 4.35 |
| $B_2O_3$ | 0 | 0 |
| $Li_2O$ | 0 | 0 |
| $Na_2O$ | 8.55 | 8.56 |
| $K_2O$ | 2.40 | 1.58 |
| ZnO | 1.57 | 1.2 |
| MgO | 4.50 | 6.92 |
| CaO | 0.05 | 0.05 |
| SrO | 1.74 | 1.04 |
| BaO | 0 | 0 |
| $SnO_2$ | 0.22 | 0.09 |
| $Fe_2O_3$ |  |  |

Exemplary compositions as heretofore described can thus be used to achieve a strain point ranging from about 525° C. to about 575° C., from about 540° C. to about 570° C., or from about 545° C. to about 565° C. and all subranges therebetween. In one embodiment, the strain point is about 547° C., and in another embodiment, the strain point is about 565° C. An exemplary annealing point can range from about 575° C. to about 625° C., from about 590° C. to about 620° C., and all subranges therebetween. In one embodiment, the annealing point is about 593° C., and in another embodiment, the annealing point is about 618° C. An exemplary softening point of a glass ranges from about 800° C. to about 890° C., from about 820° C. to about 880° C., or from about 835° C. to about 875° C. and all subranges therebetween. In one embodiment, the softening point is about 836.2° C., in another embodiment, the softening point is about 874.7° C. The density of exemplary glass compositions can range from about 1.95 gm/cc @ 20° C. to about 2.7 gm/cc @ 20° C., from about 2.1 gm/cc @ 20° C. to about 2.4 gm/cc @ 20° C., or from about 2.3 gm/cc @ 20° C. to about 2.4 gm/cc @ 20° C. and all subranges therebetween. In one embodiment the density is about 2.389 gm/cc @ 20° C., and in another embodiment the density is about 2.388 gm/cc @ 20° C.

CTEs (0-300° C.) for exemplary embodiments can range from about 30×10-7/° C. to about 95×10-7/° C., from about 50×10-7/° C. to about 80×10-7/° C., or from about 55×10-7/° C. to about 80×10-7/° C. and all subranges therebetween. In one embodiment the CTE is about 55.7×10-7/° C. and in another embodiment the CTE is about 69×10-7/° C.

Certain embodiments and compositions described herein have provided an internal transmission from 400-700 nm greater than 90%, greater than 91%, greater than 92%, greater than 93%, greater than 94%, and even greater than 95%. Internal transmittance can be measured by comparing the light transmitted through a sample to the light emitted from a source. Broadband, incoherent light may be cylindrically focused on the end of the material to be tested. The light emitted from the far side may be collected by an integrating sphere fiber coupled to a spectrometer and forms the sample data. Reference data is obtained by removing the material under test from the system, translating the integrating sphere directly in front of the focusing optic, and collecting the light through the same apparatus as the reference data. The absorption at a given wavelength is then given by:

$$\text{absorption(dB/m)} = \frac{-10 \log \frac{T_{sample\ data}}{T_{reference\ data}}}{(\text{Pathlength}_{sample\ data} - \text{Pathlength}_{reference\ data})}$$

The internal transmittance over 0.5 m is given by:

$$\text{Transmittance (\%)} = 100 \times 10^{-absorption \times 0.5/10}$$

Thus, exemplary embodiments described herein can have an internal transmittance at 450 nm with 500 mm in length of greater than 85%, greater than 90%, greater than 91%, greater than 92%, greater than 93%, greater than 94%, and even greater than 95%. Exemplary embodiments described herein can also have an internal transmittance at 550 nm with 500 mm in length of greater than 90%, greater than 91%, greater than 92%, greater than 93%, greater than 94%, and even greater than 96%. Further embodiments described herein can have a transmittance at 630 nm with 500 mm in length of greater than 85%, greater than 90%, greater than 91%, greater than 92%, greater than 93%, greater than 94%, and even greater than 95%.

In one or more embodiments, the LGP has a width of at least about 1270 mm and a thickness of between about 0.5 mm and about 3.0 mm, wherein the transmittance of the LGP is at least 80% per 500 mm. In various embodiments, the thickness of the LGP is between about 1 mm and about 8 mm, and the width of the plate is between about 1100 mm and about 1300 mm.

In one or more embodiments, the LGP can be strengthened. For example, certain characteristics, such as a moderate compressive stress (CS), high depth of compressive layer (DOL), and/or moderate central tension (CT) can be provided in an exemplary glass sheet used for a LGP. One exemplary process includes chemically strengthening the glass by preparing a glass sheet capable of ion exchange. The glass sheet can then be subjected to an ion exchange process, and thereafter the glass sheet can be subjected to an anneal process if necessary. Of course, if the CS and DOL of the glass sheet are desired at the levels resulting from the ion exchange step, then no annealing step is required. In other embodiments, an acid etching process can be used to increase the CS on appropriate glass surfaces. The ion exchange process can involve subjecting the glass sheet to a molten salt bath including $KNO_3$, preferably relatively pure $KNO_3$ for one or more first temperatures within the range of about 400-500° C. and/or for a first time period within the range of about 1-24 hours, such as, but not limited to, about 8 hours. It is noted that other salt bath compositions are possible and would be within the skill level of an artisan to consider such alternatives. Thus, the disclosure of $KNO_3$ should not limit the scope of the claims appended herewith. Such an exemplary ion exchange process can produce an initial CS at the surface of the glass sheet, an initial DOL into the glass sheet, and an initial CT within the glass sheet. Annealing can then produce a final CS, final DOL and final CT as desired.

EXAMPLES

The following examples are set forth below to illustrate the methods and results according to the disclosed subject matter. These examples are not intended to be inclusive of all embodiments of the subject matter disclosed herein, but rather to illustrate representative methods and results. These examples are not intended to exclude equivalents and variations of the present disclosure which are apparent to one skilled in the art.

Efforts have been made to ensure accuracy with respect to numbers (e.g., amounts, temperature, etc.) but some errors and deviations should be accounted for. Unless indicated otherwise, temperature is in ° C. or is at ambient temperature, and pressure is at or near atmospheric. The compositions themselves are given in mole percent on an oxide basis and have been normalized to 100%. There are numerous variations and combinations of reaction conditions, e.g., component concentrations, temperatures, pressures and other reaction ranges and conditions that can be used to optimize the product purity and yield obtained from the described process. Only reasonable and routine experimentation will be required to optimize such process conditions.

The glass properties set forth herein and in Table 5 below were determined in accordance with techniques conventional in the glass art. Thus, the linear coefficient of thermal expansion (CTE) over the temperature range 25-300° C. is expressed in terms of ×10-7/° C. and the annealing point is expressed in terms of ° C. These were determined from fiber elongation techniques (ASTM references E228-85 and C336, respectively). The density in terms of grams/cm3 was measured via the Archimedes method (ASTM C693). The melting temperature in terms of ° C. (defined as the temperature at which the glass melt demonstrates a viscosity of 200 poises) was calculated employing a Fulcher equation fit to high temperature viscosity data measured via rotating cylinders viscometry (ASTM C965-81).

The liquidus temperature of the glass in terms of ° C. was measured using the standard gradient boat liquidus method of ASTM C829-81. This involves placing crushed glass particles in a platinum boat, placing the boat in a furnace having a region of gradient temperatures, heating the boat in an appropriate temperature region for 24 hours, and determining by means of microscopic examination the highest temperature at which crystals appear in the interior of the glass. More particularly, the glass sample is removed from the Pt boat in one piece, and examined using polarized light microscopy to identify the location and nature of crystals which have formed against the Pt and air interfaces, and in the interior of the sample. Because the gradient of the furnace is very well known, temperature vs. location can be well estimated, within 5-10° C. The temperature at which crystals are observed in the internal portion of the sample is taken to represent the liquidus of the glass (for the corresponding test period). Testing is sometimes carried out at longer times (e.g. 72 hours), to observe slower growing phases. The liquidus viscosity in poises was determined from the liquidus temperature and the coefficients of the Fulcher equation. If included, Young's modulus values in terms of GPa were determined using a resonant ultrasonic spectroscopy technique of the general type set forth in ASTM E1875-00e1.

The exemplary glasses of the tables herein were prepared using a commercial sand as a silica source, milled such that 90% by weight passed through a standard U.S. 100 mesh sieve. Alumina was the alumina source, periclase was the source for MgO, limestone the source for CaO, strontium carbonate, strontium nitrate or a mix thereof was the source for SrO, barium carbonate was the source for BaO, and tin (IV) oxide was the source for $SnO_2$. The raw materials were thoroughly mixed, loaded into a platinum vessel suspended in a furnace heated by silicon carbide glowbars, melted and stirred for several hours at temperatures between 1600 and 1650° C. to ensure homogeneity, and delivered through an orifice at the base of the platinum vessel. The resulting patties of glass were annealed at or near the annealing point, and then subjected to various experimental methods to determine physical, viscous and liquidus attributes.

These methods are not unique, and the glasses of the tables herein can be prepared using standard methods well-known to those skilled in the art. Such methods include a continuous melting process, such as would be performed in a continuous melting process, wherein the melter used in the continuous melting process is heated by gas, by electric power, or combinations thereof.

Raw materials appropriate for producing exemplary glasses include commercially available sands as sources for $SnO_2$; alumina, aluminum hydroxide, hydrated forms of alumina, and various aluminosilicates, nitrates and halides as sources for $Al_2O_3$; boric acid, anhydrous boric acid and boric oxide as sources for $B_2O_3$; periclase, dolomite (also a source of CaO), magnesia, magnesium carbonate, magnesium hydroxide, and various forms of magnesium silicates, aluminosilicates, nitrates and halides as sources for MgO; limestone, aragonite, dolomite (also a source of MgO), wolastonite, and various forms of calcium silicates, aluminosilicates, nitrates and halides as sources for CaO; and oxides, carbonates, nitrates and halides of strontium and barium. If a chemical fining agent is desired, tin can be added as $SnO_2$, as a mixed oxide with another major glass component (e.g., $CaSnO_3$), or in oxidizing conditions as SnO, tin oxalate, tin halide, or other compounds of tin known to those skilled in the art.

The glasses in the tables herein can contain $SnO_2$ as a fining agent, but other chemical fining agents could also be employed to obtain glass of sufficient quality for display applications. For example, exemplary glasses could employ any one or combinations of $As_2O_3$, $Sb_2O_3$, $CeO_2$, $Fe_2O_3$, and halides as deliberate additions to facilitate fining, and any of these could be used in conjunction with the $SnO_2$ chemical fining agent shown in the examples. Of these, $As_2O_3$ and $Sb_2O_3$ are generally recognized as hazardous materials, subject to control in waste streams such as might be generated in the course of glass manufacture or in the processing of TFT panels. It is therefore desirable to limit the concentration of $As_2O_3$ and $Sb_2O_3$ individually or in combination to no more than 0.005 mol %.

In addition to the elements deliberately incorporated into exemplary glasses, nearly all stable elements in the periodic table are present in glasses at some level, either through low levels of contamination in the raw materials, through high-temperature erosion of refractories and precious metals in the manufacturing process, or through deliberate introduction at low levels to fine tune the attributes of the final glass. For example, zirconium may be introduced as a contaminant via interaction with zirconium-rich refractories. As a further example, platinum and rhodium may be introduced via interactions with precious metals. As a further example, iron may be introduced as a tramp in raw materials, or deliberately added to enhance control of gaseous inclusions. As a further example, manganese may be introduced to control color or to enhance control of gaseous inclusions.

Hydrogen is inevitably present in the form of the hydroxyl anion, OH—, and its presence can be ascertained via standard infrared spectroscopy techniques. Dissolved hydroxyl ions significantly and nonlinearly impact the annealing point of exemplary glasses, and thus to obtain the desired annealing point it may be necessary to adjust the concentrations of major oxide components so as to compensate. Hydroxyl ion concentration can be controlled to some extent through choice of raw materials or choice of melting system. For example, boric acid is a major source of hydroxyls, and replacing boric acid with boric oxide can be a useful means to control hydroxyl concentration in the final glass. The same reasoning applies to other potential raw materials comprising hydroxyl ions, hydrates, or compounds comprising physisorbed or chemisorbed water molecules. If burners are used in the melting process, then hydroxyl ions can also be introduced through the combustion products from combustion of natural gas and related hydrocarbons, and thus it may be desirable to shift the energy used in melting from burners to electrodes to compensate. Alternatively, one might instead employ an iterative process of adjusting major oxide components so as to compensate for the deleterious impact of dissolved hydroxyl ions.

Sulfur is often present in natural gas, and likewise is a tramp component in many carbonate, nitrate, halide, and oxide raw materials. In the form of $SO_2$, sulfur can be a troublesome source of gaseous inclusions. The tendency to form $SO_2$-rich defects can be managed to a significant degree by controlling sulfur levels in the raw materials, and by incorporating low levels of comparatively reduced multivalent cations into the glass matrix. While not wishing to be bound by theory, it appears that $SO_2$-rich gaseous inclusions arise primarily through reduction of sulfate ($SO_4^+$) dissolved in the glass. The elevated barium concentrations of exemplary glasses appear to increase sulfur retention in the glass in early stages of melting, but as noted above, barium is required to obtain low liquidus temperature, and hence high T35k-Tliq and high liquidus viscosity. Deliberately controlling sulfur levels in raw materials to a low level is a useful means of reducing dissolved sulfur (presumably as sulfate) in the glass. In particular, sulfur is preferably less than 200 ppm by weight in the batch materials, and more preferably less than 100 ppm by weight in the batch materials.

Reduced multivalents can also be used to control the tendency of exemplary glasses to form $SO_2$ blisters. While not wishing to be bound to theory, these elements behave as potential electron donors that suppress the electromotive force for sulfate reduction. Sulfate reduction can be written in terms of a half reaction such as $SO_4=SO_2+O_2+2e-$ Where e– denotes an electron. The "equilibrium constant" for the half reaction is $K_{eq}=[SO_2][O_2][e-]2/[SO_4^+]$ where the brackets denote chemical activities. Ideally one would like to force the reaction so as to create sulfate from $SO_2$, $O_2$ and 2e–. Adding nitrates, peroxides, or other oxygen-rich raw materials may help, but also may work against sulfate reduction in the early stages of melting, which may counteract the benefits of adding them in the first place. $SO_2$ has very low solubility in most glasses, and so is impractical to add to the glass melting process. Electrons may be "added" through reduced multivalents. For example, an appropriate electron-donating half reaction for ferrous iron ($Fe^{2+}$) is expressed as $2Fe^{2+} \rightarrow 2Fe^{3+}+2e-$.

This "activity" of electrons can force the sulfate reduction reaction to the left, stabilizing $SO_4^-$ in the glass. Suitable reduced multivalents include, but are not limited to, $Fe^{2+}$, $Mn^{2+}$, $Sn^{2+}$, $Sb^{3+}$, $As^{3+}$, $V^{3+}$, $Ti^{3+}$, and others familiar to those skilled in the art. In each case, it may be important to minimize the concentrations of such components so as to avoid deleterious impact on color of the glass, or in the case of As and Sb, to avoid adding such components at a high enough level so as to complication of waste management in an end-user's process.

In addition to the major oxides components of exemplary glasses, and the minor or tramp constituents noted above, halides may be present at various levels, either as contaminants introduced through the choice of raw materials, or as deliberate components used to eliminate gaseous inclusions in the glass. As a fining agent, halides may be incorporated at a level of about 0.4 mol % or less, though it is generally desirable to use lower amounts if possible to avoid corrosion of off-gas handling equipment. In some embodiments, the concentrations of individual halide elements are below about 200 ppm by weight for each individual halide, or below about 800 ppm by weight for the sum of all halide elements.

In addition to these major oxide components, minor and tramp components, multivalents and halide lining agents, it may be useful to incorporate low concentrations of other colorless oxide components to achieve desired physical, solarization, optical or viscoelastic properties. Such oxides include, but are not limited to, $TiO_2$, $ZrO_2$, $HfO_2$, $Nb_2O_5$, $Ta_2O_5$, $MoO_3$, $WO_3$, $ZnO$, $In_2O_3$, $Ga_2O_3$, $Bi_2O_3$, $GeO_2$, $PbO$, $SeO_3$, $TeO_2$, $Y_2O_3$, $La_2O_3$, $Gd_2O_3$, and others known to those skilled in the art. By adjusting the relative proportions of the major oxide components of exemplary glasses, such colorless oxides can be added to a level of up to about 2 mol % to 3 mol % without unacceptable impact to annealing point, T35k-Tliq or liquidus viscosity. For example, some embodiments can include any one or combination of the following transition metal oxides to minimize UV color center formation: from about 0.1 mol % to about 3.0 mol % zinc oxide; from about 0.1 mol % to about 1.0 mol % titanium oxide; from about 0.1 mol % to about 1.0 mol % vanadium oxide; from about 0.1 mol % to about 1.0 mol % niobium oxide; from about 0.1 mol % to about 1.0 mol % manganese oxide; from about 0.1 mol % to about 1.0 mol % zirconium oxide; from about 0.1 mol % to about 1.0 mol % arsenic oxide; from about 0.1 mol % to about 1.0 mol % tin oxide; from about 0.1 mol % to about 1.0 mol % molybdenum oxide; from about 0.1 mol % to about 1.0 mol % antimony oxide; from about 0.1 mol % to about 1.0 mol % cerium oxide; and all subranges therebetween of any of the above listed transition metal oxides. In some embodiments, an exemplary glass can contain from 0.1 mol % to less than or no more than about 3.0 mol % of any combination of zinc oxide, titanium oxide, vanadium oxide, niobium oxide, manganese oxide, zirconium oxide, arsenic oxide, tin oxide, molybdenum oxide, antimony oxide, and cerium oxide.

Table 5 shows examples of glasses (samples 1-106) with high transmissibility as described herein.

TABLE 5

| | 1 | 2 | 3 | 4 | 5 | 6 | 7 |
|---|---|---|---|---|---|---|---|
| $SiO_2$ | 73.14 | 77.69 | 68.94 | 76.51 | 77.73 | 68.72 | 74.43 |
| $Al_2O_3$ | 6.95 | 3.95 | 9.06 | 3.97 | 4.22 | 9.13 | 6.44 |
| $B_2O_3$ | 0 | 0 | 7.21 | 0 | 0 | 7.21 | 3.74 |
| $Li_2O$ | 0 | 0.98 | 0 | 0 | 0 | 0 | 0 |
| $Na_2O$ | 10.78 | 9.76 | 10.02 | 8.79 | 10.74 | 10.17 | 9.8 |
| $K_2O$ | 0 | 0 | 0.6 | 0 | 0.02 | 0.63 | 0 |
| ZnO | 0 | 0.97 | 0 | 0.97 | 0.97 | 0 | 0.01 |
| MgO | 6.01 | 5.5 | 1.99 | 6.61 | 5.79 | 3.04 | 4.39 |
| CaO | 0.04 | 0.03 | 0.04 | 0.04 | 0.03 | 0.92 | 0.03 |
| SrO | 2.96 | 0.99 | 1.99 | 2.98 | 0.37 | 0 | 1.05 |
| BaO | 0 | 0.01 | 0 | 0 | 0 | 0 | 0 |
| $SnO_2$ | 0.07 | 0.09 | 0.1 | 0.09 | 0.09 | 0.09 | 0.08 |
| $R_2O/Al_2O_3$ | 1.55 | 2.72 | 1.17 | 2.21 | 2.55 | 1.18 | 1.52 |
| $(R_2O + RO)/Al_2O_3$ | 2.85 | 4.62 | 1.62 | 4.88 | 4.25 | 1.62 | 2.37 |
| $R_xO - Al_2O_3 - MgO$ | -2.18 | 1.29 | -0.43 | -1.79 | 0.75 | -1.37 | -1.03 |
| strain | 580 | 523 | 540 | 575 | 562 | 535 | 559 |
| anneal | 629 | 574 | 584 | 625 | 615 | 581 | 606 |
| soft | 871.4 | 830.8 | 806 | 868.9 | 867.6 | 823 | 841.5 |
| CTE | 68.5 | 64.9 | 66.5 | 61 | 64.5 | 66.6 | 62.4 |
| density | 2.477 | 2.418 | 2.425 | 2.469 | 2.401 | 2.382 | 2.401 |
| strain (bbv) | 574.7 | 522 | 532.2 | 572.1 | 560 | 531.6 | 551.4 |
| anneal (bbv) | 622.9 | 570.7 | 578 | 621 | 609.9 | 578.1 | 599.9 |
| last bbv visc | 12.012 | 12.012 | 611.8 | 12.0259 | 12.0249 | 613.8 | 12.0292 |
| last bbv T | 660.8 | 609.2 | 12.0146 | 659.3 | 648.8 | 12.0317 | 636.6 |
| soft (ppv) | | | | | | | |
| Color shift | | | | 0.005664 | | | 0.007524 |
| Viscosity | | | | | | | |
| A | -2.074 | -2.014 | -1.614 | -1.873 | -1.89 | -1.945 | -1.65 |
| B | 6417.4 | 6566.1 | 5769.2 | 5987.3 | 6330 | 6446.7 | 6045.6 |
| To | 205.2 | 140.9 | 188 | 228.4 | 193.9 | 152.3 | 194.5 |
| T (200P) | 1672 | 1663 | 1662 | 1663 | 1704 | 1671 | 1725 |

TABLE 5-continued

| 72 hr gradient boat | | | | | | | |
|---|---|---|---|---|---|---|---|
| Int | 1005 | 1010 | 935 | 1015 | 970 | 965 | 970 |
| int liq visc | 8.91E+05 | 347581.7 | | 5.48E+05 | 1.85E+06 | | 1.40E+06 |

| | 8 | 9 | 10 | 11 | 12 | 13 | 14 |
|---|---|---|---|---|---|---|---|
| $SiO_2$ | 76.23 | 72.53 | 74.49 | 70.26 | 72.16 | 68.99 | 69.58 |
| $Al_2O_3$ | 4.38 | 7.67 | 7.13 | 8.66 | 7.68 | 9.01 | 9.72 |
| $B_2O_3$ | 0 | 7.59 | 1.88 | 7.59 | 7.63 | 7.18 | 7.48 |
| $Li_2O$ | 0 | 0 | 0 | 0 | 0 | 0 | 0 |
| $Na_2O$ | 8.13 | 7.75 | 10.09 | 7.79 | 6.98 | 9.05 | 9.2 |
| $K_2O$ | 1.96 | 0.01 | 0 | 1.16 | 1.04 | 0.59 | 0.42 |
| ZnO | 1.17 | 0.96 | 0 | 0 | 0 | 0 | 0 |
| MgO | 6.95 | 1.23 | 3.43 | 2.26 | 2.25 | 3.05 | 2.37 |
| CaO | 0.05 | 0.03 | 0.03 | 0.04 | 0.04 | 0.04 | 0.03 |
| SrO | 1.01 | 2.09 | 2.8 | 2.09 | 2.09 | 1.92 | 1.06 |
| BaO | 0 | 0 | 0 | 0 | 0 | 0 | 0 |
| $SnO_2$ | 0.09 | 0.07 | 0.08 | 0.07 | 0.07 | 0.09 | 0.07 |
| $R_2O/Al_2O_3$ | 2.30 | 1.01 | 1.42 | 1.03 | 1.04 | 1.07 | 0.99 |
| $(R_2O + RO)/Al_2O_3$ | 4.40 | 1.57 | 2.29 | 1.54 | 1.61 | 1.63 | 1.35 |
| $R_xO - Al_2O_3 - MgO$ | −1.24 | −1.14 | −0.47 | −1.97 | −1.91 | −2.42 | −2.47 |
| strain | 564 | 543 | 567 | 543 | 544 | 547 | 550 |
| anneal | 616 | 589 | 614 | 589 | 591 | 591 | 598 |
| soft | 877.9 | 830.2 | 857.2 | 832.3 | 840.8 | 828.8 | 872.5 |
| CTE | 66.4 | 55.2 | 64.9 | 61.3 | 56.8 | 63.3 | 60.9 |
| density | 2.426 | 2.402 | 2.452 | 2.402 | 2.388 | 2.414 | 2.375 |
| strain (bbv) | 562.1 | 537.7 | 560.5 | 536.5 | 539.6 | 538.5 | 542 |
| anneal (bbv) | 613.5 | 584.9 | 607.9 | 585 | 588.1 | 585.7 | 593.2 |
| last bbv visc | 12.0302 | 12.0236 | 12.0205 | 620.6 | 625.3 | 620.5 | 631.4 |
| last bbv T | 654 | 621.7 | 644.7 | 12.0374 | 12.0301 | 12.0372 | 12.0026 |
| soft (ppv) | | | | | | | |
| Color shift | | | | | | | |
| Viscosity | | | | | | | |
| A | −2.187 | −1.802 | −1.739 | −1.9 | −1.9 | −1.946 | −2.425 |
| B | 6861.1 | 6467.9 | 6089.3 | 6503.7 | 6594.4 | 6398.2 | 7698.3 |
| To | 171.3 | 153.6 | 202 | 152.4 | 149.6 | 162.6 | 97.6 |
| T (200P) | 1700 | 1730 | 1709 | 1701 | 1719 | 1669 | 1727 |
| 72 hr gradient boat | | | | | | | |
| int | 1005 | 935 | 990 | 925 | 930 | 975 | 1010 |
| int liq visc | 1103314 | 2.99E+06 | 9.74E+05 | 3.30E+06 | 3.55E+06 | | 1.03E+06 |

| | 15 | 16 | 17 | 18 | 19 | 20 | 21 |
|---|---|---|---|---|---|---|---|
| $SiO_2$ | 77.04 | 72.25 | 76.05 | 70.31 | 73.35 | 77.66 | 75.15 |
| $Al_2O_3$ | 3.67 | 7.65 | 4.5 | 8.68 | 3.97 | 3.95 | 3.98 |
| $B_2O_3$ | 1.89 | 7.56 | 0 | 9.51 | 0 | 0 | 0 |
| $Li_2O$ | 0 | 0 | 0 | 0 | 0 | 0 | 0 |
| $Na_2O$ | 10.64 | 8.08 | 10.02 | 7.81 | 10.84 | 9.25 | 12.86 |
| $K_2O$ | 0 | 0.01 | 0 | 1.16 | 0 | 1.44 | 0 |
| ZnO | 0 | 0.96 | 1.76 | 0 | 0 | 0.97 | 0 |
| MgO | 6.58 | 1.72 | 6.51 | 1.24 | 6.73 | 6.57 | 6.79 |
| CaO | 0.03 | 0.03 | 0.03 | 0.03 | 0.04 | 0.03 | 0.03 |
| SrO | 0 | 1.59 | 0.99 | 1.11 | 4.89 | 0 | 1.02 |
| BaO | 0 | 0 | 0 | 0 | 0.03 | 0 | 0.01 |
| $SnO_2$ | 0.08 | 0.08 | 0.1 | 0.08 | 0.09 | 0.09 | 0.1 |
| $R_2O/Al_2O_3$ | 2.90 | 1.06 | 2.23 | 1.03 | 2.73 | 2.71 | 3.23 |
| $(R_2O + RO)/Al_2O_3$ | 4.70 | 1.62 | 4.29 | 1.31 | 5.68 | 4.62 | 5.20 |
| $R_xO - Al_2O_3 - MgO$ | 0.39 | −1.28 | −0.99 | −0.95 | 0.14 | 0.17 | 2.09 |
| strain | 544 | 541 | 574.0 | 525 | 538 | 562.0 | 523 |
| anneal | 591 | 587 | 626.0 | 575 | 582 | 616 | 570 |
| soft | 830.3 | 838.8 | 881.6 | 828.4 | 797.6 | 878.9 | 813.2 |
| CTE | 64.2 | 55.1 | 63.9 | 59.7 | 73.5 | 66.3 | 74 |
| density | 2.385 | 2.389 | 2.441 | 2.353 | 2.506 | 2.395 | 2.424 |
| strain (bbv) | 538.6 | 535.7 | 574.1 | 519.4 | 531.7 | 562.6 | 518.2 |
| anneal (bbv) | 585.9 | 583.7 | 623.9 | 568.4 | 576.9 | 614.3 | 564.3 |
| last bbv visc | 12.016 | 12.0317 | 12.0021 | 604.3 | 12.0046 | 12.0158 | 12.0098 |
| last bbv T | 622.7 | 621.2 | 663.8 | 12.031 | 612.4 | 655.4 | 600.2 |
| soft (ppv) | | | | | | | |
| Color shift | | | | | | | |
| Viscosity | | | | | | | |
| A | −1.683 | −2.028 | −1.953 | −1.9 | −1.79 | −2.058 | −1.911 |
| B | 5890.6 | 6953.1 | 6229.6 | 6845.9 | 5350.3 | 6609.3 | 5970.1 |
| To | 192.6 | 126.4 | 217.3 | 111.1 | 224.4 | 185.7 | 171.2 |
| T (200P) | 1671 | 1733 | 1682 | 1741 | 1532 | 1702 | 1589 |

TABLE 5-continued

| 72 hr gradient boat | | | | | | | |
|---|---|---|---|---|---|---|---|
| int | 990 | 900 | 1020 | 830 | 890 | 890 | 855 |
| int liq visc | 5.06E+05 | 9.12E+06 | 642403 | 4.20E+07 | 1.77E+06 | 21193919 | 6.60E+06 |

| | 22 | 23 | 24 | 25 | 26 | 27 | 28 |
|---|---|---|---|---|---|---|---|
| $SiO_2$ | 76.88 | 75.67 | 76.97 | 76.15 | 77.64 | 76.27 | 75.22 |
| $Al_2O_3$ | 4.18 | 5.79 | 4.68 | 4.61 | 3.96 | 4.36 | 6.94 |
| $B_2O_3$ | 0 | 1.75 | 0 | 0 | 0 | 0 | 0 |
| $Li_2O$ | 0 | 0 | 0 | 0 | 0 | 0 | 0 |
| $Na_2O$ | 11.69 | 10.67 | 8.71 | 9.6 | 10.7 | 10.13 | 12.77 |
| $K_2O$ | 0 | 0 | 2.9 | 0 | 0 | 0 | 0 |
| ZnO | 0 | 0.01 | 0 | 1.18 | 0.98 | 1.19 | 0 |
| MgO | 7.08 | 5.44 | 6.59 | 6.94 | 6.08 | 6.88 | 1.93 |
| CaO | 0.03 | 0.03 | 0.03 | 0.03 | 0.03 | 0.03 | 0.03 |
| SrO | 0 | 0.53 | 0 | 0.9 | 0 | 1 | 2.97 |
| BaO | 0 | 0 | 0 | 0.46 | 0.49 | 0.01 | 0 |
| $SnO_2$ | 0.1 | 0.08 | 0.08 | 0.1 | 0.09 | 0.09 | 0.07 |
| $R_2O/Al_2O_3$ | 2.80 | 1.84 | 2.48 | 2.08 | 2.70 | 2.32 | 1.84 |
| $(R_2O + RO)/Al_2O_3$ | 4.50 | 2.88 | 3.90 | 4.15 | 4.62 | 4.41 | 2.55 |
| $R_xO - Al_2O_3 - MgO$ | 0.43 | −0.56 | 0.34 | −1.95 | 0.66 | −1.11 | 3.9 |
| strain | 552 | 565 | 549 | 578 | 557 | 573 | 534 |
| anneal | 603 | 613 | 603 | 631 | 609 | 625 | 581 |
| soft | 853.3 | 860.1 | 870.4 | 886.8 | 862.3 | 877.3 | 813.3 |
| CTE | 69.1 | 64.7 | 73.2 | 62.6 | 65 | 63.2 | 74.1 |
| density | 2.386 | 2.398 | 2.385 | 2.446 | 2.414 | 2.428 | 2.468 |
| strain (bbv) | 549.9 | 557.8 | 546.5 | 578.5 | 555.6 | 573.4 | 525.8 |
| anneal (bbv) | 599 | 605.9 | 598.2 | 629.1 | 604.6 | 623.9 | 572.9 |
| last bbv visc | 12.0259 | 12.0026 | 12.0207 | 12.0197 | 12.0072 | 12.0121 | 12.0378 |
| last bbv T | 637 | 643.5 | 638.3 | 669.3 | 643.4 | 663.3 | 608.9 |
| soft (ppv) | | | | | | | |
| Color shift | | 0.006389 | | | | | |
| Viscosity | | | | | | | |
| A | −2.073 | −1.873 | −2.356 | −1.932 | −1.959 | −2.134 | −1.567 |
| B | 6603.1 | 6377.4 | 7386.5 | 6230.8 | 6333.5 | 6554.9 | 5710.6 |
| To | 168.6 | 183.8 | 124.5 | 222.6 | 189.8 | 201 | 189 |
| T (200P) | 1678 | 1712 | 1711 | 1695 | 1677 | 1679 | 1665 |

| 72 hr gradient boat | | | | | | | |
|---|---|---|---|---|---|---|---|
| int | 940 | 950 | 840 | 1050 | 950 | 985 | 960 |
| int liq visc | 3.07E+06 | 2.82E+06 | 9.28E+07 | 3.97E+05 | 2.36E+06 | 1.69E+06 | 6.91E+05 |

| | 29 | 30 | 31 | 32 | 33 | 34 | 35 |
|---|---|---|---|---|---|---|---|
| $SiO_2$ | 77.56 | 72.53 | 77.31 | 72.17 | 68.19 | 72.39 | 72.28 |
| $Al_2O_3$ | 3.96 | 6.83 | 4.98 | 7.68 | 10.84 | 7.38 | 7.37 |
| $B_2O_3$ | 0 | 9.75 | 0 | 7.63 | 7.37 | 7.45 | 7.34 |
| $Li_2O$ | 0 | 0 | 0 | 0 | 1.06 | 0 | 0 |
| $Na_2O$ | 10.26 | 6.78 | 11.19 | 6.98 | 10.47 | 8.52 | 8.96 |
| $K_2O$ | 0 | 0.01 | 0 | 0.01 | 0.01 | 0 | 0 |
| ZnO | 0.97 | 0 | 0.01 | 0 | 0 | 0 | 0 |
| MgO | 6.61 | 1.96 | 6.37 | 2.24 | 2.42 | 2.09 | 1.99 |
| CaO | 0.03 | 0.04 | 0.03 | 0.03 | 0.04 | 0.02 | 0.02 |
| SrO | 0 | 1.95 | 0 | 2.09 | 0.53 | 2.01 | 1.9 |
| BaO | 0.48 | 0 | 0 | 0 | 0 | 0 | 0 |
| $SnO_2$ | 0.09 | 0.09 | 0.08 | 0.08 | 0.07 | 0.08 | 0.08 |
| $R_2O/Al_2O_3$ | 2.59 | 0.99 | 2.25 | 1.05 | 0.97 | 1.15 | 1.22 |
| $(R_2O + RO)/Al_2O_3$ | 4.63 | 1.57 | 3.53 | 1.62 | 1.24 | 1.71 | 1.75 |
| $R_xO - Al_2O_3 - MgO$ | −0.31 | −2 | −0.16 | −1.87 | −2.78 | −0.95 | −0.4 |
| strain | 567 | 535 | 573 | 529 | 553 | 546 | 547 |
| anneal | 619 | 583 | 626 | 576 | 604 | 591 | 591 |
| soft | 872.3 | 835.4 | 880.9 | 826.8 | 881.8 | 823 | 816.4 |
| CTE | 63.5 | 50.2 | 66.5 | 53.7 | 63.2 | 58.4 | 57.1 |
| density | 2.413 | 2.356 | 2.38 | 2.369 | 2.386 | 2.393 | 2.397 |
| strain (bbv) | 561 | 532.7 | 568.6 | 525.3 | 547.8 | 540.8 | 539.9 |
| anneal (bbv) | 612.8 | 681.5 | 619.4 | 571.5 | 600.2 | 587.3 | 585.9 |
| last bbv visc | 12.0281 | 619.3 | 12.0051 | 607.5 | 640.7 | 12.0332 | 12.0107 |
| last bbv T | 652.3 | 12.0096 | 659.5 | 12.0195 | 12.0195 | 623.2 | 622.1 |
| soft (ppv) | | | | | | | |
| Color shift | | | | 0.00606 | | | |
| Viscosity | | | | | | | |
| A | −1.933 | −1.9 | −1.997 | −1.81 | −2.843 | −1.536 | −1.49 |
| B | 6346.9 | 6842.9 | 6560.7 | 6533.2 | 8399.5 | 5834.9 | 5653 |
| To | 197.7 | 129 | 190.9 | 134.7 | 75.5 | 192.8 | 202.9 |
| T (200P) | 1697 | 1758 | 1717 | 1724 | 1708 | 1713 | 1694 |

TABLE 5-continued

| 72 hr gradient boat | | | | | | | |
|---|---|---|---|---|---|---|---|
| int | 990 | 930 | 880 | 940 | 1000 | 910 | 920 |
| int liq visc | 1.20E+06 | 4.39E+06 | 3.34E+07 | 2.01E+06 | 1.75E+06 | 3.98E+06 | 2.47E+06 |

| | 36 | 37 | 38 | 39 | 40 | 41 | 42 |
|---|---|---|---|---|---|---|---|
| $SiO_2$ | 73.65 | 75.25 | 76.99 | 75.63 | 76.37 | 73.43 | 75.92 |
| $Al_2O_3$ | 7.32 | 5.97 | 3.45 | 5.01 | 5.17 | 6.71 | 4.61 |
| $B_2O_3$ | 3.84 | 0.96 | 0 | 1.72 | 0 | 5.61 | 0 |
| $Li_2O$ | 0 | 0 | 0 | 0 | 0 | 0 | 0 |
| $Na_2O$ | 9.39 | 10.77 | 5.95 | 10.55 | 11.17 | 6.52 | 9.67 |
| $K_2O$ | 0 | 0 | 2.03 | 0 | 0 | 0.97 | 0 |
| ZnO | 0 | 0 | 2.91 | 0 | 0 | 0 | 1.2 |
| MgO | 3.05 | 3.84 | 6.56 | 3.88 | 6.11 | 2.47 | 7.01 |
| CaO | 0.03 | 0.03 | 0.03 | 0.03 | 0.03 | 0.87 | 0.03 |
| SrO | 2.58 | 3.03 | 1.95 | 3.04 | 1.01 | 3.25 | 1.41 |
| BaO | 0 | 0 | 0 | 0 | 0 | 0.05 | 0 |
| $SnO_2$ | 0.08 | 0.08 | 0.1 | 0.07 | 0.09 | 0.08 | 0.1 |
| $R_2O/Al_2O_3$ | 1.28 | 1.80 | 2.31 | 2.11 | 2.16 | 1.12 | 2.10 |
| $(R_2O + RO)/Al_2O_3$ | 2.06 | 2.96 | 5.63 | 3.49 | 3.54 | 2.11 | 4.19 |
| $R_xO - Al_2O_3 - MgO$ | −0.98 | 0.96 | −2.03 | 1.66 | −0.11 | −1.69 | −1.95 |
| strain | 559 | 551 | 586 | 539 | 561 | 558 | 580 |
| anneal | 606 | 598 | 639 | 585 | 613 | 603 | 632 |
| soft | 843.7 | 832.6 | 898.4 | 806.9 | 865.0 | 57.8 | 885.4 |
| CTE | 61.7 | 67.8 | 59 | 67.1 | 68.2 | 835.9 | 61.8 |
| density | 2.437 | 2.463 | 2.474 | 2.464 | 2.411 | 2.442 | 2.441 |
| strain (bbv) | 552.7 | 545.8 | 586.9 | 532.8 | 560 | 551.9 | 579.8 |
| anneal (bbv) | 600.6 | 593.7 | 638.1 | 577.8 | 609.4 | 599 | 629.8 |
| last bbv visc | 12.0199 | 12.0153 | 12.0022 | 12.0136 | 12.1063 | 12.0089 | 12.0309 |
| last bbv T | 637.5 | 630.8 | 679.1 | 612.5 | 648 | 634.9 | 669.4 |
| soft (ppv) | | | | | | | |

Color shift
Viscosity

| A | −1.753 | −1.659 | −1.98 | −1.563 | −1.949 | −1.721 | −1.92 |
|---|---|---|---|---|---|---|---|
| B | 6249.6 | 5855.6 | 6350.9 | 5507.5 | 6428.1 | 6078.8 | 6206.9 |
| To | 183.5 | 202.4 | 224.9 | 206.6 | 190.5 | 191.9 | 224.4 |
| T (200P) | 1725 | 1681 | 1708 | 1632 | 1703 | 1703 | 1695 |

| 72 hr gradient boat | | | | | | | |
|---|---|---|---|---|---|---|---|
| int | 960 | 935 | 1095 | 890 | 920 | 920 | 1065 |
| int liq visc | 1.97E+06 | 2.16E+06 | 2.08E+05 | 3.13E+06 | 7.29E+06 | 4.24E+06 | 2.91E+05 |

| | 43 | 44 | 45 | 46 | 47 | 48 | 49 |
|---|---|---|---|---|---|---|---|
| $SiO_2$ | 70.93 | 77.84 | 74.12 | 68.66 | 74.36 | 68.62 | 72.25 |
| $Al_2O_3$ | 8.63 | 4.35 | 6.06 | 10.09 | 6.45 | 10.06 | 7.65 |
| $B_2O_3$ | 7.58 | 0 | 3.78 | 7.25 | 3.86 | 7.29 | 7.56 |
| $Li_2O$ | 0 | 0 | 0 | 0 | 0 | 0 | 0 |
| $Na_2O$ | 8.08 | 10.65 | 5 | 10.24 | 9.76 | 11.01 | 8.08 |
| $K_2O$ | 0.76 | 0 | 1.93 | 0.65 | 0 | 0 | 0.01 |
| ZnO | 0 | 0.96 | 0 | 0 | 0 | 0 | 0.96 |
| MgO | 2.28 | 6.05 | 2.77 | 2.02 | 4.35 | 1.93 | 1.72 |
| CaO | 0.04 | 0.03 | 1.73 | 0.92 | 0.03 | 0.02 | 0.03 |
| SrO | 1.56 | 0 | 4.41 | 0 | 1.04 | 0.93 | 1.59 |
| BaO | 0 | 0 | 0.07 | 0 | 0.01 | 0 | 0 |
| $SnO_2$ | 0.07 | 0.09 | 0.08 | 0.1 | 0.07 | 0.08 | 0.08 |
| $R_2O/Al_2O_3$ | 1.02 | 2.45 | 1.14 | 1.08 | 1.51 | 1.09 | 1.06 |
| $(R_2O + RO)/Al_2O_3$ | 1.47 | 4.07 | 2.63 | 1.37 | 2.36 | 1.38 | 1.62 |
| $R_xO - Al_2O_3 - MgO$ | −2.07 | 0.25 | −1.9 | −1.22 | −1.04 | −0.98 | −1.28 |
| strain | 543 | 572 | 572 | 540 | 554 | 553 | 541 |
| anneal | 592 | 625 | 617 | 588 | 601 | 598 | 587 |
| soft | 852.7 | 880.6 | 59.7 | 842.9 | 840.9 | 847.6 | 838.8 |
| CTE | 59.2 | 64.1 | 851.4 | 66.4 | 62 | 65.7 | 55.1 |
| density | 2.382 | 2.392 | 2.485 | 2.373 | 2.405 | 2.387 | 2.389 |
| strain (bbv) | 537.8 | 570.1 | 565.6 | 536.1 | 545.1 | 543 | 535.7 |
| anneal (bbv) | 587.6 | 621 | 613.2 | 585.1 | 593.1 | 591 | 583.7 |
| last bbv visc | 624.4 | 12.0015 | 12.0184 | 621.3 | 12.0279 | 12.0124 | 12.0317 |
| last bbv T | 12.025 | 661.2 | 649.1 | 12.0299 | 629.7 | 628.6 | 621.2 |
| soft (ppv) | | | | | | | |

Color shift
Viscosity

| A | −2.165 | −1.975 | −1.855 | −2.206 | −1.828 | −1.755 | −2.028 |
|---|---|---|---|---|---|---|---|
| B | 7218.9 | 6471.2 | 6197.3 | 7123.4 | 6425.7 | 6217.7 | 6953.1 |
| To | 115.6 | 198.1 | 202.4 | 120.6 | 165.8 | 176.7 | 126.4 |
| T (200P) | 1732 | 1711 | 1694 | 1701 | 1722 | 1710 | 1733 |

TABLE 5-continued

| 72 hr gradient boat | | | | | | | |
|---|---|---|---|---|---|---|---|
| int | 960 | 950 | 975 | 920 | 965 | 975 | 900 |
| int liq visc | 2.42E+06 | 4.28E+06 | 1.47E+06 | | 1.63E+06 | 1.08E+06 | 9.12E+06 |

| | 50 | 51 | 52 | 53 | 54 | 55 | 56 |
|---|---|---|---|---|---|---|---|
| $SiO_2$ | 72.23 | 75.59 | 77.16 | 76.9 | 76.55 | 74.95 | 72.58 |
| $Al_2O_3$ | 7.62 | 4.99 | 3.95 | 4.68 | 3.97 | 5.43 | 6.98 |
| $B_2O_3$ | 9.1 | 1.84 | 0 | 0 | 0 | 1.78 | 7.49 |
| $Li_2O$ | 0 | 0 | 0 | 0 | 0 | 0 | 0 |
| $Na_2O$ | 7.53 | 5.75 | 10.84 | 11.68 | 9.3 | 3.52 | 8.51 |
| $K_2O$ | 0.01 | 4.83 | 0 | 0 | 1.49 | 2.9 | 0 |
| ZnO | 0 | 0 | 0 | 0 | 1.97 | 0 | 0 |
| MgO | 2.24 | 3.84 | 4.86 | 6.57 | 6.56 | 3.08 | 2.19 |
| CaO | 0.03 | 0.03 | 0.03 | 0.03 | 0.03 | 2.6 | 0.02 |
| SrO | 1.09 | 2.99 | 3.01 | 0 | 0 | 5.54 | 2.07 |
| BaO | 0 | 0 | 0 | 0 | 0 | 0.09 | 0 |
| $SnO_2$ | 0.08 | 0.08 | 0.09 | 0.08 | 0.1 | 0.08 | 0.08 |
| $R_2O/Al_2O_3$ | 0.99 | 2.12 | 2.74 | 2.50 | 2.72 | 1.18 | 1.22 |
| $(R_2O + RO)/Al_2O_3$ | 1.43 | 3.49 | 4.74 | 3.91 | 4.87 | 3.27 | 1.83 |
| $R_xO - Al_2O_3 - MgO$ | -2.32 | 1.75 | 2.03 | 0.43 | 0.26 | -2.09 | -0.66 |
| strain | 535 | 540 | 528 | 558 | 563 | 590 | 547 |
| anneal | 585 | 586 | 577 | 610 | 616 | 639 | 591 |
| soft | 859.3 | 818.4 | 814.9 | 867.7 | 876.7 | 61.2 | 814.5 |
| CTE | 52.3 | 73.4 | 69.3 | 68.6 | 67.3 | 878.7 | 57.3 |
| density | 2.340 | 2.463 | 2.437 | 2.385 | 2.418 | 2.52 | 2.397 |
| strain (bbv) | 533 | 532.3 | 524 | 554 | 559.9 | 585.9 | 540.2 |
| anneal (bbv) | 584.1 | 579.8 | 570.9 | 604.9 | 611.7 | 635.6 | 585.9 |
| last bbv visc | 621.6 | 12.0024 | 12.0156 | 12.0012 | 12.0115 | 12.004 | 12.028 |
| last bbv T | 12.026 | 616.9 | 607.4 | 644.5 | 652.3 | 673.4 | 621.4 |
| soft (ppv) | | | | | | | |

| Color shift | | | | | | | |
|---|---|---|---|---|---|---|---|
| Viscosity | | | | | | | |
| A | -2.186 | -1.822 | -1.824 | -2.042 | -2.154 | -2.01 | -1.511 |
| B | 7447.2 | 6267.2 | 6020.9 | 6562.4 | 6682.2 | 6255.3 | 5752.6 |
| To | 97.3 | 163.4 | 172.3 | 177.1 | 180.5 | 227 | 196.1 |
| T (200P) | 1757 | 1683 | 1632 | 1688 | 1680 | 1678 | 1705 |

| 72 hr gradient boat | | | | | | | |
|---|---|---|---|---|---|---|---|
| int | 995 | 875 | 950 | 925 | 1040 | 1030 | 880 |
| int liq visc | 1.29E+06 | 9.66E+06 | 8.28E+05 | 5.40E+06 | 4.17E+05 | 6.02E+05 | 7.95E+06 |

| | 57 | 58 | 59 | 60 | 61 | 62 | 63 |
|---|---|---|---|---|---|---|---|
| $SiO_2$ | 72.21 | 76.24 | 72.07 | 78.17 | 76.2 | 76.91 | 68.92 |
| $Al_2O_3$ | 7.57 | 5.16 | 7.6 | 3.98 | 5.19 | 5.18 | 11.68 |
| $B_2O_3$ | 8.61 | 0 | 7.44 | 0 | 0 | 0.85 | 4.69 |
| $Li_2O$ | 0 | 0 | 0 | 0 | 0 | 0 | 0 |
| $Na_2O$ | 7.05 | 9.83 | 8.02 | 10.86 | 11.72 | 10.49 | 12.03 |
| $K_2O$ | 1.05 | 0 | 0.01 | 0 | 0.01 | 0 | 0.01 |
| ZnO | 0 | 0.01 | 0.49 | 0 | 0 | 0.01 | 0 |
| MgO | 2.25 | 6.6 | 2.16 | 6.82 | 6.15 | 6.43 | 2.49 |
| CaO | 0.03 | 0.03 | 0.03 | 0.03 | 0.04 | 0.03 | 0.04 |
| SrO | 1.09 | 2.01 | 2.03 | 0 | 0.57 | 0 | 0 |
| BaO | 0 | 0 | 0 | 0 | 0 | 0 | 0 |
| $SnO_2$ | 0.08 | 0.07 | 0.08 | 0.08 | 0.09 | 0.08 | 0.1 |
| $R_2O/Al_2O_3$ | 1.07 | 1.91 | 1.06 | 2.73 | 2.26 | 2.03 | 1.03 |
| $(R_2O + RO)/Al_2O_3$ | 1.52 | 3.58 | 1.68 | 4.45 | 3.56 | 3.27 | 1.25 |
| $R_xO - Al_2O_3 - MgO$ | -1.72 | -1.93 | -1.73 | 0.06 | 0.39 | -1.12 | -2.13 |
| strain | 534 | 579 | 546 | 559 | 551 | 574 | 570 |
| anneal | 582 | 631 | 593 | 613 | 604 | 625 | 626 |
| soft | 846.6 | 884.8 | 835.8 | 872.1 | 854.1 | 878.8 | 913.3 |
| CTE | 56 | 63.2 | 55.500 | 65 | 69.5 | 63.3 | 68.6 |
| density | 2.351 | 2.43 | 2.396 | 2.375 | 2.398 | 2.38 | 2.382 |
| strain (bbv) | 529.1 | 577.5 | 541.1 | 556.1 | 549 | 573.2 | 567.8 |
| anneal (bbv) | 579.2 | 628.4 | 588.7 | 606.2 | 599.2 | 623.9 | 621.6 |
| last bbv visc | 616.2 | 12.0151 | 12.0045 | 12.0093 | 12.0064 | 12.0321 | 661.9 |
| last bbv T | 12.017 | 667.9 | 626 | 645.3 | 638.9 | 663.5 | 12.0021 |
| soft (ppv) | | | | | | | |

| Color shift | | 0.006504 | | | | 0.007294 | |
|---|---|---|---|---|---|---|---|
| Viscosity | | | | | | | |
| A | -1.929 | -1.989 | -1.876 | -2.061 | -2.032 | -1.911 | -3.038 |
| B | 6970.1 | 6434.3 | 6540.5 | 6732.8 | 6559.5 | 6471.3 | 8948.7 |
| To | 116.2 | 208.5 | 154.5 | 166.8 | 171.6 | 199.3 | 66.9 |
| T (200P) | 1764 | 1708 | 1720 | 1710 | 1685 | 1736 | 1743 |

TABLE 5-continued

| 72 hr gradient boat | | | | | | | |
|---|---|---|---|---|---|---|---|
| int | 990 | 1005 | 950 | 980 | 945 | 1000 | 1050 |
| int liq visc | 1.12E+06 | 1.23E+06 | 2.22E+06 | 1.65E+06 | 2.81E+06 | 1.48E+06 | |

| | 64 | 65 | 66 | 67 | 68 | 69 | 70 |
|---|---|---|---|---|---|---|---|
| $SiO_2$ | 68.69 | 76.18 | 69.67 | 68.29 | 72.27 | 72.33 | 76.84 |
| $Al_2O_3$ | 10.07 | 4.37 | 9.7 | 10.78 | 7.66 | 7.7 | 4.69 |
| $B_2O_3$ | 9.12 | 0 | 7.44 | 7.35 | 7.61 | 7.6 | 0 |
| $Li_2O$ | 0 | 0 | 0 | 0 | 0 | 0 | 0 |
| $Na_2O$ | 9.44 | 8.94 | 9.54 | 10.17 | 7.95 | 8.12 | 11.68 |
| $K_2O$ | 0.56 | 1.19 | 0.05 | 0.26 | 0 | 0 | 0 |
| ZnO | 0 | 1.2 | 0 | 0 | 0 | 0 | 0 |
| MgO | 1.02 | 6.91 | 2.36 | 2.44 | 0 | 1.41 | 6.61 |
| CaO | 0.93 | 0.05 | 0.04 | 0.04 | 0.02 | 1.21 | 0.03 |
| SrO | 0 | 1.04 | 1.06 | 0.53 | 4.35 | 1.47 | 0 |
| BaO | 0 | 0 | 0 | 0 | 0 | 0 | 0 |
| $SnO_2$ | 0.1 | 0.1 | 0.07 | 0.08 | 0.07 | 0.08 | 0.1 |
| $R_2O/Al_2O_3$ | 0.99 | 2.32 | 0.99 | 0.97 | 1.04 | 1.05 | 2.49 |
| $(R_2O + RO)/Al_2O_3$ | 1.19 | 4.42 | 1.35 | 1.25 | 1.61 | 1.59 | 3.91 |
| $R_xO - Al_2O_3 - MgO$ | −1.09 | −1.15 | −2.47 | −2.79 | 0.29 | −0.99 | 0.38 |
| strain | 531 | 563 | 550 | 554 | 557 | 554 | 558 |
| anneal | 582 | 615 | 600 | 605 | 601 | 599 | 610 |
| soft | 859 | 871.5 | 878.8 | 881.1 | 814.2 | 834.4 | 862.2 |
| CTE | 62.5 | 66.2 | 60.4 | 63.5 | 57.1 | 55.7 | 68.3 |
| density | 2.343 | 2.428 | 2.376 | 2.369 | 2.454 | 2.382 | 2.386 |
| strain (bbv) | 52.4 | 562.2 | 543.8 | 547.1 | 551 | 548.3 | 555.7 |
| anneal (bbv) | 576.2 | 612.9 | 594.7 | 599.8 | 596.6 | 595.9 | 605.5 |
| last bbv visc | 613.2 | 12.0115 | 634.2 | 639 | 12.1873 | 12.1295 | 12.0229 |
| last bbv T | 12.0131 | 653.4 | 12.0044 | 12.0223 | 628.3 | 630.7 | 644.1 |
| soft (ppv) | | | | | | | |

| Color shift | | | | | | | |
|---|---|---|---|---|---|---|---|
| Viscosity | | | | | | | |
| A | −2.708 | −2.147 | −2.44 | −2.986 | −1.096 | −1.687 | −1.965 |
| B | 8488.2 | 6708.6 | 7713.5 | 8750.3 | 4896.4 | 6247.9 | 6387.6 |
| To | 36.4 | 179.5 | 100.1 | 55.9 | 259.3 | 178.2 | 187.4 |
| T (200P) | 1731 | 1688 | 1727 | 1711 | 1701 | 1745 | 1685 |

| 72 hr gradient boat | | | | | | | |
|---|---|---|---|---|---|---|---|
| int | | 1000 | 1010 | 1020 | 920 | 930 | 915 |
| int liq visc | | 1.07E+06 | 1.09E+06 | 1.23E+06 | 2.07E+06 | 4.20E+06 | 6.52E+06 |

| | 71 | 72 | 73 | 74 | 75 | 76 | 77 |
|---|---|---|---|---|---|---|---|
| $SiO_2$ | 75.46 | 76.22 | 71.9 | 75.36 | 77.57 | 72.11 | 68.75 |
| $Al_2O_3$ | 5.78 | 4.95 | 8.56 | 6.98 | 4.15 | 7.71 | 10.1 |
| $B_2O_3$ | 1.88 | 0 | 1.93 | 0.85 | 0 | 7.64 | 7.36 |
| $Li_2O$ | 0 | 0 | 0 | 0 | 0 | 2.06 | 0 |
| $Na_2O$ | 10.75 | 9.84 | 12.43 | 12.28 | 10.5 | 6 | 9.41 |
| $K_2O$ | 0 | 0 | 0 | 0 | 0 | 0.01 | 0.56 |
| ZnO | 0 | 0 | 0 | 0 | 0.97 | 0 | 0 |
| MgO | 5.42 | 5.83 | 5.01 | 4.35 | 6.65 | 2.24 | 1.01 |
| CaO | 0.03 | 0.03 | 0.03 | 0.02 | 0.03 | 0.03 | 0.64 |
| SrO | 0.53 | 2.98 | 0 | 0 | 0 | 2.1 | 2.01 |
| BaO | 0.01 | 0 | 0 | 0 | 0 | 0 | 0 |
| $SnO_2$ | 0.08 | 0.07 | 0.11 | 0.11 | 0.09 | 0.08 | 0.09 |
| $R_2O/Al_2O_3$ | 1.86 | 1.99 | 1.45 | 1.76 | 2.53 | 1.05 | 0.99 |
| $(R_2O + RO)/Al_2O_3$ | 2.90 | 3.77 | 2.04 | 2.39 | 4.37 | 1.61 | 1.35 |
| $R_xO - Al_2O_3 - MgO$ | −0.45 | −0.94 | −1.14 | 0.95 | −0.3 | −1.88 | −1.14 |
| strain | 556 | 559 | 575 | 567 | 574 | 522 | 546 |
| anneal | 605 | 610 | 624 | 619 | 627 | 566 | 593 |
| soft | 849.3 | 858.6 | 876.6 | 874 | 878.3 | 804.2 | 64.4 |
| CTE | 64.6 | 65.5 | 71.3 | 69.9 | 63.6 | 51.7 | 834.7 |
| density | 2.403 | 2.457 | 2.403 | 2.393 | 2.393 | 2.384 | 2.415 |
| strain (bbv) | 551.8 | 557.3 | 568.9 | 563.8 | 573.5 | 515.1 | 539.5 |
| anneal (bbv) | 599.9 | 606.6 | 619.3 | 614 | 624.7 | 561.1 | 588 |
| last bbv visc | 12.0185 | 12.0236 | 12.0065 | 12.0047 | 12.0322 | 595.6 | 623.9 |
| last bbv T | 637.2 | 644.2 | 658.8 | 653.8 | 664.7 | 12.0044 | 12.0289 |
| soft (ppv) | | | | | | | |

| Color shift | | | | | | | |
|---|---|---|---|---|---|---|---|
| | | | | 0.006152 | | | |
| Viscosity | | | | | | | |
| A | −1.897 | −2.051 | −2.111 | −1.692 | −1.65 | −1.745 | −1.964 |
| B | 6438.4 | 6470.3 | 6794.6 | 6145 | 5771.2 | 6354.5 | 6613.2 |
| To | 174.3 | 184.4 | 177.5 | 205 | 242.7 | 133.1 | 150.8 |
| T (200P) | 1708 | 1671 | 1718 | 1744 | 1703 | 1704 | 1701 |

TABLE 5-continued

| 72 hr gradient boat | | | | | | | |
|---|---|---|---|---|---|---|---|
| int | 935 | 955 | 1035 | 940 | 985 | 920 | 1010 |
| int liq visc | 3.69E+06 | 2.22E+06 | | | 1.33E+06 | | |

| | 78 | 79 | 80 | 81 | 82 | 83 | 84 |
|---|---|---|---|---|---|---|---|
| $SiO_2$ | 76.78 | 70.16 | 72.2 | 72.3 | 68.51 | 73.05 | 75.19 |
| $Al_2O_3$ | 5.14 | 8.97 | 7.66 | 7.19 | 10.74 | 7.5 | 3.98 |
| $B_2O_3$ | 0 | 7.22 | 7.61 | 7.53 | 6.43 | 5.62 | 0 |
| $Li_2O$ | 0.99 | 0 | 0 | 0 | 0 | 0 | 0 |
| $Na_2O$ | 10.52 | 10.47 | 8.05 | 8.05 | 10.77 | 8.72 | 12.83 |
| $K_2O$ | 0 | 0.01 | 0.01 | 0.01 | 0 | 0 | 0 |
| ZnO | 0.98 | 0 | 0.97 | 0.95 | 0 | 0 | 0 |
| MgO | 5.45 | 1.99 | 2.23 | 1.72 | 2.33 | 2.61 | 6.78 |
| CaO | 0.03 | 0.03 | 0.03 | 0.03 | 0.02 | 0.02 | 0.03 |
| SrO | 0 | 1.01 | 1.1 | 2.08 | 1.06 | 2.34 | 1.02 |
| BaO | 0 | 0 | 0 | 0 | 0 | 0 | 0.02 |
| $SnO_2$ | 0.1 | 0.08 | 0.08 | 0.07 | 0.07 | 0.08 | 0.1 |
| $R_2O/Al_2O_3$ | 2.24 | 1.17 | 1.05 | 1.12 | 1.00 | 1.16 | 3.22 |
| $(R_2O + RO)/Al_2O_3$ | 3.50 | 1.51 | 1.62 | 1.79 | 1.32 | 1.83 | 5.20 |
| $R_xO - Al_2O_3 - MgO$ | 0.92 | −0.48 | −1.83 | −0.85 | −2.3 | −1.39 | 2.07 |
| strain | 543 | 541 | 543 | 542 | 561 | 554 | 523 |
| anneal | 594 | 586 | 590 | 587 | 609 | 600 | 570 |
| soft | 853.9 | 822.3 | 846.3 | 823.3 | 866.2 | 837.9 | 805.2 |
| CTE | 67.3 | 63.6 | 54.8 | 55.1 | 65 | 58 | 74.7 |
| density | 2.401 | 2.389 | 2.376 | 2.407 | 2.393 | 2.414 | 2.424 |
| strain (bbv) | 539 | 533.9 | 535.6 | 535.6 | 554.1 | 547.6 | 517.3 |
| anneal (bbv) | 589.1 | 580.6 | 585.2 | 582.3 | 604.6 | 594.2 | 565.1 |
| last bbv visc | 12.007 | 614.9 | 12.003 | 12.0275 | 12.0335 | 12.025 | 12.0201 |
| last bbv T | 629.2 | 12.012 | 624 | 618.4 | 643.7 | 629.8 | 601.8 |
| soft (ppv) | | | | | | | |
| Color shift | | | | | | | |
| Viscosity | | | | | | | |
| A | −2.068 | −1.733 | −2.352 | −1.688 | −2.408 | −1.767 | −1.953 |
| B | 6741.8 | 6170.8 | 7658.8 | 6157.4 | 7567.5 | 6280.3 | 6035.8 |
| To | 150 | 165.5 | 90.3 | 169.2 | 119.5 | 174.2 | 169.6 |
| T (200P) | 1693 | 1695 | 1736 | 1713 | 1727 | 1718 | 1588 |
| 72 hr gradient boat | | | | | | | |
| int | 905 | 930 | 1005 | 900 | 1030 | 970 | 855 |
| int liq visc | 7.27E+06 | 2.18E+06 | 1.05E+06 | 5.46E+06 | 8.01E+05 | 1.33E+06 | 7.13E+06 |

| | 85 | 86 | 87 | 88 | 89 | 90 | 91 |
|---|---|---|---|---|---|---|---|
| $SiO_2$ | 77.19 | 77.19 | 75.21 | 76.84 | 75.88 | 75.15 | 70.89 |
| $Al_2O_3$ | 4.14 | 3.97 | 4.96 | 4.89 | 4.44 | 6.95 | 8.6 |
| $B_2O_3$ | 0 | 0 | 0 | 0 | 0 | 0 | 7.41 |
| $Li_2O$ | 0 | 0 | 0 | 0 | 0 | 0 | 0 |
| $Na_2O$ | 10.81 | 9.87 | 10.83 | 10.89 | 9.27 | 10.84 | 9.4 |
| $K_2O$ | 0 | 0 | 0 | 0 | 1.54 | 0 | 0 |
| ZnO | 1.07 | 0 | 0 | 1.18 | 1.48 | 0 | 0 |
| MgO | 6.19 | 6.8 | 5.84 | 6.04 | 7.23 | 3.87 | 2 |
| CaO | 0.03 | 0.03 | 0.03 | 0.03 | 0.03 | 0.03 | 0.02 |
| SrO | 0 | 1.99 | 2.97 | 0 | 0 | 2.98 | 1.52 |
| BaO | 0.45 | 0 | 0 | 0 | 0 | 0.04 | 0 |
| $SnO_2$ | 0.09 | 0.08 | 0.07 | 0.09 | 0.1 | 0.09 | 0.08 |
| $R_2O/Al_2O_3$ | 2.61 | 2.49 | 2.18 | 2.23 | 2.43 | 1.56 | 1.09 |
| $(R_2O + RO)/Al_2O_3$ | 4.48 | 4.71 | 3.97 | 3.71 | 4.40 | 2.56 | 1.50 |
| $R_xO - Al_2O_3 - MgO$ | 0.48 | −0.9 | 0.03 | −0.04 | −0.86 | 0.02 | −1.2 |
| strain | 558 | 554 | 547 | 577 | 572 | 572 | 550 |
| anneal | 611 | 606 | 596 | 630 | 626 | 623 | 596 |
| soft | 861.2 | 857.7 | 835.8 | 885.7 | 887.5 | 868.7 | 836.0 |
| CTE | 66.7 | 63.9 | 69 | 65 | 67.9 | 68.1 | 60.7 |
| density | 2.419 | 2.429 | 2.466 | 2.402 | 2.414 | 2.462 | 2.387 |
| strain (bbv) | 558.8 | 551.6 | 544.3 | 572.4 | 571.1 | 567.8 | 544.3 |
| anneal (bbv) | 608.8 | 600.3 | 591.4 | 622.5 | 623.3 | 617.5 | 591.9 |
| last bbv visc | 12.0023 | 12.0263 | 12.0281 | 12.0188 | 12.037 | 12.0284 | 12.009 |
| last bbv T | 648.8 | 637.9 | 627.9 | 661.8 | 663.9 | 656.6 | 629.2 |
| soft (ppv) | | | | | | | |
| Color shift | | | | | | | |
| Viscosity | | | | | | | |
| A | −1.945 | −2.106 | −1.972 | −2.098 | −2.098 | −1.83 | −1.711 |
| B | 6306.1 | 6632.1 | 6181.9 | 6646.1 | 6561.3 | 6211.1 | 6180.4 |
| To | 196.6 | 168.5 | 186.2 | 190.9 | 199.6 | 208.2 | 178.3 |
| T (200P) | 1682 | 1673 | 1633 | 1702 | 1691 | 1712 | 1719 |

TABLE 5-continued

| 72 hr gradient boat | | | | | | | |
|---|---|---|---|---|---|---|---|
| int | 935 | 1005 | 930 | 955 | 1075 | 1000 | 940 |
| int liq visc | 3.94E+06 | 6.64E+05 | 2.18E+06 | 3.98E+06 | 2.50E+05 | 1.03E+06 | 2.53E+06 |

| | 92 | 93 | 94 | 95 | 96 | 97 | 98 |
|---|---|---|---|---|---|---|---|
| $SiO_2$ | 69.36 | 76.39 | 77.22 | 75.2 | 72.91 | 73.37 | 76.39 |
| $Al_2O_3$ | 9.74 | 5.17 | 6.93 | 6.95 | 7.8 | 7.06 | 5.18 |
| $B_2O_3$ | 7.05 | 0 | 0 | 0 | 2.58 | 5.63 | 0 |
| $Li_2O$ | 0 | 0 | 0 | 0 | 0 | 0 | 0.96 |
| $Na_2O$ | 10.88 | 11.65 | 10.78 | 8.87 | 11.5 | 8.94 | 10.84 |
| $K_2O$ | 0 | 0 | 0 | 0 | 0 | 0 | 0 |
| ZnO | 0 | 0 | 0 | 0 | 0 | 0.01 | 0 |
| MgO | 1.91 | 6.11 | 1.95 | 3.88 | 5.03 | 3.3 | 6.47 |
| CaO | 0.9 | 0.03 | 0.03 | 0.03 | 0.03 | 0.03 | 0.03 |
| SrO | 0 | 0.51 | 2.96 | 4.92 | 0 | 1.56 | 0 |
| BaO | 0 | 0 | 0 | 0 | 0 | 0 | 0 |
| $SnO_2$ | 0.08 | 0.1 | 0.07 | 0.07 | 0.1 | 0.08 | 0.1 |
| $R_2O/Al_2O_3$ | 1.12 | 2.25 | 1.56 | 1.28 | 1.47 | 1.27 | 2.28 |
| $(R_2O + RO)/Al_2O_3$ | 1.41 | 3.54 | 2.27 | 2.55 | 2.12 | 1.96 | 3.53 |
| $R_xO - Al_2O_3 - MgO$ | −0.77 | 0.37 | 1.9 | −1.96 | −1.33 | −1.42 | 0.15 |
| strain | 547 | 556 | 560 | 590 | 562 | 556 | 542 |
| anneal | 594 | 608 | 611 | 641 | 611 | 602 | 593 |
| soft | 844.3 | 859.0 | 863.6 | 892.5 | 862.5 | 838 | 851.4 |
| CTE | 65.3 | 69.1 | 67.4 | 63.7 | 67.1 | 59 | 67.5 |
| density | 2.371 | 2.4 | 2.448 | 2.503 | 2.393 | 2.397 | 2.388 |
| strain (bbv) | 542.4 | 553.9 | 555.8 | 587.8 | 555.8 | 551.1 | 535.5 |
| anneal (bbv) | 590.1 | 602.6 | 605.6 | 637.8 | 605.8 | 597.7 | 586.9 |
| last bbv visc | 12.0344 | 12.0062 | 12.0251 | 12.0153 | 12.0306 | 12.0236 | 12.0311 |
| last bbv T | 627.1 | 641 | 644.4 | 676.7 | 643.8 | 633.9 | 626.3 |
| soft (ppv) | | | | | | | |
| Color shift | | | | | | 0.007476 | |
| Viscosity | | | | | | | |
| A | −1.969 | −1.99 | −1.703 | −1.899 | −2.078 | −1.901 | −1.995 |
| B | 6660.4 | 6544.9 | 6317.9 | 6249.2 | 6854.1 | 6483.7 | 6573.3 |
| To | 151.2 | 173.3 | 184.1 | 227.5 | 157.9 | 168.1 | 157.5 |
| T (200P) | 1711 | 1699 | 1762 | 1715 | 1723 | 1711 | 1688 |
| 72 hr gradient boat | | | | | | | |
| int | 950 | 945 | 970 | 1030 | 1035 | 955 | 955 |
| int liq visc | 2.34E+06 | 3.10E+06 | 2.17E+06 | 7.73E+05 | | 2.18E+06 | 1.77E+06 |

| | 99 | 100 | 101 | 102 | 103 | 104 | 105 |
|---|---|---|---|---|---|---|---|
| $SiO_2$ | 75.12 | 69.44 | 77.42 | 72.76 | 76.17 | 70.67 | 75.99 |
| $Al_2O_3$ | 6.97 | 9.75 | 3.94 | 5.01 | 4.35 | 8.25 | 4.61 |
| $B_2O_3$ | 0 | 6.48 | 0 | 8.32 | 0 | 8.43 | 0 |
| $Li_2O$ | 0 | 0 | 0 | 0 | 0 | 0 | 0 |
| $Na_2O$ | 12.81 | 10.79 | 9.86 | 4.14 | 8.56 | 7.12 | 11.25 |
| $K_2O$ | 0 | 0 | 0 | 0.97 | 1.58 | 1.04 | 0 |
| ZnO | 0 | 0 | 0.97 | 0 | 1.2 | 0 | 1.47 |
| MgO | 3.93 | 2.31 | 6.64 | 4.31 | 6.92 | 2.22 | 6.51 |
| CaO | 0.03 | 0.02 | 0.03 | 0.05 | 0.05 | 0.04 | 0.03 |
| SrO | 1 | 1.06 | 1 | 4.27 | 1.04 | 2.08 | 0 |
| BaO | 0 | 0 | 0 | 0 | 0 | 0 | 0 |
| $SnO_2$ | 0.07 | 0.07 | 0.09 | 0.09 | 0.09 | 0.07 | 0.1 |
| $R_2O/Al_2O_3$ | 1.84 | 1.11 | 2.50 | 1.02 | 2.33 | 0.99 | 2.44 |
| $(R_2O + RO)/Al_2O_3$ | 2.55 | 1.45 | 4.70 | 2.74 | 4.45 | 1.52 | 4.18 |
| $R_xO - Al_2O_3 - MgO$ | 1.91 | −1.27 | −0.72 | −4.21 | −1.13 | −2.31 | 0.13 |
| strain | 555 | 555 | 573 | 560 | 562 | 540 | 569 |
| anneal | 603 | 600 | 624 | 604 | 614 | 586 | 622 |
| soft | 852.6 | 842.0 | 878.3 | 831.7 | 873.4 | 834.9 | 880.4 |
| CTE | 72.9 | 65.1 | 61.9 | 49.6 | 67.6 | 57.7 | 66.7 |
| density | 2.42 | 2.394 | 2.416 | 2.433 | 2.428 | 2.387 | 2.414 |
| strain (bbv) | 549 | 547.5 | 565.6 | 556.7 | 558.9 | 535.2 | 565.7 |
| anneal (bbv) | 598.3 | 595.7 | 616.3 | 605.8 | 610.7 | 583.8 | 616.4 |
| last bbv visc | 12.032 | 12.0213 | 12.0121 | 641.9 | 12.014 | 619.5 | 12.016 |
| last bbv T | 636.5 | 633.4 | 655.5 | 12.0273 | 651.5 | 12.0244 | 656 |
| soft (ppv) | | | | | | | |
| Color shift | | | 0.005265 | | | | |
| Viscosity | | | | | | | |
| A | −1.844 | −1.974 | −2.029 | −1.718 | −2.199 | −1.884 | −1.992 |
| B | 6349.3 | 6617.5 | 6515.2 | 5894.9 | 6826.5 | 6635.5 | 6312 |
| To | 178.9 | 160.3 | 191.4 | 212.6 | 171.2 | 142.2 | 205.3 |
| T (200P) | 1711 | 1708 | 1696 | 1679 | 1688 | 1728 | 1676 |

TABLE 5-continued

| 72 hr gradient boat | | | | | | | |
|---|---|---|---|---|---|---|---|
| int | 970 | 970 | 1015 | 1000 | 970 | 935 | 960 |
| int liq visc | 1.52E+06 | 1.58E+06 | 7.61E+05 | | 2.22E+06 | 3.06E+06 | 2.35E+06 |

| | 106 | 107 | 108 | 109 | 110 | 111 | 112 |
|---|---|---|---|---|---|---|---|
| $SiO_2$ | 77.22 | 67.94 | 75.19 | 76.35 | 75.87 | 76.28 | 77.09 |
| $Al_2O_3$ | 3.96 | 10.68 | 6.93 | 5.21 | 4 | 4.89 | 3.98 |
| $B_2O_3$ | 0 | 7.19 | 0 | 0 | 0 | 0 | 0 |
| $Li_2O$ | 0 | 0 | 0 | 0 | 0 | 0 | 0 |
| $Na_2O$ | 10.91 | 10.88 | 10.81 | 11.55 | 9.7 | 11.24 | 10.88 |
| $K_2O$ | 0 | 0.01 | 0 | 0.01 | 0 | 0 | 0 |
| ZnO | 0.97 | 0 | 0 | 0 | 2.48 | 1.21 | 0 |
| MgO | 6.77 | 2.32 | 1.95 | 5.67 | 6.78 | 6.23 | 6.85 |
| CaO | 0.03 | 0.04 | 0.03 | 0.07 | 0.03 | 0.03 | 0.03 |
| SrO | 0 | 0.81 | 4.96 | 1.01 | 1.01 | 0 | 1.03 |
| BaO | 0 | 0 | 0 | 0 | 0 | 0 | 0 |
| $SnO_2$ | 0.09 | 0.07 | 0.07 | 0.1 | 0.1 | 0.09 | 0.1 |
| $R_2O/Al_2O_3$ | 2.76 | 1.02 | 1.56 | 2.22 | 2.43 | 2.30 | 2.73 |
| $(R_2O + RO)/Al_2O_3$ | 4.72 | 1.32 | 2.56 | 3.51 | 5.00 | 3.83 | 4.72 |
| $R_xO - Al_2O_3 - MgO$ | 0.18 | -2.11 | 1.93 | 0.68 | -1.08 | 0.12 | 0.05 |
| strain | 566 | 547 | 555 | 547 | 575 | 571 | 549 |
| anneal | 618 | 596 | 603 | 598 | 626 | 625 | 599 |
| soft | 874 | 856.8 | 839 | 852 | 873.3 | 877.4 | 847.3 |
| CTE | 65.4 | 65.2 | 70.7 | 70 | 62.7 | 67.4 | 66.5 |
| density | 2.396 | 2.386 | 2.507 | 2.408 | 2.454 | 2.406 | 2.403 |
| strain (bbv) | 567.1 | 542 | 548.3 | 545.6 | 573.4 | 568.4 | 544.9 |
| anneal (bbv) | 617.3 | 591.2 | 596.6 | 595.1 | 623.5 | 619.7 | 593.9 |
| last bbv visc | 12.0035 | 627.7 | 12.0071 | 12.0146 | 12.0268 | 12.032 | 12.039 |
| last bbv T | 657 | 12.006 | 634.3 | 634.2 | 662.9 | 659.1 | 631.4 |
| soft (ppv) | | | | | | | |
| Color shift | 0.004932 | | | | | | |
| Viscosity | | | | | | | |
| A | -1.856 | -2.605 | -1.587 | -1.876 | -1.874 | -2.588 | -1.976 |
| B | 6077.3 | 7862.2 | 5648.3 | 6262.9 | 5984 | 7841.8 | 6357.2 |
| To | 218.4 | 89.5 | 218.6 | 183.2 | 232.3 | 83.7 | 177.7 |
| T (200P) | 1680 | 1692 | 1671 | 1683 | 1666 | 1688 | 1664 |

| 72 hr gradient boat | | | | | | | |
|---|---|---|---|---|---|---|---|
| int | 960 | 975 | 990 | 945 | 1055 | 945 | 950 |
| int liq visc | 2.18E+06 | 1.88E+06 | 5.43E+05 | 2.21E+06 | 2.51E+05 | 3.29E+06 | 1.80E+06 |

| | 113 | 114 | 115 | 116 | 117 | 118 | 119 |
|---|---|---|---|---|---|---|---|
| $SiO_2$ | 69.17 | 72.45 | 77.4 | 74.55 | 72.35 | 75.95 | 73.14 |
| $Al_2O_3$ | 8.97 | 7.6 | 4.14 | 6.83 | 7.63 | 4.49 | 7.05 |
| $B_2O_3$ | 7.25 | 7.44 | 0 | 7.75 | 8.03 | 0 | 5.84 |
| $Li_2O$ | 0 | 0 | 0 | 0 | 0 | 0 | 0 |
| $Na_2O$ | 10.45 | 8.04 | 10.85 | 6.77 | 7.47 | 10.18 | 8.94 |
| $K_2O$ | 0.01 | 0 | 0 | 0.01 | 0.01 | 0 | 0 |
| ZnO | 0 | 0 | 0.97 | 0 | 0 | 1.09 | 0 |
| MgO | 2.95 | 0 | 5.99 | 1.95 | 2.23 | 7.02 | 3.29 |
| CaO | 0.04 | 0.02 | 0.03 | 0.04 | 0.03 | 0.03 | 0.03 |
| SrO | 1.01 | 0 | 0.5 | 1.95 | 2.09 | 1.11 | 1.57 |
| BaO | 0 | 4.3 | 0 | 0 | 0 | 0 | 0.02 |
| $SnO_2$ | 0.08 | 0.08 | 0.09 | 0.09 | 0.07 | 0.1 | 0.08 |
| $R_2O/Al_2O_3$ | 1.17 | 1.06 | 2.62 | 0.99 | 0.98 | 2.27 | 1.27 |
| $(R_2O + RO)/Al_2O_3$ | 1.61 | 1.63 | 4.43 | 1.57 | 1.55 | 4.33 | 1.96 |
| $R_xO - Al_2O_3 - MgO$ | -1.46 | 0.44 | 0.72 | -2 | -2.38 | -1.33 | -1.4 |
| strain | 541 | 559 | 561 | 547 | 547 | 573 | 552 |
| anneal | 586 | 601 | 612 | 598 | 595 | 624 | 597 |
| soft | 825 | 801.3 | 870.6 | 861.6 | 854.2 | 876.9 | 838.1 |
| CTE | 63.9 | 58.8 | 65.3 | 49.8 | 53 | 63.8 | 58.2 |
| density | 2.396 | 2.530 | 2.407 | 2.361 | 2.378 | 2.432 | 2.402 |
| strain (bbv) | 535.1 | 552.1 | 557.4 | 544.8 | 541.6 | 572.4 | 543.1 |
| anneal (bbv) | 581.6 | 597 | 607.5 | 593.9 | 590.2 | 622.5 | 589.6 |
| last bbv visc | 615.2 | 12.1676 | 12.0084 | 630.3 | 627.9 | 12.0276 | 12.0186 |
| last bbv T | 12.0429 | 628.8 | 647 | 12.0077 | 12.0224 | 662 | 625.5 |
| soft (ppv) | | | | | | | |
| Color shift | | | 0.004576 | | | | |
| Viscosity | | | | | | | |
| A | -1.784 | -0.961 | -1.889 | -2.1 | -2.075 | -2.016 | -1.808 |
| B | 6176.7 | 4553 | 6216.6 | 7434.6 | 7048 | 6405.8 | 6390.8 |
| To | 168.2 | 281.5 | 199.6 | 105.8 | 127.6 | 205.8 | 163 |
| T (200P) | 1680 | 1677 | 1683 | 1795 | 1738 | 1690 | 1718 |

TABLE 5-continued

| 72 hr gradient boat | | | | | | | |
|---|---|---|---|---|---|---|---|
| int | 940 | 875 | 950 | 945 | 970 | 1015 | 985 |
| int liq visc | 1.66E+06 | 5.13E+06 | 2.49E+06 | 5.74E+06 | 1.96E+06 | 7.95E+05 | 9.26E+05 |

| | 120 | 121 | 122 | 123 | 124 | 125 | 126 |
|---|---|---|---|---|---|---|---|
| $SiO_2$ | 72.43 | 72.05 | 70.11 | 70.93 | 72.09 | 76.38 | 73.24 |
| $Al_2O_3$ | 7.63 | 7.49 | 9.14 | 8.67 | 8.71 | 5.17 | 6.95 |
| $B_2O_3$ | 7.47 | 7.41 | 7.31 | 7.52 | 7.69 | 0 | 0 |
| $Li_2O$ | 0 | 0 | 0 | 0 | 1.23 | 0 | 0 |
| $Na_2O$ | 8.04 | 7.93 | 10.11 | 8.79 | 7.86 | 11.16 | 12.77 |
| $K_2O$ | 0 | 0.01 | 0 | 0.01 | 0.01 | 0 | 0 |
| ZnO | 0 | 0.96 | 0 | 0 | 0 | 0 | 0 |
| MgO | 0.04 | 2.04 | 1.95 | 2.32 | 1.22 | 6.6 | 3.9 |
| CaO | 4.24 | 0.03 | 0.02 | 0.04 | 0.02 | 0.03 | 0.03 |
| SrO | 0 | 1.92 | 1.21 | 1.57 | 1.06 | 0.51 | 2.98 |
| BaO | 0 | 0 | 0 | 0 | 0 | 0 | 0 |
| $SnO_2$ | 0.08 | 0.08 | 0.07 | 0.08 | 0.08 | 0.1 | 0.07 |
| $R_2O/Al_2O_3$ | 1.05 | 1.06 | 1.11 | 1.01 | 1.04 | 2.16 | 1.84 |
| $(R_2O + RO)/Al_2O_3$ | 1.61 | 1.72 | 1.45 | 1.47 | 1.31 | 3.54 | 2.83 |
| $R_xO - Al_2O_3 - MgO$ | 0.37 | −1.59 | −0.98 | −2.19 | −0.83 | −0.61 | 1.92 |
| strain | 565 | 543 | 549 | 549 | 522 | 566 | 543 |
| anneal | 608 | 589 | 595 | 596 | 569 | 619 | 590 |
| soft | 834.5 | 835.2 | 833.1 | 859.5 | 831.8 | 873.9 | 824 |
| CTE | 56.5 | 54.3 | 62.6 | 58.2 | 55.8 | 67.5 | 75.7 |
| density | 2.372 | 2.401 | 2.386 | 2.382 | 2.357 | 2.399 | 2.48 |
| strain (bbv) | 559.6 | 538 | 590 | 542.5 | 523 | 564.2 | 539.7 |
| anneal (bbv) | 507.4 | 585.8 | 541.9 | 591.4 | 571.6 | 614.5 | 586.7 |
| last bbv visc | 12.2374 | 12.0134 | 12.0101 | 629.2 | 609.5 | 12.0077 | 12.0222 |
| last bbv T | 639.1 | 623.1 | 627.4 | 12.0272 | 12.0178 | 653.6 | 623.6 |
| soft (ppv) | | | | | | | |
| Color shift | | | | | | | |
| Viscosity | | | | | | | |
| A | 71.14 | −1.928 | −1.78 | −2.072 | −1.893 | −2.035 | −1.734 |
| B | 5209.2 | 6686.9 | 6250.3 | 6986.5 | 6912 | 6543 | 5749.3 |
| To | 253.5 | 143.2 | 173.7 | 133.5 | 112.3 | 187.6 | 205.4 |
| T (200P) | 1704 | 1724 | 1705 | 1731 | 1760 | 1697 | 1630 |

| 72 hr gradient boat | | | | | | | |
|---|---|---|---|---|---|---|---|
| int | 980 | 935 | 950 | 980 | 910 | 950 | 970 |
| int liq visc | 7.59E+05 | 3.29E+06 | 1.87E+06 | 1.52E+06 | 5.91E+06 | 3.52E+06 | 6.10E+05 |

| | 127 | 128 | 129 | 130 | 131 | 132 | 133 |
|---|---|---|---|---|---|---|---|
| $SiO_2$ | 77.49 | 75.95 | 77.67 | 76.16 | 76.23 | 77.56 | 76.37 |
| $Al_2O_3$ | 4.68 | 4.91 | 4.34 | 4.36 | 4.37 | 3.96 | 5.18 |
| $B_2O_3$ | 0 | 0 | 0 | 0 | 0 | 0 | 0 |
| $Li_2O$ | 0 | 0 | 0 | 0 | 0 | 0 | 0 |
| $Na_2O$ | 10.76 | 11.24 | 10.74 | 9.58 | 8.32 | 9.33 | 11.66 |
| $K_2O$ | 0 | 0 | 0 | 0.58 | 1.75 | 1.46 | 0 |
| ZnO | 0.97 | 1.48 | 0.97 | 1.2 | 1.18 | 0 | 0 |
| MgO | 5.94 | 6.25 | 5.88 | 6.89 | 6.94 | 6.75 | 6.61 |
| CaO | 0.03 | 0.03 | 0.03 | 0.05 | 0.05 | 0.03 | 0.03 |
| SrO | 0 | 0 | 0.25 | 1.05 | 1.02 | 0.79 | 0 |
| BaO | 0 | 0 | 0 | 0 | 0 | 0 | 0 |
| $SnO_2$ | 0.09 | 0.1 | 0.09 | 0.1 | 0.09 | 0.09 | 0.01 |
| $R_2O/Al_2O_3$ | 2.30 | 2.29 | 2.47 | 2.33 | 2.30 | 2.72 | 2.25 |
| $(R_2O + RO)/Al_2O_3$ | 3.78 | 3.87 | 4.12 | 4.44 | 4.41 | 4.64 | |
| $R_xO - Al_2O_3 - MgO$ | 0.14 | 0.08 | 0.52 | −1.09 | −1.24 | 0.08 | |
| strain | 575 | 573 | 568 | 566 | 564 | 548 | 565 |
| anneal | 628 | 626 | 621 | 616 | 616 | 601 | 618 |
| soft | 886.8 | 883.3 | 876.7 | 868.1 | 878.9 | 858.1 | 874.7 |
| CTE | 64.8 | 66.4 | 64.9 | 64.9 | 66.9 | 68.4 | 69 |
| density | 2.394 | 2.413 | 2.398 | 2.428 | 2.426 | 2.399 | 2.388 |
| strain (bbv) | 572.5 | 571.9 | 564.8 | 561.9 | 561.7 | 546.5 | 564.6 |
| anneal (bbv) | 624.8 | 621.8 | 616.6 | 612.5 | 613.3 | 598.2 | 614.8 |
| last bbv visc | 12.0168 | 12.0291 | 12.0234 | 12.0218 | 12.0076 | 12.0149 | 12.0076 |
| last bbv T | 665.4 | 660.4 | 656.4 | 652.5 | 654.2 | 638.3 | 654 |
| soft (ppv) | | | | | | | |
| Color shift | 0.005485 | | | | | | |
| Viscosity | | | | | | | |
| A | −1.869 | −1.867 | −1.804 | −2.03 | −2.074 | −1.966 | −1.989 |
| B | 6229.9 | 6132.6 | 6165.5 | 6430.3 | 6603.1 | 6524.4 | 6450.8 |
| To | 216.6 | 219.2 | 210.5 | 194.8 | 185.3 | 171.6 | 192.9 |
| T (200P) | 1711 | 1691 | 1712 | 1680 | 1695 | 1701 | 1697 |

TABLE 5-continued

| 72 hr gradient boat | | | | | | | |
|---|---|---|---|---|---|---|---|
| int | 955 | 970 | 955 | 990 | 990 | 880 | 935 |
| int liq visc | 3.70E+06 | 2.00E+06 | 3.00E+06 | 1.14E+06 | 1.35E+06 | 1.75E+07 | 5.05E+06 |

Additional examples can include the following compositions in mol %:

| | | | | | | | |
|---|---|---|---|---|---|---|---|
| SiO$_2$ | 71.86 | 73 | 63-81 | 64-80 | 68-75 | 67 | 71 |
| Al$_2$O$_3$ | 0.08 | 0.05 | 0-2 | 0-5 | 0-3 | 0 | 0.09 |
| MgO | 5.64 | 0.22 | 0-6 | 0-10 | 2-6 | 14 | 6 |
| CaO | 9.23 | 10.9 | 7-14 | 2-15 | 6-11 | 6 | 9 |
| SrO | 0.00 | 0.23 | 0-2 | | | | |
| Li$_2$O or Li$_2$O$_5$ | 0.00 | 0.002 | 0-2 | | | | |
| Na$_2$O | 13.13 | 14.91 | 9-15 | 9-18 | 11-15 | 13 | 13 |
| K$_2$O | 0.02 | 0.012 | 0-1.5 | 0-5 | 0-3 | 0.02 | 0.02 |
| Fe$_2$O$_3$ | 0.04 | 0.016 | 0-0.6 | | | | |
| Cr$_2$O$_3$ | 0.00 | 0.00 | 0-0.2 | | | | |
| MnO$_2$ | 0.00 | 0.00 | 0-0.2 | | | | |
| Co$_3$O$_4$ | 0.00 | 0.00 | 0-0.1 | | | | |
| TiO$_2$ | 0.01 | 0.008 | 0-0.8 | | | | |
| SO$_3$ | 0.00 | 0.078 | 0-0.2 | 0-05-0.4 | 0.1-0.4 | | |
| Se | 0.00 | 0.00 | 0-0.1 | | | | |

As noted in the above tables an exemplary glass article in some embodiments can comprise a glass sheet with a front face having a width and a height, a back face opposite the front face, and a thickness between the front face and back face, forming four edges around the front and back faces, wherein the glass sheet comprises: between about 65.79 mol % to about 78.17 mol % SiO$_2$, between about 2.94 mol % to about 12.12 mol % Al$_2$O$_3$, between about 0 mol % to about 11.16 mol % B$_2$O$_3$, between about 0 mol % to about 2.06 mol % Li$_2$O, between about 3.52 mol % to about 13.25 mol % Na$_2$O, between about 0 mol % to about 4.83 mol % K$_2$O, between about 0 mol % to about 3.01 mol % ZnO, between about 0 mol % to about 8.72 mol % MgO, between about 0 mol % to about 4.24 mol % CaO, between about 0 mol % to about 6.17 mol % SrO, between about 0 mol % to about 4.3 mol % BaO, and between about 0.07 mol % to about 0.11 mol % SnO$_2$. In some embodiments, the glass article comprises a color shift <0.008. In some embodiments, the glass article comprises a color shift <0.005. In some embodiments, the glass article comprises an R$_x$O/Al$_2$O$_3$ between 0.95 and 3.23, wherein R is any one or more of Li, Na, K, Rb, Cs and x is 2. In some embodiments, the glass article comprises an R$_x$O/Al$_2$O$_3$ between 1.18 and 5.68, wherein R is any one or more of Li, Na, K, Rb, Cs and x is 2, or Zn, Mg, Ca, Sr or Ba and x is 1. In some embodiments, the glass article comprises an R$_x$O—Al$_2$O$_3$—MgO between −4.25 and 4.0, wherein R is any one or more of Li, Na, K, Rb, Cs and x is 2. In some embodiments, the glass has a strain temperature between about 522° C. and 590° C. In some embodiments, the glass has an annealing temperature between about 566° C. and 641° C. In some embodiments, the glass has a softening temperature between about 800° C. and 914° C. In some embodiments, the glass has a CTE between about 49.6×10-7/° C. to about 80×10-7/° C. In some embodiments, the glass has a density between about 2.34 gm/cc @ 20° C. and about 2.53 gm/cc @ 20° C. In some embodiments, the glass article is a light guide plate. In some embodiments, the thickness of the plate is between about 0.2 mm and about 8 mm. In some embodiments, the thickness has a variation of less than 5%. In some embodiments, the light guide plate is manufactured from a fusion draw process, slot draw process, or a float process. In some embodiments, the glass comprises less than 1 ppm each of Co, Ni, and Cr. In some embodiments, the concentration of Fe is <about 50 ppm, <about 20 ppm, or <about 10 ppm. In some embodiments, Fe+30Cr+35Ni<about 60 ppm, <about 40 ppm, <about 20 ppm, or <about 10 ppm. In some embodiments, the transmittance at 450 nm with at least 500 mm in length is greater than or equal to 85%, the transmittance at 550 nm with at least 500 mm in length is greater than or equal to 90%, or the transmittance at 630 nm with at least 500 mm in length is greater than or equal to 85%, and combinations thereof. In some embodiments, the glass sheet is chemically strengthened. In further embodiments, the glass comprises from about 0.1 mol % to about 3.0 mol % ZnO, from about 0.1 mol % to about 1.0 mol % TiO$_2$, from about 0.1 mol % to about 1.0 mol % V$_2$O$_3$, from about 0.1 mol % to about 1.0 mol % Nb$_2$O$_5$, from about 0.1 mol % to about 1.0 mol % MnO, from about 0.1 mol % to about 1.0 mol % ZrO$_2$, from about 0.1 mol % to about 1.0 mol % As$_2$O$_3$, from about 0.1 mol % to about 1.0 mol % SnO$_2$, from about 0.1 mol % to about 1.0 mol % MoO$_3$, from about 0.1 mol % to about 1.0 mol % Sb$_2$O$_3$, or from about 0.1 mol % to about 1.0 mol % CeO$_2$. In additional embodiments, the glass comprises between 0.1 mol % to no more than about 3.0 mol % of one or combination of any of ZnO, TiO$_2$, V$_2$O$_3$, Nb$_2$O$_5$, MnO, ZrO$_2$, As$_2$O$_3$, SnO$_2$, MoO$_3$, Sb$_2$O$_3$, and CeO$_2$.

In further embodiments, a glass article is provided comprising a glass sheet with a front face having a width and a height, a back face opposite the front face, and a thickness between the front face and back face, forming four edges around the front and back faces, wherein the glass sheet comprises: between about 66 mol % to about 78 mol % SiO$_2$, between about 4 mol % to about 11 mol % Al$_2$O$_3$, between about 4 mol % to about 11 mol % B$_2$O$_3$, between about 0 mol % to about 2 mol % Li$_2$O, between about 4 mol % to about 12 mol % Na$_2$O, between about 0 mol % to about 2 mol % K$_2$O, between about 0 mol % to about 2 mol % ZnO, between about 0 mol % to about 5 mol % MgO, between about 0 mol % to about 2 mol % CaO, between about 0 mol % to about 5 mol % SrO, between about 0 mol % to about 2 mol % BaO, and between about 0 mol % to about 2 mol % SnO$_2$. In some embodiments, the glass article comprises a color shift <0.008. In some embodiments, the glass article comprises a color shift <0.005. In some embodiments, the glass article comprises an R$_x$O/Al$_2$O$_3$ between 0.95 and 3.23, wherein R is any one or more of Li, Na, K, Rb, Cs and x is 2. In some embodiments, the glass article comprises an R$_x$O/Al$_2$O$_3$ between 1.18 and 5.68, wherein R is any one or more of Li, Na, K, Rb, Cs and x is 2, or Zn, Mg, Ca, Sr or Ba and x is 1. In some embodiments, the glass article comprises an R$_x$O—Al$_2$O$_3$—MgO between −4.25 and 4.0, wherein R is any one or more of Li, Na, K, Rb, Cs and x is 2. In some embodiments, the glass has a strain temperature between about 522° C. and 590° C. In some embodiments, the glass has an annealing temperature between about 566° C. and 641° C. In some embodiments, the glass has a softening temperature between about 800° C. and 914° C. In some embodiments, the glass has a CTE between about 49.6×10-7/° C. to about 80×10-7/° C. In some embodiments, the glass has a density between about 2.34 gm/cc @ 20° C. and about 2.53 gm/cc @ 20° C. In some embodiments, the glass article is a light guide plate. In some embodiments, the thickness of the plate is between about 0.2 mm and about 8 mm. In some embodiments, the thickness has a variation of less than 5%. In some embodiments, the light guide plate is manufactured from a fusion draw process, slot draw process, or a float process. In some embodiments, the glass comprises less than 1 ppm each of Co, Ni, and Cr. In some embodiments, the concentration of Fe is <about 50 ppm, <about 20 ppm, or <about 10 ppm. In some embodiments, Fe+30Cr+35Ni<about 60 ppm, <about 40 ppm, <about 20 ppm, or <about 10 ppm. In some embodiments, the transmittance at 450 nm with at least 500 mm in length is greater than or equal to 85%, the transmittance at 550 nm with at least 500 mm in length is greater than or equal to 90%, or the transmittance at 630 nm with at least 500 mm in length is greater than or equal to 85%, and combinations thereof. In some embodiments, the glass sheet is chemically strengthened. In further embodiments, the glass comprises from about 0.1 mol % to about 3.0 mol % ZnO, from about 0.1 mol % to about 1.0 mol % $TiO_2$, from about 0.1 mol % to about 1.0 mol % $V_2O_3$, from about 0.1 mol % to about 1.0 mol % $Nb_2O_5$, from about 0.1 mol % to about 1.0 mol % MnO, from about 0.1 mol % to about 1.0 mol % $ZrO_2$, from about 0.1 mol % to about 1.0 mol % $As_2O_3$, from about 0.1 mol % to about 1.0 mol % $SnO_2$, from about 0.1 mol % to about 1.0 mol % $MoO_3$, from about 0.1 mol % to about 1.0 mol % $Sb_2O_3$, or from about 0.1 mol % to about 1.0 mol % $CeO_2$. In additional embodiments, the glass comprises between 0.1 mol % to no more than about 3.0 mol % of one or combination of any of ZnO, $TiO_2$, $V_2O_3$, $Nb_2O_5$, MnO, $ZrO_2$, $As_2O_3$, $SnO_2$, $MoO_3$, $Sb_2O_3$, and $CeO_2$.

In additional embodiments, a glass article is provided comprising a glass sheet with a front face having a width and a height, a back face opposite the front face, and a thickness between the front face and back face, forming four edges around the front and back faces, wherein the glass sheet comprises: between about 72 mol % to about 80 mol % $SiO_2$, between about 3 mol % to about 7 mol % $Al_2O_3$, between about 0 mol % to about 2 mol % $B_2O_3$, between about 0 mol % to about 2 mol % $Li_2O$, between about 6 mol % to about 15 mol % $Na_2O$, between about 0 mol % to about 2 mol % $K_2O$, between about 0 mol % to about 2 mol % ZnO, between about 2 mol % to about 10 mol % MgO, between about 0 mol % to about 2 mol % CaO, between about 0 mol % to about 2 mol % SrO, between about 0 mol % to about 2 mol % BaO, and between about 0 mol % to about 2 mol % $SnO_2$. In some embodiments, the glass article comprises a color shift <0.008. In some embodiments, the glass article comprises a color shift <0.005. In some embodiments, the glass article comprises an $R_xO/Al_2O_3$ between 0.95 and 3.23, wherein R is any one or more of Li, Na, K, Rb, Cs and x is 2. In some embodiments, the glass article comprises an $R_xO/Al_2O_3$ between 1.18 and 5.68, wherein R is any one or more of Li, Na, K, Rb, Cs and x is 2, or Zn, Mg, Ca, Sr or Ba and x is 1. In some embodiments, the glass article comprises an $R_xO$—$Al_2O_3$—MgO between −4.25 and 4.0, wherein R is any one or more of Li, Na, K, Rb, Cs and x is 2. In some embodiments, the glass has a strain temperature between about 522° C. and 590° C. In some embodiments, the glass has an annealing temperature between about 566° C. and 641° C. In some embodiments, the glass has a softening temperature between about 800° C. and 914° C. In some embodiments, the glass has a CTE between about 49.6×10-7/° C. to about 80×10-7/° C. In some embodiments, the glass has a density between about 2.34 gm/cc @ 20° C. and about 2.53 gm/cc @ 20° C. In some embodiments, the glass article is a light guide plate. In some embodiments, the thickness of the plate is between about 0.2 mm and about 8 mm. In some embodiments, the thickness has a variation of less than 5%. In some embodiments, the light guide plate is manufactured from a fusion draw process, slot draw process, or a float process. In some embodiments, the glass comprises less than 1 ppm each of Co, Ni, and Cr. In some embodiments, the concentration of Fe is <about 50 ppm, <about 20 ppm, or <about 10 ppm. In some embodiments, Fe+30Cr+35Ni<about 60 ppm, <about 40 ppm, <about 20 ppm, or <about 10 ppm. In some embodiments, the transmittance at 450 nm with at least 500 mm in length is greater than or equal to 85%, the transmittance at 550 nm with at least 500 mm in length is greater than or equal to 90%, or the transmittance at 630 nm with at least 500 mm in length is greater than or equal to 85%, and combinations thereof. In some embodiments, the glass sheet is chemically strengthened. In further embodiments, the glass comprises from about 0.1 mol % to about 3.0 mol % ZnO, from about 0.1 mol % to about 1.0 mol % $TiO_2$, from about 0.1 mol % to about 1.0 mol % $V_2O_3$, from about 0.1 mol % to about 1.0 mol % $Nb_2O_5$, from about 0.1 mol % to about 1.0 mol % MnO, from about 0.1 mol % to about 1.0 mol % $ZrO_2$, from about 0.1 mol % to about 1.0 mol % $As_2O_3$, from about 0.1 mol % to about 1.0 mol % 51102, from about 0.1 mol % to about 1.0 mol % $MoO_3$, from about 0.1 mol % to about 1.0 mol % $Sb_2O_3$, or from about 0.1 mol % to about 1.0 mol % $CeO_2$. In additional embodiments, the glass comprises between 0.1 mol % to no more than about 3.0 mol % of one or combination of any of ZnO, $TiO_2$, $V_2O_3$, $Nb_2O_5$, MnO, $ZrO_2$, $As_2O_3$, $SnO_2$, $MoO_3$, $Sb_2O_3$, and $CeO_2$.

In additional embodiments, a glass article is provided comprising a glass sheet having between about 60 mol % to about 80 mol % $SiO_2$, between about 0 mol % to about 15 mol % $Al_2O_3$, between about 0 mol % to about 15 mol % $B_2O_3$, and about 2 mol % to about 50 mol % $R_xO$, wherein R is any one or more of Li, Na, K, Rb, Cs and x is 2, or Zn, Mg, Ca, Sr or Ba and x is 1, and wherein Fe+30Cr+35Ni<about 60 ppm. In some embodiments, the glass has a color shift <0.008. In some embodiments, the glass has a color shift <0.005. In further embodiments, the glass comprises from about 0.1 mol % to about 3.0 mol % ZnO, from about 0.1 mol % to about 1.0 mol % $TiO_2$, from about 0.1 mol % to about 1.0 mol % $V_2O_3$, from about 0.1 mol % to about 1.0 mol % $Nb_2O_5$, from about 0.1 mol % to about 1.0 mol % MnO, from about 0.1 mol % to about 1.0 mol % $ZrO_2$, from about 0.1 mol % to about 1.0 mol % $As_2O_3$, from about 0.1 mol % to about 1.0 mol % $SnO_2$, from about 0.1 mol % to about 1.0 mol % $MoO_3$, from about 0.1 mol % to about 1.0 mol % $Sb_2O_3$, or from about 0.1 mol % to about 1.0 mol % $CeO_2$. In additional embodiments, the glass comprises between 0.1 mol % to no more than about 3.0 mol % of one or combination of any of ZnO, $TiO_2$, $V_2O_3$, $Nb_2O_5$, MnO, $ZrO_2$, $As_2O_3$, $SnO_2$, $MoO_3$, $Sb_2O_3$, and $CeO_2$.

In yet further embodiments, a glass article is provided comprising a glass sheet having between about 60 mol % to about 80 mol % $SiO_2$, between about 0 mol % to about 15 mol % $Al_2O_3$, between about 0 mol % to about 15 mol % $B_2O_3$, and about 2 mol % to about 50 mol % $R_xO$, wherein R is any one or more of Li, Na, K, Rb, Cs and x is 2, or Zn, Mg, Ca, Sr or Ba and x is 1, and wherein the glass has a color shift <0.008. In some embodiments, the glass has a color shift <0.005. In further embodiments, the glass comprises from about 0.1 mol % to about 3.0 mol % ZnO, from about 0.1 mol % to about 1.0 mol % $TiO_2$, from about 0.1 mol % to about 1.0 mol % $V_2O_3$, from about 0.1 mol % to about 1.0 mol % $Nb_2O_5$, from about 0.1 mol % to about 1.0 mol % MnO, from about 0.1 mol % to about 1.0 mol % $ZrO_2$, from about 0.1 mol % to about 1.0 mol % $As_2O_3$, from about 0.1 mol % to about 1.0 mol % $SnO_2$, from about 0.1 mol % to about 1.0 mol % $MoO_3$, from about 0.1 mol % to about 1.0 mol % $Sb_2O_3$, or from about 0.1 mol % to about 1.0 mol % $CeO_2$. In additional embodiments, the glass comprises between 0.1 mol % to no more than about 3.0 mol % of one or combination of any of ZnO, $TiO_2$, $V_2O_3$, $Nb_2O_5$, MnO, $ZrO_2$, $As_2O_3$, $SnO_2$, $MoO_3$, $Sb_2O_3$, and $CeO_2$.

In other embodiments, a glass article is provided comprising a glass sheet having between about 65.79 mol % to about 78.17 mol % $SiO_2$, between about 2.94 mol % to about 12.12 mol % $Al_2O_3$, between about 0 mol % to about 11.16 mol % $B_2O_3$, and about 3.52 mol % to about 42.39 mol % $R_xO$, wherein R is any one or more of Li, Na, K, Rb, Cs and x is 2, or Zn, Mg, Ca, Sr or Ba and x is 1, and wherein the glass has a color shift <0.008. In some embodiments, the glass has a color shift <0.005. In further embodiments, the glass comprises from about 0.1 mol % to about 3.0 mol % ZnO, from about 0.1 mol % to about 1.0 mol % $TiO_2$, from about 0.1 mol % to about 1.0 mol % $V_2O_3$, from about 0.1 mol % to about 1.0 mol % $Nb_2O_5$, from about 0.1 mol % to about 1.0 mol % MnO, from about 0.1 mol % to about 1.0 mol % $ZrO_2$, from about 0.1 mol % to about 1.0 mol % $As_2O_3$, from about 0.1 mol % to about 1.0 mol % $SnO_2$, from about 0.1 mol % to about 1.0 mol % $MoO_3$, from about 0.1 mol % to about 1.0 mol % $Sb_2O_3$, or from about 0.1 mol % to about 1.0 mol % $CeO_2$. In additional embodiments, the glass comprises between 0.1 mol % to no more than about 3.0 mol % of one or combination of any of ZnO, $TiO_2$, $V_2O_3$, $Nb_2O_5$, MnO, $ZrO_2$, $As_2O_3$, $SnO_2$, $MoO_3$, $Sb_2O_3$, and $CeO_2$.

In further embodiments, a glass article is provided comprising a glass sheet having between about 60 mol % to about 81 mol % $SiO_2$, between about 0 mol % to about 2 mol % $Al_2O_3$, between about 0 mol % to about 15 mol % MgO, between about 0 mol % to about 2 mol % $Li_2O$, between about 9 mol % to about 15 mol % $Na_2O$, between about 0 mol % to about 1.5 mol % $K_2O$, between about 7 mol % to about 14 mol % CaO, between about 0 mol % to about 2 mol % SrO, and wherein Fe+30Cr+35Ni<about 60 ppm. In some embodiments, the glass has a color shift <0.008. In some embodiments, the glass has a color shift <0.005. In further embodiments, the glass comprises from about 0.1 mol % to about 3.0 mol % ZnO, from about 0.1 mol % to about 1.0 mol % $TiO_2$, from about 0.1 mol % to about 1.0 mol % $V_2O_3$, from about 0.1 mol % to about 1.0 mol % $Nb_2O_5$, from about 0.1 mol % to about 1.0 mol % MnO, from about 0.1 mol % to about 1.0 mol % $ZrO_2$, from about 0.1 mol % to about 1.0 mol % $As_2O_3$, from about 0.1 mol % to about 1.0 mol % $SnO_2$, from about 0.1 mol % to about 1.0 mol % $MoO_3$, from about 0.1 mol % to about 1.0 mol % $Sb_2O_3$, or from about 0.1 mol % to about 1.0 mol % $CeO_2$. In additional embodiments, the glass comprises between 0.1 mol % to no more than about 3.0 mol % of one or combination of any of ZnO, $TiO_2$, $V_2O_3$, $Nb_2O_5$, MnO, $ZrO_2$, $As_2O_3$, $SnO_2$, $MoO_3$, $Sb_2O_3$, and $CeO_2$.

In additional embodiments, a glass article is provided comprising a glass sheet having between about 60 mol % to about 81 mol % $SiO_2$, between about 0 mol % to about 2 mol % $Al_2O_3$, between about 0 mol % to about 15 mol % MgO, between about 0 mol % to about 2 mol % $Li_2O$, between about 9 mol % to about 15 mol % $Na_2O$, between about 0 mol % to about 1.5 mol % $K_2O$, between about 7 mol % to about 14 mol % CaO, and between about 0 mol % to about 2 mol % SrO, wherein the glass has a color shift <0.008. In some embodiments, the glass has a color shift <0.005. In further embodiments, the glass comprises from about 0.1 mol % to about 3.0 mol % ZnO, from about 0.1 mol % to about 1.0 mol % $TiO_2$, from about 0.1 mol % to about 1.0 mol % $V_2O_3$, from about 0.1 mol % to about 1.0 mol % $Nb_2O_5$, from about 0.1 mol % to about 1.0 mol % MnO, from about 0.1 mol % to about 1.0 mol % $ZrO_2$, from about 0.1 mol % to about 1.0 mol % $As_2O_3$, from about 0.1 mol % to about 1.0 mol % $SnO_2$, from about 0.1 mol % to about 1.0 mol % $MoO_3$, from about 0.1 mol % to about 1.0 mol % $Sb_2O_3$, or from about 0.1 mol % to about 1.0 mol % $CeO_2$. In additional embodiments, the glass comprises between 0.1 mol % to no more than about 3.0 mol % of one or combination of any of ZnO, $TiO_2$, $V_2O_3$, $Nb_2O_5$, MnO, $ZrO_2$, $As_2O_3$, $SnO_2$, $MoO_3$, $Sb_2O_3$, and $CeO_2$.

It will be appreciated that the various disclosed embodiments may involve particular features, elements or steps that are described in connection with that particular embodiment. It will also be appreciated that a particular feature, element or step, although described in relation to one particular embodiment, may be interchanged or combined with alternate embodiments in various non-illustrated combinations or permutations.

It is also to be understood that, as used herein the terms "the," "a," or "an," mean "at least one," and should not be limited to "only one" unless explicitly indicated to the contrary. Thus, for example, reference to "a ring" includes examples having two or more such rings unless the context clearly indicates otherwise. Likewise, a "plurality" or an "array" is intended to denote "more than one." As such, a "plurality of droplets" includes two or more such droplets, such as three or more such droplets, etc., and an "array of rings" comprises two or more such droplets, such as three or more such rings, etc.

Ranges can be expressed herein as from "about" one particular value, and/or to "about" another particular value. When such a range is expressed, examples include from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

The terms "substantial," "substantially," and variations thereof as used herein are intended to note that a described feature is equal or approximately equal to a value or description. For example, a "substantially planar" surface is intended to denote a surface that is planar or approximately planar. Moreover, as defined above, "substantially similar" is intended to denote that two values are equal or approximately equal. In some embodiments, "substantially similar" may denote values within about 10% of each other, such as within about 5% of each other, or within about 2% of each other.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

While various features, elements or steps of particular embodiments may be disclosed using the transitional phrase "comprising," it is to be understood that alternative embodiments, including those that may be described using the transitional phrases "consisting" or "consisting essentially of," are implied. Thus, for example, implied alternative embodiments to a device that comprises A+B+C include embodiments where a device consists of A+B+C and embodiments where a device consists essentially of A+B+C.

It will be apparent to those skilled in the art that various modifications and variations can be made to the present disclosure without departing from the spirit and scope of the disclosure. Since modifications combinations, sub-combinations and variations of the disclosed embodiments incorporating the spirit and substance of the disclosure may occur to persons skilled in the art, the disclosure should be construed to include everything within the scope of the appended claims and their equivalents.

What is claimed is:

1. A light guide plate, comprising:
   a glass sheet with a front face having a width and a height, a back face opposite the front face, and a thickness between the front face and back face, forming four edges around the front and back faces,
   wherein the glass sheet comprises:
   65.79 mol % to 78.17 mol % $SiO_2$,
   2.94 mol % to 12.12 mol % $Al_2O_3$,
   0 mol % to 11.16 mol % $B_2O_3$,
   0 mol % to 2.06 mol % $Li_2O$,
   3.52 mol % to 10.55 mol % $Na_2O$,
   0 mol % to 4.83 mol % $K_2O$,
   0 mol % to 3.01 mol % ZnO,
   0 mol % to 8.72 mol % MgO,
   0 mol % to 4.24 mol % CaO,
   0 mol % to 6.17 mol % SrO,
   0 mol % to 4.3 mol % BaO, and
   0.07 mol % to 0.11 mol % $SnO_2$,
   wherein the glass sheet comprises less than 10 ppm of Fe, and the glass sheet has a color shift <0.005.

2. The light guide plate of claim 1, wherein $R_xO/Al_2O_3$ is between 0.95 and 3.23, where R is any one or more of Li, Na, K, Rb, and Cs, and x is 2;
   or $R_xO/Al_2O_3$ is between 1.18 and 5.68, where
   R is any one or more of Li, Na, K, Rb, and Cs and x is 2, or any one or more of Zn, Mg, Ca, Sr, or Ba and x is 1.

3. The light guide plate of claim 1, wherein $R_xO—Al_2O_3—MgO$ is between −4.25 and 4.0, where R is any one of Li, Na, K, Rb, and Cs and x is 2.

4. The light guide plate of claim 1, wherein the glass comprises:
   from 0.1 mol % to 3.0 mol % ZnO;
   from 0.1 mol % to 1.0 mol % $TiO_2$;
   from 0.1 mol % to 1.0 mol % $V_2O_3$;
   from 0.1 mol % to 1.0 mol % $Nb_2O_5$;
   from 0.1 mol % to 1.0 mol % MnO;
   from 0.1 mol % to 1.0 mol % $ZrO_2$;
   from 0.1 mol % to 1.0 mol % $As_2O_3$;
   from 0.1 mol % to 0.11 mol % $SnO_2$;
   from 0.1 mol % to 1.0 mol % $MoO_3$;
   from 0.1 mol % to 1.0 mol % $Sb_2O_3$; or
   from 0.1 mol % to 1.0 mol % $CeO_2$.

5. The light guide plate of claim 4, wherein the glass comprises 0.1 mol % to 3.0 mol % of a combination of any of ZnO, $TiO_2$, $V_2O_3$, $Nb_2O_5$, MnO, $ZrO_2$, $As_2O_3$, $SnO_2$, $MoO_3$, $Sb_2O_3$, and $CeO_2$.

6. The light guide plate of claim 1, wherein the glass sheet comprises less than 1 ppm each of Co, Ni, and Cr.

7. The light guide plate of claim 1, wherein Fe+30Cr+35Ni is <60 ppm.

8. The light guide plate of claim 1, wherein Fe+30Cr+35Ni is <40 ppm.

9. The light guide plate of claim 1, wherein Fe+30Cr+35Ni is <20 ppm.

10. The light guide plate of claim 1, wherein Fe+30Cr+35Ni is <10 ppm.

11. The light guide plate of claim 1, wherein the glass sheet has a strain temperature of 522° C. to 590° C., an annealing temperature of 566° C. to 641° C., a softening temperature of 800° C. to 914° C., a CTE of $49.6 \times 10^{-7}/°$ C. to $80 \times 10^{-7}/°$ C., or a density of 2.34 gm/cc @ 20° C. to 2.53 gm/cc @ 20° C.

12. The light guide plate of claim 1, wherein the transmittance at 450 nm with at least 500 mm in length is greater than or equal to 85%, the transmittance at 550 nm with at least 500 mm in length is greater than or equal to 90%, or the transmittance at 630 nm with at least 500 mm in length is greater than or equal to 85%, and combinations thereof.

13. The light guide plate of claim 1, wherein the light guide plate has a thickness of 0.2 mm to 8 mm.

14. The light guide plate of claim 13, wherein the light guide plate is manufactured from a fusion draw process, slot draw process, or a float process.

15. The light guide plate of claim 1, wherein the glass sheet is chemically strengthened.

16. A light guide plate, comprising:
   a glass sheet with a front face having a width and a height, a back face opposite the front face, and a thickness between the front face and back face, forming four edges around the front and back faces,
   wherein the glass sheet comprises:
   66 mol % to 78 mol % $SiO_2$,
   4 mol % to 11 mol % $Al_2O_3$,
   4 mol % to 11 mol % $B_2O_3$,
   0 mol % to 2 mol % $Li_2O$,
   4 mol % to 12 mol % $Na_2O$,
   0 mol % to 2 mol % $K_2O$,
   0 mol % to 2 mol % ZnO,
   0 mol % to 5 mol % MgO,
   0 mol % to 2 mol % CaO,
   0 mol % to 5 mol % SrO,
   0 mol % to 2 mol % BaO, and
   0 mol % to 2 mol % $SnO_2$,
   wherein the glass sheet comprises less than 10 ppm of Fe, and the glass sheet has a color shift <0.005.

17. The light guide plate of claim 16, wherein $R_xO/Al_2O_3$ is 0.95 to 3.23, where R is any one or more of Li, Na, K, Rb, and Cs and x is 2,
   or $R_xO/Al_2O_3$ is 1.18 to 5.68, where R is any one or more of Li, Na, K, Rb, and Cs and x is 2, or
   any one or more of Zn, Mg, Ca, Sr, or Ba and x is 1.

18. The light guide plate of claim 16, wherein $R_xO—Al_2O_3—MgO$ is between −4.25 and 4.0, where R is any one or more of Li, Na, K, Rb, Cs and x is 2.

19. The light guide plate of claim 16, wherein the glass comprises:
   from 0.1 mol % to 2.0 mol % ZnO;
   from 0.1 mol % to 1.0 mol % $TiO_2$;
   from 0.1 mol % to 1.0 mol % $V_2O_3$;
   from 0.1 mol % to 1.0 mol % $Nb_2O_5$;
   from 0.1 mol % to 1.0 mol % MnO;
   from 0.1 mol % to 1.0 mol % $ZrO_2$;
   from 0.1 mol % to 1.0 mol % $As_2O_3$;
   from 0.1 mol % to 1.0 mol % $SnO_2$;
   from 0.1 mol % to 1.0 mol % $MoO_3$;
   from 0.1 mol % to 1.0 mol % $Sb_2O_3$; or
   from 0.1 mol % to 1.0 mol % $CeO_2$.

20. The light guide plate of claim 19, wherein the glass comprises 0.1 mol % to 3.0 mol % of a combination of any of ZnO, $TiO_2$, $V_2O_3$, $Nb_2O_5$, MnO, $ZrO_2$, $As_2O_3$, $SnO_2$, $MoO_3$, $Sb_2O_3$, and $CeO_2$.

21. The light guide plate of claim 16, wherein the glass sheet comprises less than 1 ppm each of Co, Ni, and Cr.

22. The light guide plate of claim 16, wherein Fe+30Cr+35Ni is <60 ppm.

23. The glass article of claim 16, wherein the glass sheet has a strain temperature of 522° C. to 590° C., an annealing temperature of 566° C. to 641° C., a softening temperature of 800° C. to 914° C., a CTE of $49.6 \times 10^{-7}/°$ C. to $80 \times 10^{-7}/°$ C., or a density of 2.34 gm/cc @ 20° C. to 2.53 gm/cc @ 20° C.

24. The light guide plate of claim 16 wherein the transmittance at 450 nm with at least 500 mm in length is greater than or equal to 85%, the transmittance at 550 nm with at least 500 mm in length is greater than or equal to 90%, or the transmittance at 630 nm with at least 500 mm in length is greater than or equal to 85%, and combinations thereof.

25. The light guide plate of claim 16, wherein the light guide plate has a thickness of 0.2 mm to 8 mm.

26. The light guide plate of claim 25, wherein the light guide plate is manufactured from a fusion draw process, slot draw process, or a float process.

27. The light guide plate of claim 16 wherein the glass sheet is chemically strengthened.

28. A light guide plate, comprising:
a glass sheet with a front face having a width and a height, a back face opposite the front face, and a thickness between the front face and back face, forming four edges around the front and back faces,
wherein the glass sheet comprises:
72 mol % to 80 mol % $SiO_2$,
3 mol % to 7 mol % $Al_2O_3$,
0 mol % to 2 mol % $B_2O_3$,
0 mol % to 2 mol % $Li_2O$,
6 mol % to 15 mol % $Na_2O$,
0 mol % to 2 mol % $K_2O$,
0 mol % to 2 mol % ZnO,
2 mol % to 10 mol % MgO,
0 mol % to 2 mol % CaO,
0 mol % to 2 mol % SrO,
0 mol % to 2 mol % BaO, and
0 mol % to 2 mol % $SnO_2$,
wherein the glass sheet comprises less than 10 ppm of Fe, and the glass sheet has a color shift <0.005.

29. The light guide plate of claim 28, wherein $R_xO/Al_2O_3$ is 0.95 to 3.23, where R is any one or more of Li, Na, K, Rb, Cs and x is 2, or
$R_xO/Al_2O_3$ is 1.18 to 5.68, where R is any one or more of Li, Na, K, Rb, Cs and X is 2, or
any one or more of Zn, Mg, Ca, Sr, or Ba and x is 1.

30. The light guide plate of claim 28, wherein $R_xO$—$Al_2O_3$—MgO is between −4.25 and 4.0, where R is any one or more of Li, Na, K, Rb, Cs and x is 2.

31. The light guide plate of claim 28, wherein the glass comprises:
from 0.1 mol % to 2.0 mol % ZnO;
from 0.1 mol % to 1.0 mol % $TiO_2$;
from 0.1 mol % to 1.0 mol % $V_2O_3$;
from 0.1 mol % to 1.0 mol % $Nb_2O_5$;
from 0.1 mol % to 1.0 mol % MnO;
from 0.1 mol % to 1.0 mol % $ZrO_2$;
from 0.1 mol % to 1.0 mol % $As_2O_3$;
from 0.1 mol % to 1.0 mol % $SnO_2$;
from 0.1 mol % to 1.0 mol % $MoO_3$;
from 0.1 mol % to 1.0 mol % $Sb_2O_3$; or
from 0.1 mol % to 1.0 mol % $CeO_2$.

32. The light guide plate of claim 31, wherein the glass comprises 0.1 mol % to 3.0 mol % of a combination of any of ZnO, $TiO_2$, $V_2O_3$, $Nb_2O_5$, MnO, $ZrO_2$, $As_2O_3$, $SnO_2$, $MoO_3$, $Sb_2O_3$, and $CeO_2$.

33. The light guide plate of claim 28, wherein the glass sheet comprises less than 1 ppm each of Co, Ni, and Cr.

34. The light guide plate of claim 28, wherein Fe+30Cr+35Ni is <60 ppm.

35. The light guide plate of claim 28, wherein Fe+30Cr+35Ni is <40 ppm.

36. The light guide plate of claim 28, wherein Fe+30Cr+35Ni is <20 ppm.

37. The light guide plate of claim 28, wherein Fe+30Cr+35Ni is <10 ppm.

38. The light guide plate of claim 28, wherein the glass sheet has a strain temperature of 522° C. to 590° C., an annealing temperature of 566° C. to 641° C., a softening temperature of 800° C. to 914° C., a CTE of $49.6 \times 10^{-7}/°$ C. to $80 \times 10^{-7}/°$ C., or a density of 2.34 gm/cc @ 20° C. to 2.53 gm/cc @ 20° C.

39. The light guide plate of claim 28, wherein the transmittance at 450 nm with at least 500 mm in length is greater than or equal to 85%, the transmittance at 550 nm with at least 500 mm in length is greater than or equal to 90%, or the transmittance at 630 nm with at least 500 mm in length is greater than or equal to 85%, and combinations thereof.

40. The light guide plate of claim 28, wherein the light guide plate has a thickness of 0.2 mm to 8 mm.

41. The light guide plate of claim 40, wherein the light guide plate is manufactured from a fusion draw process, slot draw process, or a float process.

42. The light guide plate of claim 28 wherein the glass sheet is chemically strengthened.

* * * * *